US012804561B2

(12) United States Patent
Zhang et al.

(10) Patent No.: US 12,804,561 B2
(45) Date of Patent: Nov. 17, 2026

(54) POWER CONTROL FOR A UNIFIED TRANSMISSION CONFIGURATION INDICATION BASED MULTIPLE TRANSMISSION RECEPTION POINT CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Jae Ho Ryu, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 18/889,299

(22) Filed: Sep. 18, 2024

(65) Prior Publication Data

US 2026/0082340 A1 Mar. 19, 2026

(51) Int. Cl.
*H04W 52/38* (2009.01)
*H04W 52/54* (2009.01)
*H04W 72/232* (2023.01)

(52) U.S. Cl.
CPC ........... *H04W 52/38* (2013.01); *H04W 52/54* (2013.01); *H04W 72/232* (2023.01)

(58) Field of Classification Search
CPC .... H04W 52/38; H04W 52/54; H04W 72/232
See application file for complete search history.

(56) References Cited

U.S. PATENT DOCUMENTS 12,425,176 B2 * 9/2025 Abdelghaffar ............ H04L 5/14
2024/0057051 A1 * 2/2024 Abdelghaffar ........ H04L 5/0092
2024/0348414 A1 * 10/2024 Abdelghaffar ............ H04L 5/14
2025/0016872 A1 * 1/2025 Zhang .................... H04W 76/20
2025/0048389 A1 * 2/2025 Rudolf .................. H04L 5/0048
2025/0175313 A1 * 5/2025 Abdelghaffar ............ H04L 5/14
2026/0040229 A1 * 2/2026 Park ...................... H04W 52/06

FOREIGN PATENT DOCUMENTS

WO WO-2025029072 A1 * 2/2025 .......... H04W 72/232

* cited by examiner

*Primary Examiner* — Hai V Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states includes a downlink TCI state, an uplink TCI state, or a joint TCI state. The UE may communicate using the first power control parameter or the second power control parameter based at least in part on whether the communication includes one or more SBFD symbols or one or more non-SBFD symbols. Numerous other aspects are described.

20 Claims, 23 Drawing Sheets

800

| | | | | | | | | |
|---|---|---|---|---|---|---|---|---|
| Oct 1 | R | Serving Cell ID | | | | | DL BWP ID | |
| Oct 2 | $F_{1,1}$ | $F_{1,2}$ | $F_{2,1}$ | $F_{2,2}$ | $F_{3,1}$ | $F_{3,2}$ | $F_{4,1}$ | $F_{4,2}$ |
| Oct 3 | $F_{5,1}$ | $F_{5,2}$ | $F_{6,1}$ | $F_{6,2}$ | $F_{7,1}$ | $F_{7,2}$ | $F_{8,1}$ | $F_{8,2}$ |
| Oct 4 | R | TCI state ID 1 | | | | | | |
| Oct 5 | R | TCI state ID 2 | | | | | | |
| ... | | ... | | | | | | |
| Oct N+3 | R | TCI state ID N | | | | | | |

FIG. 8A

805

| | | | | | | | | |
|---|---|---|---|---|---|---|---|---|
| Oct 1 | R | Serving Cell ID | | | | | DL BWP ID | |
| Oct 2 | R | R | R | R | R | R | UL BWP ID | |
| Oct 3 | $F_{1,1}$ | $F_{1,2}$ | $S_{1,1}$ | $S_{1,2}$ | $F_{2,1}$ | $F_{2,2}$ | $S_{2,1}$ | $S_{2,2}$ |
| Oct 4 | $F_{3,1}$ | $F_{3,2}$ | $S_{3,1}$ | $S_{3,2}$ | $F_{4,1}$ | $F_{4,2}$ | $S_{4,1}$ | $S_{4,2}$ |
| Oct 5 | $F_{5,1}$ | $F_{5,2}$ | $S_{5,1}$ | $S_{5,2}$ | $F_{6,1}$ | $F_{6,2}$ | $S_{6,1}$ | $S_{6,2}$ |
| Oct 6 | $F_{7,1}$ | $F_{7,2}$ | $S_{7,1}$ | $S_{7,2}$ | $F_{8,1}$ | $F_{8,2}$ | $S_{8,1}$ | $S_{8,2}$ |
| Oct 7 | R | TCI state ID 1 | | | | | | |
| Oct 8 | R | TCI state ID 2 | | | | | | |
| ... | | | | | | | | |
| Oct N+6 | R | TCI state ID N | | | | | | |

FIG. 8B

815

| | | | | | | | | |
|---|---|---|---|---|---|---|---|---|
| R | Serving Cell ID | | | | | DL BWP ID | | Oct 1 |
| R | R | R | R | R | R | UL BWP ID | | Oct 2 |
| $F_{1,1}$ | $F_{1,2}$ | $S_{1,1}$ | $S_{1,2}$ | $F_{2,1}$ | $F_{2,2}$ | $S_{2,1}$ | $S_{2,2}$ | Oct 3 |
| $F_{3,1}$ | $F_{3,2}$ | $S_{3,1}$ | $S_{3,2}$ | $F_{4,1}$ | $F_{4,2}$ | $S_{4,1}$ | $S_{4,2}$ | Oct 4 |
| $F_{5,1}$ | $F_{5,2}$ | $S_{5,1}$ | $S_{5,2}$ | $F_{6,1}$ | $F_{6,2}$ | $S_{6,1}$ | $S_{6,2}$ | Oct 5 |
| $F_{7,1}$ | $F_{7,2}$ | $S_{7,1}$ | $S_{7,2}$ | $F_{8,1}$ | $F_{8,2}$ | $S_{8,1}$ | $S_{8,2}$ | Oct 6 |
| R | TCI state ID 1 | | | | | | | Oct 7 |
| R | TCI state ID 2 | | | | | | | Oct 8 |
| … | | | | | | | | |
| R | TCI state ID N | | | | | | | Oct N+6 |

FIG. 8D

POWER CONTROL FOR A UNIFIED TRANSMISSION CONFIGURATION INDICATION BASED MULTIPLE TRANSMISSION RECEPTION POINT CONFIGURATION

FIELD OF THE DISCLOSURE

Aspects of the present disclosure generally relate to wireless communication and specifically relate to techniques, apparatuses, and methods associated with power control for a unified transmission configuration indication based multiple transmission reception point configuration.

BACKGROUND

Wireless communication systems are widely deployed to provide various services, which may involve carrying or supporting voice, text, other messaging, video, data, and/or other traffic. Typical wireless communication systems may employ multiple-access radio access technologies (RATs) capable of supporting communication among multiple wireless communication devices including user devices or other devices by sharing the available system resources (for example, time domain resources, frequency domain resources, spatial domain resources, and/or device transmit power, among other examples). Such multiple-access RATs are supported by technological advancements that have been adopted in various telecommunication standards, which define common protocols that enable different wireless communication devices to communicate on a local, municipal, national, regional, or global level.

An example telecommunication standard is New Radio (NR). NR, which may also be referred to as 5G, is part of a continuous mobile broadband evolution promulgated by the Third Generation Partnership Project (3GPP). NR (and other RATs beyond NR) may be designed to better support enhanced mobile broadband (eMBB) access, Internet of things (IoT) networks or reduced capability device deployments, and ultra-reliable low latency communication (URLLC) applications. To support these verticals, NR systems may be designed to implement a modularized functional infrastructure, a disaggregated and service-based network architecture, network function virtualization, network slicing, multi-access edge computing, millimeter wave (mmWave) technologies including massive multiple-input multiple-output (MIMO), licensed and unlicensed spectrum access, non-terrestrial network (NTN) deployments, sidelink and other device-to-device direct communication technologies (for example, cellular vehicle-to-everything (CV2X) communication), multiple-subscriber implementations, high-precision positioning, and/or radio frequency (RF) sensing, among other examples. As the demand for connectivity continues to increase, further improvements in NR may be implemented, and other RATs, such as 6G and beyond, may be introduced to enable new applications and facilitate new use cases.

SUMMARY

Some aspects described herein relate to a method of wireless communication performed by a user equipment (UE). The method may include receiving, for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states includes a downlink TCI state, an uplink TCI state, or a joint TCI state. The method may include communicating using the first power control parameter or the second power control parameter based at least in part on whether the communication includes one or more SBFD symbols or one or more non-SBFD symbols.

Some aspects described herein relate to a method of wireless communication performed by a network node. The method may include transmitting, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state. The method may include communicating with the UE using the first power control parameter or the second power control parameter based at least in part on whether the communication includes one or more SBFD symbols or one or more non-SBFD symbols.

Some aspects described herein relate to an apparatus for wireless communication at a UE. The apparatus may include one or more memories and one or more processors coupled to the one or more memories. The one or more processors may be configured to receive, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state. The one or more processors may be configured to communicate using the first power control parameter or the second power control parameter based at least in part on whether the communication includes one or more SBFD symbols or one or more non-SBFD symbols.

Some aspects described herein relate to an apparatus for wireless communication at a network node. The apparatus may include one or more memories and one or more processors coupled to the one or more memories. The one or more processors may be configured to transmit, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state. The one or more processors may be configured to communicate with the UE using the first power control parameter or the second power control parameter based at least in part on whether the communication includes one or more SBFD symbols or one or more non-SBFD symbols.

Some aspects described herein relate to a non-transitory computer-readable medium that stores a set of instructions for wireless communication by a UE. The set of instructions, when executed by one or more processors of the UE, may cause the UE to receive, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state. The set of instructions, when executed by one or more processors of the UE, may cause the UE to communicate using the first power control parameter or the second power control parameter based at least in part on whether the communication includes one or more SBFD symbols or one or more non-SBFD symbols.

Some aspects described herein relate to a non-transitory computer-readable medium that stores a set of instructions for wireless communication by a network node. The set of instructions, when executed by one or more processors of the network node, may cause the network node to transmit, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state. The set of instructions, when executed by one or more processors of the network node, may cause the network node to communicate with the UE using the first power control parameter or the second power control parameter based at least in part on whether the communication includes one or more SBFD symbols or one or more non-SBFD symbols.

Some aspects described herein relate to an apparatus for wireless communication. The apparatus may include means for receiving, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state. The apparatus may include means for communicating using the first power control parameter or the second power control parameter based at least in part on whether the communication includes one or more SBFD symbols or one or more non-SBFD symbols.

Some aspects described herein relate to an apparatus for wireless communication. The apparatus may include means for transmitting, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state. The apparatus may include means for communicating with the UE using the first power control parameter or the second power control parameter based at least in part on whether the communication includes one or more SBFD symbols or one or more non-SBFD symbols.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, this specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIGS. 8A-8I are diagrams illustrating examples of single downlink control information (DCI)-based mTRP transmissions, in accordance with the present disclosure.

DETAILED DESCRIPTION

Figure 1:
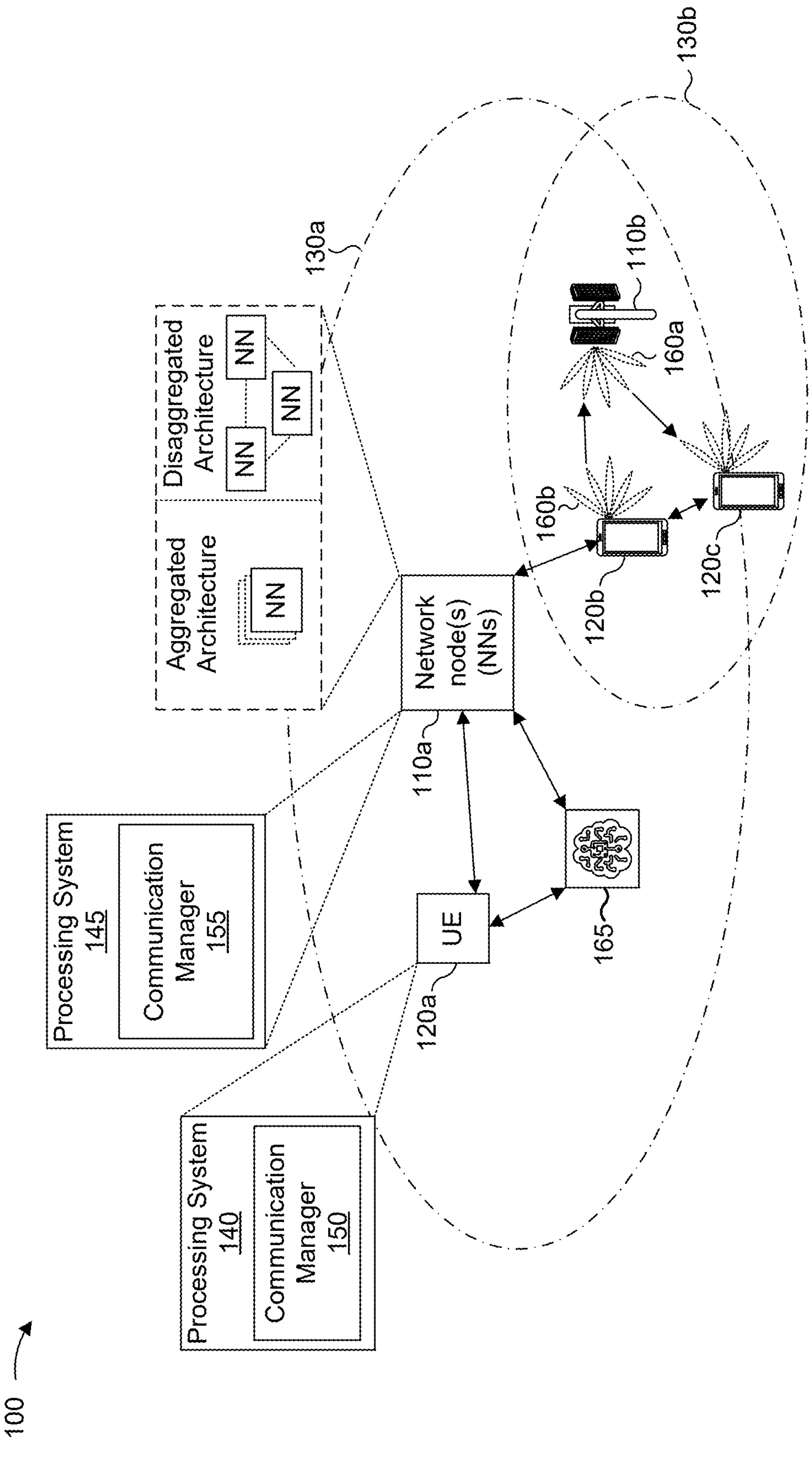
FIG. 1 is a diagram illustrating an example of a wireless communication network, in accordance with the present disclosure.

Various aspects of the present disclosure are described hereinafter with reference to the accompanying drawings.

However, aspects of the present disclosure may be embodied in many different forms. The present disclosure is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Sub-band full-duplex (SBFD) is a communication technique where both uplink and downlink transmissions occur simultaneously within different sub-bands of the same frequency band. SBFD communications can enhance spectral efficiency of wireless communications by enabling the concurrent use of a spectrum that would otherwise be allocated separately for uplink and downlink communications. SBFD communications may allow for greater data throughput within the same bandwidth, thereby enabling wireless communication systems to maximize the use of the available spectrum. In SBFD symbols, physical uplink shared channel (PUSCH), physical uplink control channel (PUCCH), and sounding reference signal (SRS) transmissions may be performed concurrently with downlink transmissions. This simultaneous transmission can result in interference conditions, for example, when both uplink and downlink are active in adjacent sub-bands at the same time. In contrast, in non-SBFD symbols (for example, half-duplex symbols), uplink and downlink transmissions are performed separately, thereby allowing for more straightforward interference management.

Transmission configuration indication (TCI) states may be used to control a beamforming direction for uplink and downlink transmissions. TCI states may allow a wireless communication system to dynamically adjust the transmission direction to enable improved communication quality based at least in part on channel conditions. A unified TCI configuration may apply the same beamforming direction for both uplink and downlink, thereby simplifying coordination and minimizing the complexity of managing different transmission configurations for each link.

"Transmission reception point" (TRP) refers to a physical location where signals are transmitted and received. In a single TRP scenario, communications are handled by one transmission point. In contrast, in multiple TRP (mTRP) scenarios, signals may be transmitted and received from multiple locations, thereby providing better coverage, increased reliability, and the ability to handle more users simultaneously through coordinated transmissions.

Uplink power control can be used to regulate the transmission power of uplink signals, thereby improving signal quality while minimizing interference. In SBFD systems, different uplink power control mechanisms may be used for transmissions in SBFD symbols and non-SBFD symbols. However, using separate uplink power control mechanisms for SBFD symbols and non-SBFD symbols within a unified TCI framework may present certain challenges. For example, unified TCI may assume consistent beamforming for both uplink and downlink. However, the differences in interference between SBFD symbols and non-SBFD symbols may increase a difficulty in managing uplink power effectively. As a result, separate power control schemes for SBFD symbols and non-SBFD symbols in a unified TCI environment may conflict, which may result in inefficient power adjustments, increased interference, or sub-optimal network performance, among other examples.

Various aspects relate generally to wireless communications. Some aspects relate more specifically to power control for a unified TCI-based mTRP configuration. In some aspects, a network node may transmit, and a UE may receive, for one or more TCI states of a plurality of TC states associated with the unified TCI-based mTRP configuration, a first power control parameter and a second power control parameter. The first power control parameter may be for SBFD communications and the second power control parameter may be for non-SBFD communications. For example, the first power control parameter may be a first uplink power control parameter to be used by the UE when transmitting in SBFD symbols, and the second power control parameter may be a second uplink power control parameter to be used by the UE when transmitting in non-SBFD symbols. The plurality of TC states may include a downlink TCI state, an uplink TCI state, and/or a joint TCI state. The UE and the network node may communicate using the first power control parameter or the second power control parameter based at least in part on whether the communication includes one or more SBFD symbols or one or more non-SBFD symbols. For example, the UE may transmit a communication to the network node using the first power control parameter based at least in part on the communication including an SBFD symbol. Alternatively, the UE may transmit the communication to the network node using the second power control parameter based at least in part on the communication including a non-SBFD symbol.

Particular aspects of the subject matter described in this disclosure can be implemented to realize one or more of the following potential advantages. In some examples, the described techniques can be used to enable separate power control parameters for SBFD and non-SBFD communications. For example, the described techniques can be used to enable different uplink power control in SBFD symbols and non-SBFD symbols. In some examples, the described techniques can be used to enable separate power control parameters for SBFD and non-SBFD communications within a unified TCI-based mTRP framework. In some examples, the described techniques can be used to enable separate uplink power control for PUSCH, PUCCH, or SRS transmissions in SBFD symbols and non-SBFD symbols. In some examples, the described techniques can be used to improve power adjustments by the UE within the unified TCI-based mTRP framework. In some examples, the described techniques may reduce interference between uplink and downlink communications within the unified TCI-based mTRP framework. In some examples, the described techniques can be used to improve network performance within the unified TCI-based mTRP framework. These example advantages, among others, are described in more detail below.

As described above, wireless communication systems may be deployed to provide various services, which may involve carrying or supporting voice, text, other messaging, video, data, and/or other traffic. Some wireless communications systems may employ multiple-access radio access technologies (RATs). The multiple-access RATs may be capable of supporting communication with multiple wireless communication devices by sharing the available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple-access RATs are supported by technological advancements that have been adopted in various telecommunication standards, which define common protocols that enable wireless communication devices to communicate on a local, municipal, enterprise, national, regional, or global level. For example, 5G New Radio (NR) is part of a continuous mobile broadband evolution promulgated by the Third Generation Partnership Project (3GPP). 5G NR may support enhanced mobile broadband (eMBB) access, Internet of Things (IoT) networks or reduced capability (RedCap) device deployments, ultra-reliable low-latency communication (URLLC) applications, and/or massive machine-type communication (mMTC), among other examples.

To support these and other target verticals, a wireless communication system may be designed to implement a modularized functional infrastructure, a disaggregated and service-based network architecture, network function virtualization, network slicing, multi-access edge computing, millimeter wave (mmWave) technologies including massive multiple-input multiple-output (MIMO), beamforming, IoT device or RedCap device connectivity and management, industrial connectivity, licensed and unlicensed spectrum access, sidelink and other device-to-device direct communication (for example, cellular vehicle-to-everything (CV2X) communication), frequency spectrum expansion, overlapping spectrum use, small cell deployments, non-terrestrial network (NTN) deployments, device aggregation, advanced duplex communication (for example, sub-band full-duplex (SBFD)), multiple-subscriber implementations, high-precision positioning, radio frequency (RF) sensing, network energy savings (NES), low-power signaling and radios, and/or artificial intelligence or machine learning (AI/ML), among other examples.

A network node 110 or a user equipment (UE) 120 operating in a half-duplex mode may perform only one of transmission or reception during particular time resources, such as during particular slots, symbols, or other time periods. In various examples, some of the network nodes 110 and the UEs 120 of the wireless communication network 100 may be configured for full-duplex operation in addition to half-duplex operation. In full-duplex operation, a network node 110 or a UE 120 operating in a full-duplex (for example, SBFD) mode can transmit and receive communications concurrently (for example, in the same time resources). For example, as shown in FIG. 1, the network node 110*b* may operate in the full-duplex mode. The network node 110*b* may concurrently receive uplink communications from the UE 120*b* and transmit downlink communications to the UE 120*c*. By operating in a full-duplex mode, network nodes 110 and/or UEs 120 may generally increase the capacity of the network and the radio access link. In some examples, full-duplex operation may involve FDD, in which downlink transmissions of the network node 110*b* are performed in a first frequency band or on a first component carrier and transmissions of the UE 120*b* are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an uplink transmission to a first network node 110 and receive a downlink transmission from a second network node 110 in the same time resources. In some other examples, full-duplex operation may be enabled for a network node 110 but not for a UE 120. For example, the network node 110*b* may simultaneously transmit a downlink transmission to a first UE 120 (for example, the UE 120*c*) and receive an uplink transmission from a second UE 120 (for example, the UE 120*b*) in the same time resources. In some other examples, full-duplex operation may be enabled for both a network node 110 and a UE 120.

The foregoing and other technological improvements may support use cases, such as wireless fronthauls, wireless midhauls, wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples.

As the demand for connectivity continues to increase, further improvements in NR may be implemented, and other RATs, such as 6G and beyond, may be introduced to enable new applications and facilitate new use cases. The methods, operations, apparatuses, and techniques described herein may enable one or more of the foregoing technologies or new technologies and/or support one or more of the foregoing use cases or new use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110. For example, in FIG. 1, the wireless communication network 100 includes a network node (NN) 110*a* and a network node 110*b*. The network nodes 110 may support communications with multiple UEs 120. For example, in FIG. 1, the network nodes 110 support communication with a UE 120*a*, a UE 120*b*, and a UE 120*c*. In some examples, a UE 120 may also communicate with other UEs 120 and a network node 110 may communicate with a core network and with other network nodes 110.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency bands or ranges. In some examples, when multiple RATs are deployed in a given geographic area, each RAT in the geographic area may operate on different frequencies to avoid interference with other RATs. Additionally or alternatively, in some examples, the wireless communication network 100 may implement dynamic spectrum sharing (DSS), in which multiple RATs are implemented with dynamic bandwidth allocation (for example, based at least in part on user demand) in a single frequency band. In some examples, the wireless communication network 100 may support communication over unlicensed spectrum, where access to an unlicensed channel is subject to a channel access mechanism. For example, in a shared or unlicensed frequency band, a transmitting device may perform a channel access procedure, such as a listen-before-talk (LBT) procedure, to contend against other devices for channel access before transmitting on a shared or unlicensed channel.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into the mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to mid-band frequencies or to frequencies that are within FR2, FR4, FR4-a or FR4-1, FR5, and/or the EHF band. Higher frequency bands may extend 5G NR operation, 6G operation, and/or other RATs beyond 52.6 GHz.

A network node 110 and/or a UE 120 may include one or more devices, components, or systems that enable communication with other devices, components, or systems of the wireless communication network 100. For example, a UE 120 and a network node 110 may each include one or more chips, system-on-chips (SoCs), chipsets, packages, or devices that individually or collectively constitute or comprise a processing system, such as a processing system 140 of the UE 120 or a processing system 145 of the network node 110. A processing system (for example, the processing system 140 and/or the processing system 145) includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), and/or digital signal processors (DSPs)), processing blocks, application-specific integrated circuits (ASICs), programmable logic devices (PLDs), or other discrete gate or transistor logic or circuitry (any one or more of which may be generally referred to herein individually as a "processor" or collectively as "the processor" or "the processor circuitry"). Such processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

The processing system 140 and the processing system 145 may each include memory circuitry in the form of one or multiple memory devices, memory blocks, memory elements, or other discrete gate or transistor logic or circuitry, each of which may include or implement tangible storage media such as random-access memory (RAM) or read-only memory (ROM), or combinations thereof (any one or more of which may be generally referred to herein individually as a "memory" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code or instructions (such as software) that, when executed by one or more of the processors, may configure one or more of the processors to perform various functions or operations described herein. Additionally or alternatively, in some examples, one or more of the processors may be configured to perform various functions or operations described herein without requiring configuration by software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise.

The processing system 140 and the processing system 145 may each include or be coupled with one or more modems (such as a cellular (for example, a 5G or 6G compliant) modem). In some examples, one or more processors of the processing system 140 and/or the processing system 145 include or implement one or more of the modems. The processing system 140 and the processing system 145 may also include or be coupled with multiple radios (collectively "the radio"), multiple RF chains, or multiple transceivers, each of which may in turn be coupled with one or more of multiple antennas. In some examples, one or more processors of the processing system 140 and/or the processing system 145 include or implement one or more of the radios, RF chains, or transceivers. An RF chain may include one or more filters, mixers, oscillators, amplifiers, analog-to-digital converters (ADCs), and/or other devices that convert between an analog signal (such as for transmission or reception via an air interface) and a digital signal (such as for processing by the processing system 140 of the UE 120 or by the processing system 145 of the network node 110).

A network node 110 and a UE 120 may each include one or multiple antennas or antenna arrays. Typical network nodes 110 and UEs 120 may include multiple antennas, which may be organized or structured into one or more antenna panels, one or more antenna groups, one or more sets of antenna elements, or one or more antenna arrays, among other examples. As used herein, the term "antenna" can refer to one or more antennas, one or more antenna panels, one or more antenna groups, one or more sets of antenna elements, or one or more antenna arrays. The term "antenna panel" can refer to a group of antennas (such as antenna elements) arranged in an array or panel, which may facilitate beamforming by manipulating parameters associated with the group of antennas. The term "antenna module" may refer to circuitry including one or more antennas as well as one or more other components (such as filters, amplifiers, or processors) associated with integrating the antenna module into a wireless communication device such as the network node 110 and the UE 120.

A network node 110 may be, may include, or may also be referred to as an NR network node, a 5G network node, a 6G network node, a Node B, a gNB, an access point (AP), a transmission reception point (TRP), a network entity, a network element, a network equipment, and/or another type of device, component, or system included in a radio access network (RAN). In various deployments, a network node 110 may be implemented as a single physical node (for example, a single physical structure) or may be implemented as two or more physical nodes (for example, two or more distinct physical structures). For example, a network node 110 may be a device or system that implements a part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node having an aggregated architecture, meaning that the network node 110 may implement a full radio protocol stack that is physically and logically integrated within a single physical structure in the wireless communication network 100. For example, an aggregated network node 110 may consist of a single standalone base station or a single TRP that operates with a full radio protocol stack to enable or facilitate communication between a UE 120 and a core network of the wireless communication network 100.

Alternatively, and as also shown, a network node 110 may be a disaggregated network node (sometimes referred to as a disaggregated base station), having a disaggregated architecture, meaning that the network node 110 may operate with a radio protocol stack that is physically distributed and/or logically distributed among two or more nodes in the same geographic location or in different geographic locations. An example disaggregated network node architecture is described in more detail below with reference to FIG. 2. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating network functionality into multiple units or modules that can be individually deployed.

The network nodes 110 of the wireless communication network 100 may include one or more central units (CUs), one or more distributed units (DUs), and one or more radio units (RUs). A CU may host one or more higher layers, such as a radio resource control (RRC) layer, a packet data convergence protocol (PDCP) layer, and a service data adaptation protocol (SDAP) layer, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host a lower PHY layer that is configured to perform functions, such as a fast Fourier transform (FFT), an inverse FFT (IFFT), beamforming, and/or physical random access channel (PRACH) extraction and filtering, among other examples. An RU may perform RF processing functions or lower PHY layer functions, such as an FFT, an IFFT, beamforming, or PRACH extraction and filtering, among other examples, according to a functional split, such as a lower layer split (LLS). In such an architecture, each RU can be operated to handle over the air (OTA) communication with one or more UEs 120. In some examples, a single network node 110 may include a combination of one or more CUs, one or more DUs, and/or one or more RUs. In some examples, a CU, a DU, and/or an RU may be implemented as a virtual unit, such as a virtual central unit (VCU), a virtual distributed unit (VDU), or a virtual radio unit (VRU), among other examples, which may be implemented as a virtual network function, such as in a cloud deployment.

Some network nodes 110 (for example, a base station, an RU, or a TRP) may provide communication coverage for a particular geographic area. The term "cell" can refer to a coverage area of a network node 110 or to a network node 110 itself, depending on the context in which the term is used. A network node 110 may support one or more cells (for example, each cell may support communication within an angular (for example, 60 degree) range around the network node). In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with associated service subscriptions. A pico cell may cover a relatively small geographic area and may also allow unrestricted access by UEs 120 with associated service subscriptions. A femto cell may cover a relatively small geographic area (for example, a home) and may allow restricted access by UEs 120 having association with the femto cell (for example, UEs 120 in a closed subscriber group (CSG)). In some examples, a cell may not necessarily be stationary. For example, the geographic area of the cell may move according to the location of an associated mobile network node 110 (for example, a train, a satellite, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. Various different types of network nodes 110 may generally transmit at different power levels, serve different coverage areas (for example, a cell 130*a* and a cell 130*b*), and/or have different impacts on interference in the wireless communication network 100 than other types of network nodes 110.

The UEs 120 may be physically dispersed throughout the coverage area of the wireless communication network 100, and each UE 120 may be stationary or mobile. A UE 120 may be, may include, or may also be referred to as an access terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a netbook, a smartbook, an ultrabook, a medical device, a biometric device, a wearable device (for example, a smart watch, smart clothing, smart glasses, a smart wristband, smart jewelry, a gaming device, an entertainment device (for example, a music device, a video device, or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between that of the UEs 120 of the first category and that of the UEs 120 of the second capability). A UE 120 of the third category may be referred to as a reduced capability UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, or cameras that are associated with a limited bandwidth, power capacity, and/or transmission range, among other examples. RedCap UEs may support healthcare environments, building automation, electrical distribution, process automation, transport and logistics, or smart city deployments, among other examples.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink and uplink resources may include time domain resources (for example, frames, subframes, slots, and symbols), frequency domain resources (for example, frequency bands, component carriers (CCs), subcarriers, resource blocks, and resource elements), and spatial domain resources (for example, particular transmit directions or beams).

Frequency domain resources may be subdivided into bandwidth parts (BWPs). A BWP may be a block of frequency domain resources (for example, a continuous set of resource blocks (RBs) within a full component carrier bandwidth) that may be configured at a UE-specific level. A UE 120 may be configured with both an uplink BWP and a downlink BWP (which may be the same or different). Each BWP may be associated with its own numerology (indicating a sub-carrier spacing (SCS) and cyclic prefix (CP)). A BWP may be dynamically configured or activated (for example, by a network node 110 transmitting a downlink control information (DCI) configuration to the one or more UEs 120) and/or reconfigured (for example, in real-time or near-real-time) according to changing network conditions in the wireless communication network 100 and/or specific requirements of one or more UEs 120. An active BWP defines the operating bandwidth of the UE 120 within the operating bandwidth of the serving cell. The use of BWPs enables more efficient use of the available frequency domain resources in the wireless communication network 100 because fewer frequency domain resources may be allocated to a BWP for a UE 120 (which may reduce the quantity of frequency domain resources that a UE 120 is required to monitor and reduce UE power consumption by enabling the UE to monitor fewer frequency domain resources), leaving more frequency domain resources to be spread across multiple UEs 120. Thus, BWPs may also assist in the implementation of lower-capability (for example, RedCap) UEs 120 by facilitating the configuration of smaller bandwidths for communication by such UEs 120 and/or by facilitating reduced UE power consumption.

As used herein, a downlink signal may be or include a reference signal, control information, or data. For example, downlink reference signals include a primary synchronization signal (PSS), a secondary SS (SSS), an SS block (SSB) (for example, that includes a PSS, an SSS, and a physical broadcast channel (PBCH)), a demodulation reference signal (DMRS), a phase tracking reference signal (PTRS), a tracking reference signal (TRS), and a channel state information (CSI) reference signal (CSI-RS), among other examples. A downlink signal carrying control information or data may be transmitted via a downlink channel. Downlink channels may include one or more control channels for transmitting control information and one or more data channels for transmitting data. Downlink reference signals may be transmitted in addition to, or multiplexed with, downlink control channel communications and/or downlink data channel communications. A downlink control channel may be specifically used to transmit DCI from a network node 110 to a UE 120. DCI generally contains the information the UE 120 needs to identify RBs in a subsequent subframe and how to decode them, including a modulation and coding scheme (MCS) or redundancy version parameters. Different DCI formats carry different information, such as scheduling information in the form of downlink or uplink grants, slot formal indicators (SFIs), preemption indicators (PIs), transmit power control (TPC) commands, hybrid automatic repeat request (HARQ) information, new data indicators (NDIs), among other examples. A downlink data channel may be used to transmit downlink data (for example, user data associated with a UE 120) from a network node 110 to a UE 120. Downlink control channels may include physical downlink control channels (PDCCHs), and downlink data channels may include physical downlink shared channels (PDSCHs). Control information or data communications may be transmitted on a PDCCH and PDSCH, respectively. For example, a PDCCH can carry DCI, while a PDSCH can carry a MAC control element (MAC-CE), an RRC message, or user data, among other examples. Each PDSCH may carry one or more transport blocks (TBs) of data.

As used herein, an uplink signal may include a reference signal, control information, or data. For example, uplink reference signals include a sounding reference signal (SRS), a PTRS, and a DMRS, among other examples. An uplink signal carrying control information or data may be transmitted via an uplink channel. An uplink channel may include one or more control channels for transmitting control information and one or more data channels for transmitting data. Uplink reference signals may be transmitted in addition to, or multiplexed with, uplink control channel communications and/or uplink data channel communications. An uplink control channel may be specifically used to transmit uplink control information (UCI) from a UE 120 to a network node 110. An uplink data channel may be used to transmit uplink data (for example, user data associated with a UE 120) from a UE 120 to a network node 110. Uplink control channels may include physical uplink control channels (PUCCHs), and uplink data channels may include physical uplink shared channels (PUSCHs). Control information or data communications may be transmitted on a PUCCH and PUSCH, respectively. For example, a PUCCH can carry UCI, while a PUSCH can carry a MAC-CE, an RRC message, or user data, among other examples. UCI can include a scheduling request (SR), HARQ feedback information (for example, a HARQ acknowledgement (ACK) indication or a HARQ negative acknowledgement (NACK) indication), uplink power control information (for example, an uplink TPC parameter), and/or CSI, among other examples. CSI can include a channel quality indicator (CQI) (indicative of downlink channel conditions to facilitate selection of transmission parameters, such as an MCS, by a network node 110), a precoding matrix indicator (PMI), a CSI-RS resource indicator (CRI) (for example, indicative of a beam used to transmit a CSI-RS), an SS/PBCH resource block indicator (SSBRI) (for example, indicative of a beam used to transmit an SSB), a layer indicator (LI), a rank indicator (RI), and/or measurement information (for example, a layer 1 (L1)-reference signal received power (RSRP) parameter, a received signal strength indicator (RSSI) parameter, a reference signal received quality (RSRQ) parameter, among other examples) which can be used for beam management, among other examples. Each PUSCH may carry one or more TBs of data.

The information (for example, data, control information, or reference signal information) transmitted by a network node 110 to a UE 120, or vice versa, may be represented as a sequence of binary bits that are mapped (for example, modulated) to an analog signal waveform (for example, a discrete Fourier transform (DFT)-spread-orthogonal frequency division multiplexing (OFDM) (DFT-s-OFDM) waveform or a CP-OFDM waveform) that is transmitted by the network node 110 or UE 120 over a wireless communication channel. In some examples, the network node 110 or the UE 120 (for example, using the processing system 145 or the processing system 140, respectively) may select an MCS (for example, an order of quadrature amplitude modulation (QAM), such as 64-QAM, 128-QAM, or 256-QAM, among other examples) for a downlink signal or an uplink signal. For example, the network node 110 may select an MCS for a downlink signal in accordance with UCI received from the UE 120. The network node 110 may transmit, to the UE 120, an indication of the selected MCS for the downlink signal, such as via DCI that schedules the downlink signal. As another example, the network node 110 may transmit, and the UE 120 may receive, an indication of an MCS to be applied for the one or more uplink signals, such as via DCI scheduling transmission of the one or more uplink signals.

The network node 110 or the UE 120 (such as by using the processing system 145 or the processing system 140, respectively, and/or one or more coupled modems) may perform signal processing on the information (such as filtering, amplification, modulation, digital-to-analog conversion, an IFFT operation, multiplexing, interleaving, mapping, and/or encoding, among other examples) to generate a processed signal in accordance with the selected MCS. In some examples, the network node 110 or the UE 120 (for example, using the processing system 145 or the processing system 140, respectively, and/or one or more coupled encoders or modems) may perform a channel coding operation or a forward error correction (FEC) operation to control errors in transmitted information. For example, the network node 110 or the UE 120 may perform an encoding operation to generate encoded information (such as by selectively introducing redundancy into the information, typically using an error correction code (ECC), such as a polar code or a low-density parity-check (LDPC) code). The network node 110 or the UE 120 (for example, using the processing system 145 and/or one or more modems) may further perform spatial processing (for example, precoding) on the encoded information to generate one or more processed or precoded signals for downlink or uplink transmission, respectively. In some examples, the network node 110 or the UE 120 may perform codebook-based precoding or non-codebook-based precoding. Codebook-based precoding may involve selecting a precoder (for example, a precoding matrix) using a codebook. For example, the network node 110 may provide precoding information indicating which precoder, defined by the codebook, is to be used by the UE 120. Non-codebook-based precoding may involve selecting or deriving a precoder based at least in part on, or otherwise associated with, one or more downlink or uplink signal measurements. The network node 110 or the UE 120 may transmit the processed downlink or uplink signals, respectively, via one or more antennas.

The network node 110 or the UE 120 may receive uplink signals or downlink signals, respectively, via one or more antennas. The network node 110 or the UE 120 (for example, using the processing system 145 or the processing system 140, respectively, and/or one or more coupled modems) may perform signal processing (for example, in accordance with the MCS) on the received uplink or downlink signals, respectively (such as filtering, amplification, demodulation, analog-to-digital conversion, an FFT operation, demultiplexing, deinterleaving, de-mapping, equalization, interference cancellation, and/or decoding, among other examples), to map the received signal(s) to a sequence of binary bits (for example, received information) that estimates the information transmitted by the network node 110 or the UE 120 via the downlink or uplink signals. The network node 110 or the UE 120 (for example, using the processing system 145 or the processing system 140, respectively, and/or a coupled decoder or one or more modems) may decode the received information (such as by using an ECC, a decoding operation, and/or an FEC operation) to detect errors and/or correct bit errors in the received information to generate decoded information. The decoded information may estimate the information transmitted via the downlink or uplink signals.

In some examples, a UE 120 and a network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. A network node 110 and/or UE 120 may communicate using massive MIMO, multi-user MIMO, or single-user MIMO, which may involve rapid switching between beams or cells. For example, the amplitudes and/or phases of signals transmitted via antenna elements and/or sub-elements may be modulated and shifted relative to each other (such as by manipulating a phase shift, a phase offset, and/or an amplitude) to generate one or more beams, which is referred to as beamforming. For example, the network node 110*b* may generate one or more beams 160*a*, and the UE 120*b* may generate one or more beams 160*b*. The term "beam" may refer to a directional transmission of a wireless signal toward a receiving device or otherwise in a desired direction, a directional reception of a wireless signal from a transmitting device or otherwise in a desired direction, a direction associated with a directional transmission or directional reception, a set of directional resources associated with a signal transmission or signal reception (for example, an angle of arrival, a horizontal direction, and/or a vertical direction), a set of parameters that indicate one or more aspects of a directional signal, a direction associated with the signal, and/or a set of directional resources associated with the signal, among other examples.

MIMO may be implemented using various spatial processing or spatial multiplexing operations. In some examples, MIMO may include a massive MIMO technique which may be associated with an increased (for example, "massive") quantity of antennas at the network node 110 and/or at the UE 120, such as in a network implementing mmWave technology. Massive MIMO may improve communication reliability by enabling a network node 110 and/or a UE 120 to communicate the same data across different propagation (or spatial) paths. In some examples, MIMO may support simultaneous transmission to multiple receivers, referred to as multi-user MIMO (MU-MIMO). Some RATs may employ MIMO techniques, such as multi-TRP (mTRP) operation (including redundant transmission or reception on multiple TRPs), reciprocity in the time domain or the frequency domain, single-frequency-network (SFN) transmission, or non-coherent joint transmission (NC-JT).

To support MIMO techniques, the network node 110 and the UE 120 may perform one or more beam management operations, such as an initial beam acquisition operation, one or more beam refinement operations, and/or a beam recovery operation. For example, an initial beam acquisition operation may involve the network node 110 transmitting signals (for example, SSBs, CSI-RSs, or other signals) via respective beams (for example, of the beams 160*a* of the network node 110) and the UE 120 receiving and measuring the signal(s) via respective beams of multiple beams (for example, from the beams 160*b* of the UE 120) to identify a best beam (or beam pair) for communication between the UE 120 and the network node 110. For example, the UE 120 may transmit an indication (for example, in a message associated with a random access channel (RACH) operation) of a (best) identified beam of the network node 110 (for example, by indicating an SSBRI or other identifier associated with the beam). A beam refinement operation may involve a first device (for example, the UE 120 or the network node 110) transmitting signal(s) via a subset of beams (for example, identified based at least in part on, or otherwise associated with, measurements reported as part of one or more other beam management operations). A second device (for example, the network node 110 or the UE 120) may receive the signal(s) via a single beam (for example, to identify the best beam for communication from the subset of beams). The beam(s) may be identified via one or more spatial parameters, such as a transmission configuration indication (TCI) state and/or a quasi co-location (QCL) parameter, among other examples. The network node 110 and the UE 120 may increase reliability and/or achieve efficiencies in throughput, signal strength, and/or other signal properties for massive MIMO operations by performing the beam management operations.

Some aspects and techniques as described herein may be implemented, at least in part, using an artificial intelligence (AI) program (for example, referred to herein as an "AI/ML model"), such as a program that includes a machine learning (ML) model and/or an artificial neural network (ANN) model. The AI/ML model may be deployed at one or more devices 165 (for example, a network node 110 and/or UEs 120). For example, the one or more devices 165 may include a UE 120 (for example, the processing system 140), a network node 110 (for example, the processing system 145), one or more servers, and/or one or more components of a cloud computing network, among other examples. In some examples, the AI/ML model (or an instance of the AI/ML model) may be deployed at multiple devices (for example, a first portion of the AI/ML model may be deployed at a UE 120 and a second portion of the AI/ML model may be deployed at a network node 110). In other examples, a first AI/ML model may be deployed at a UE 120 and a second AI/ML model may be deployed at a network node 110. The AI/ML model(s) may be configured to enhance various aspects of the wireless communication network 100. For example, the AI/ML model(s) may be trained to identify patterns or relationships in data corresponding to the wireless communication network 100, a device, and/or an air interface, among other examples. The AI/ML model(s) may support operational decisions relating to one or more aspects associated with wireless communications devices, networks, or services.

In some aspects, the UE 120 may include a communication manager 150. As described in more detail elsewhere herein, the communication manager 150 may receive, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state; and communicate using the first power control parameter or the second power control parameter based at least in part on whether the communication includes one or more SBFD symbols or one or more non-SBFD symbols. Additionally, or alternatively, the communication manager 150 may perform one or more other operations described herein.

In some aspects, the network node 110 may include a communication manager 155. As described in more detail elsewhere herein, the communication manager 155 may transmit, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state; and communicate with the UE using the first power control parameter or the second power control parameter based at least in part on whether the communication includes one or more SBFD symbols or one or more non-SBFD symbols. Additionally, or alternatively, the communication manager 155 may perform one or more other operations described herein.

Figure 2:
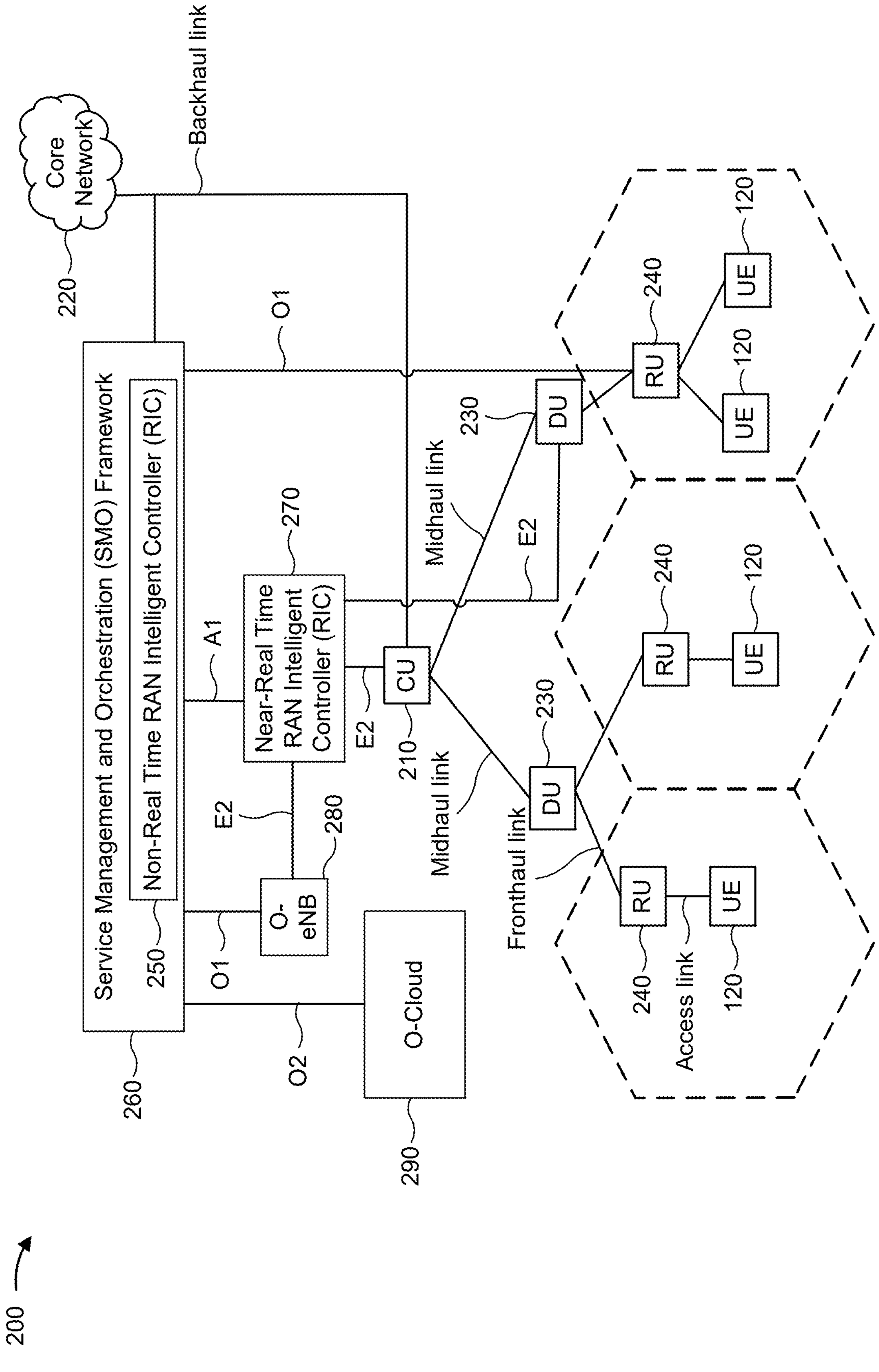
FIG. 2 is a diagram illustrating an example disaggregated network node architecture, in accordance with the present disclosure.

FIG. 2 is a diagram illustrating an example disaggregated network node architecture 200, in accordance with the present disclosure. One or more components of the example disaggregated network node architecture 200 may be, may include, or may be included in one or more network nodes (such one or more network nodes 110). The disaggregated network node architecture 200 may include a CU 210 that can communicate directly with a core network 220 via a backhaul link, or that can communicate indirectly with the core network 220 via one or more disaggregated control units, such as a non-real-time (Non-RT) RAN intelligent controller (RIC) 250 associated with a Service Management and Orchestration (SMO) Framework 260 and/or a near-real-time (Near-RT) RIC 270 (for example, via an E2 link). The CU 210 may communicate with one or more DUs 230 via respective midhaul links, such as via F1 interfaces. Each of the DUs 230 may communicate with one or more RUs 240 via respective fronthaul links. Each of the RUs 240 may communicate with one or more UEs 120 via respective RF access links. In some deployments, a UE 120 may be simultaneously served by multiple RUs 240.

Each of the components of the disaggregated network node architecture 200, including the CUs 210, the DUs 230, the RUs 240, the Near-RT RICs 270, the Non-RT RICs 250, and the SMO Framework 260, may include one or more interfaces or may be coupled with one or more interfaces for receiving or transmitting signals, such as data or information, via a wired or wireless transmission medium.

In some aspects, the CU 210 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 210 may be deployed to communicate with one or more DUs 230, as necessary, for network control and signaling. Each DU 230 may correspond to a logical unit that includes one or more base station functions to control the operation of one or more RUs 240. For example, a DU 230 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 230, or for communicating signals with the control functions hosted by the CU 210. Each RU 240 may implement lower layer functionality. In some aspects, real-time and non-real-time aspects of control and user plane communication with the RU(s) 240 may be controlled by the corresponding DU 230.

The SMO Framework 260 may support RAN deployment and provisioning of non-virtualized and virtualized network elements. For non-virtualized network elements, the SMO Framework 260 may support the deployment of dedicated physical resources for RAN coverage requirements, which may be managed via an operations and maintenance interface, such as an O1 interface. For virtualized network elements, the SMO Framework 260 may interact with a cloud computing platform (such as an open cloud (O-Cloud) platform 290) to perform network element life cycle management (such as to instantiate virtualized network elements) via a cloud computing platform interface, such as an O2 interface. A virtualized network element may include, but is not limited to, a CU 210, a DU 230, an RU 240, a non-RT RIC 250, and/or a Near-RT RIC 270. In some aspects, the SMO Framework 260 may communicate with a hardware aspect of a 4G RAN, a 5G NR RAN, and/or a 6G RAN, such as an open eNB (O-eNB) 280, via an O1 interface. Additionally or alternatively, the SMO Framework 260 may communicate directly with each of one or more RUs 240 via a respective O1 interface. In some deployments, this configuration can enable each DU 230 and the CU 210 to be implemented in a cloud-based RAN architecture, such as a vRAN architecture.

The Non-RT RIC 250 may include or may implement a logical function that enables non-real-time control and optimization of RAN elements and resources, AI/ML workflows including model training and updates, and/or policy-based guidance of applications and/or features in the Near-RT RIC 270. The Non-RT RIC 250 may be coupled to or may communicate with (such as via an A1 interface) the Near-RT RIC 270. The Near-RT RIC 270 may include or may implement a logical function that enables near-real-time control and optimization of RAN elements and resources via data collection and actions via an interface (such as via an E2 interface) connecting one or more CUs 210, one or more DUs 230, and/or an O-eNB 280 with the Near-RT RIC 270.

In some aspects, to generate AI/ML models to be deployed in the Near-RT RIC 270, the Non-RT RIC 250 may receive parameters or external enrichment information from external servers. Such information may be utilized by the Near-RT RIC 270 and may be received at the SMO Framework 260 or the Non-RT RIC 250 from non-network data sources or from network functions. In some examples, the Non-RT RIC 250 or the Near-RT RIC 270 may tune RAN behavior or performance. For example, the Non-RT RIC 250 may monitor long-term trends and patterns for performance and may employ AI/ML models to perform corrective actions via the SMO Framework 260 (such as reconfiguration via an O1 interface) or via creation of RAN management policies (such as A1 interface policies).

The network node 110, the processing system 145 of the network node 110, the UE 120, the processing system 140 of the UE 120, the CU 210, the DU 230, the RU 240, or any other component(s) of FIG. 1 and/or FIG. 2 may implement one or more techniques or perform one or more operations associated with power control for a unified transmission configuration indication based multiple transmission reception point configuration, as described in more detail elsewhere herein. For example, the processing system 145 of the network node 110, the processing system 140 of the UE 120, the CU 210, the DU 230, or the RU 240 may perform or direct operations of, for example, process 1000 of FIG. 10, process 1100 of FIG. 11, or other processes as described herein (alone or in conjunction with one or more other processors). Memory of the network node 110 may store data and program code (or instructions) for the network node 110, the CU 210, the DU 230, or the RU 240. In some examples, the memory of the network node 110 may store data relating to a UE 120, such as RRC state information or a UE context. Memory of a UE 120 may store data and program code (or instructions) for the UE 120, such as context information. In some examples, the memory of the UE 120 or the memory of the network node 110 may include a non-transitory computer-readable medium storing a set of instructions for wireless communication. For example, the set of instructions, when executed by one or more processors (for example, of the processing system 145 or the processing system 140) of the network node 110, the UE 120, the CU 210, the DU 230, or the RU 240, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, the UE 120 includes means for receiving, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state; and/or means for communicating using the first power control parameter or the second power control parameter based at least in part on whether the communication includes one or more SBFD symbols or one or more non-SBFD symbols.

In some aspects, the network node 110 includes means for transmitting, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state; and/or means for communicating with the UE using the first power control parameter or the second power control parameter based at least in part on whether the communication includes one or more SBFD symbols or one or more non-SBFD symbols.

Figure 3:
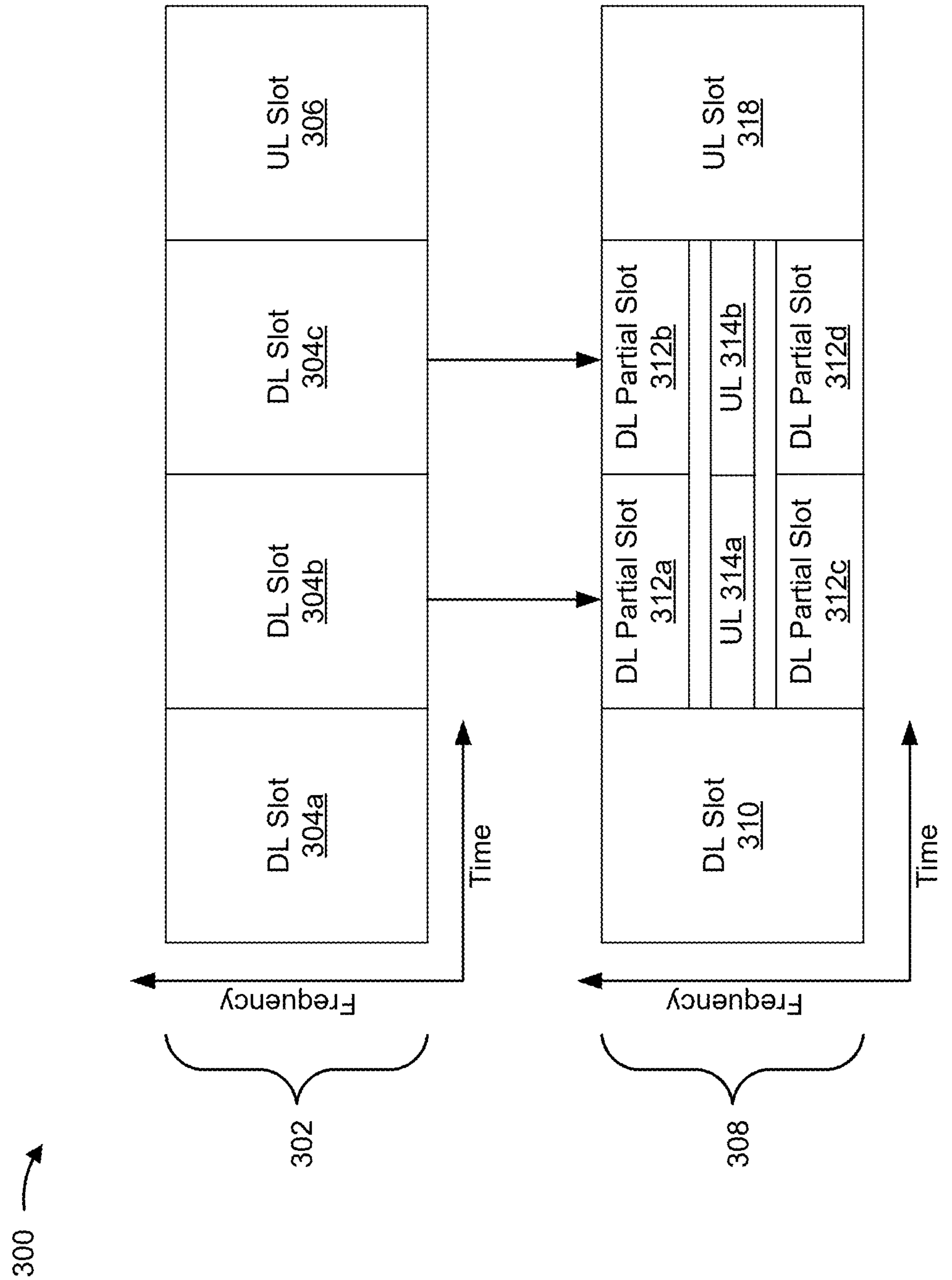
FIG. 3 is a diagram illustrating an example of sub-band full duplex (SBFD) activation, in accordance with the present disclosure.

FIG. 3 is a diagram illustrating an example 300 of sub-band full duplex (SBFD) activation, in accordance with the present disclosure. As shown in FIG. 3, example 300 includes a first configuration 302. In some aspects, the first configuration 302 may indicate a first slot format pattern (sometimes called a TDD pattern) associated with a half-duplex mode or a full-duplex mode. The first slot format pattern may include a quantity of downlink slots (e.g., three downlink slots 304*a*, 304*b*, and 304*c*, as shown), a quantity of flexible slots (not shown), and/or a quantity of uplink slots (e.g., one uplink slot 306, as shown). The first slot format pattern may repeat over time. In some aspects, a network node 110 may indicate the first slot format pattern to a UE 120 using one or more slot format indicators. A slot format indicator, for a slot, may indicate whether that slot is an uplink slot, a downlink slot, or a flexible slot, among other examples.

A network node 110 may instruct (e.g., using an indication, such as a radio resource control (RRC) message, a medium access control (MAC) control element (CE) (MAC-CE), or downlink control information (DCI)) a UE 120 to switch from the first configuration 302 to a second configuration 308. As an alternative, the UE 120 may indicate to the network node 110 that the UE 120 is switching from the first configuration 302 to the second configuration 308. The second configuration 308 may indicate a second slot format pattern that repeats over time, similar to the first slot format pattern. In any of the aspects described above, the UE 120 may switch from the first configuration 302 to the second configuration 308 during a time period (e.g., a quantity of symbols and/or an amount of time (e.g., in ms)) based at least in part on an indication received from the network node 110 (e.g., before switching back to the first configuration 302). During that time period, the UE 120 may communicate using the second slot format pattern, and then may revert to using the first slot format pattern after the end of the time period. The time period may be indicated by the network node 110 (e.g., in the instruction to switch from the first configuration 302 to the second configuration 308, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologies (e.g., represented by $\mu$ and associated with corresponding SCSs) with corresponding time periods for switching configurations.

In example 300, the second slot format pattern includes two SBFD slots in place of what were downlink slots in the first slot format pattern. In example 300, each SBFD slot includes a partial slot (e.g., a portion or sub-band of a frequency allocated for use by the network node 110 and the UE 120) for downlink (e.g., partial slots 312*a*, 312*b*, 312*c*, and 312*d*, as shown) and a partial slot for uplink (e.g., partial slots 314*a* and 314*b*, as shown). Accordingly, the UE 120 may operate using the second slot format pattern to transmit an uplink communication in an earlier slot (e.g., the second slot in sequence, shown as partial UL slot 314*a*) as compared to using the first slot format pattern (e.g., the fourth slot in sequence, shown as UL slot 306). Other examples may include additional or alternative changes. For example, the second configuration 308 may indicate an SBFD slot in place of what was an uplink slot in the first configuration 302 (e.g., UL slot 306). In another example, the second configuration 308 may indicate a downlink slot or an uplink slot in place of what was an SBFD slot in the first configuration 302 (not shown in FIG. 3). In yet another example, the second configuration 308 may indicate a downlink slot or an uplink slot in place of what was an uplink slot or a downlink slot, respectively, in the first configuration 302. An "SBFD slot" may refer to a slot in which an SBFD format is used. An SBFD format may include a slot format in which full duplex communication is supported (e.g., for both uplink and downlink communications), with one or more frequencies used for an uplink portion of the slot being separated from one or more frequencies used for a downlink portion of the slot by a guard band. In some aspects, the SBFD format may include a single uplink portion and a single downlink portion separated by a guard band. In some aspects, the SBFD format may include multiple downlink portions and a single uplink portion that is separated from the multiple downlink portions by respective guard bands (e.g., as shown in FIG. 3). In some aspects, an SBFD format may include multiple uplink portions and a single downlink portion that is separated from the multiple uplink portions by respective guard bands. In some aspects, the SBFD format may include multiple uplink portions and multiple downlink portions, where each uplink portion is separated from a downlink portion by a guard band. In some aspects, operating using an SBFD mode may include activating or using an FD mode in one or more slots based at least in part on the one or more slots having the SBFD format. A slot may support the SBFD mode if an UL BWP and a DL BWP are permitted to be or are simultaneously active in the slot in an SBFD fashion (e.g., with guard band separation).

By switching from the first configuration 302 to the second configuration 308, the network node 110 and the UE 120 may experience increased quality and/or reliability of communications. For example, the network node 110 and the UE 120 may experience increased throughput (e.g., using a full-duplex mode), reduced latency (e.g., the UE 120 may be able to transmit an uplink and/or a downlink communication sooner using the second configuration 308 rather than the first configuration 302), and increased network resource utilization (e.g., by using both the DL BWP and the UL BWP simultaneously instead of only the DL BWP or the UL BWP).

As indicated above, FIG. 3 is provided as an example. Other examples may differ from what is described with respect to FIG. 3.

Figure 4:
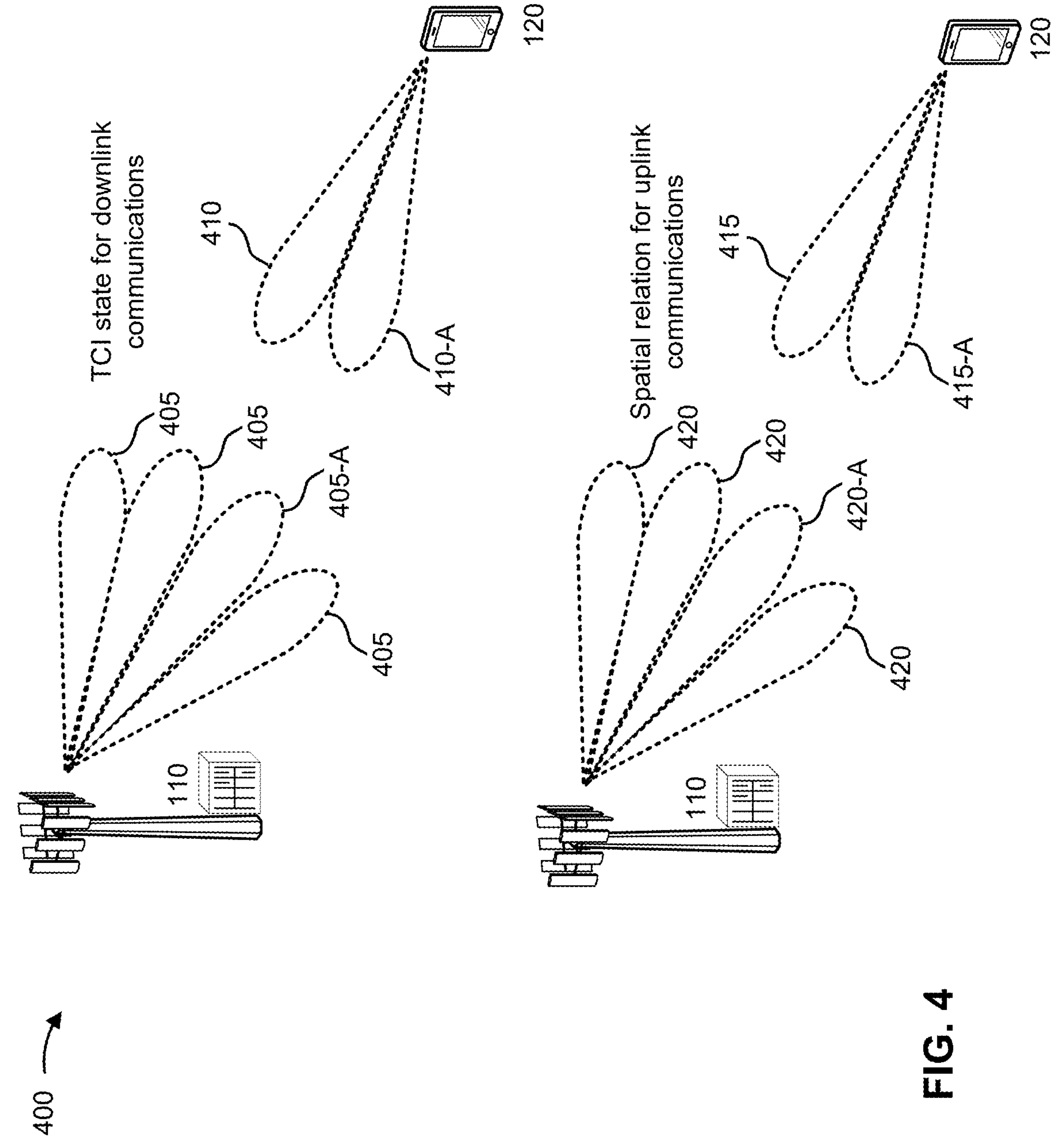
FIG. 4 is a diagram illustrating an example of using beams for communications between a network node and a user equipment (UE), in accordance with the present disclosure.

FIG. 4 is a diagram illustrating an example 400 of using beams for communications between a network node and a UE, in accordance with the present disclosure. As shown in FIG. 4, a network node 110 and a UE 120 may communicate with one another.

The network node 110 may transmit to UEs 120 located within a coverage area of the network node 110. The network node 110 and the UE 120 may be configured for beamformed communications, where the network node 110 may transmit in the direction of the UE 120 using a directional NN transmit beam (e.g., a BS transmit beam), and the UE 120 may receive the transmission using a directional UE receive beam. Each NN transmit beam may have an associated beam ID, beam direction, or beam symbols, among other examples. The network node 110 may transmit downlink communications via one or more NN transmit beams 405.

The UE 120 may attempt to receive downlink transmissions via one or more UE receive beams 410, which may be configured using different beamforming parameters at receive circuitry of the UE 120. The UE 120 may identify a particular NN transmit beam 405, shown as NN transmit beam 405-A, and a particular UE receive beam 410, shown as UE receive beam 410-A, that provide relatively favorable performance (for example, that have a best channel quality of the different measured combinations of NN transmit beams 405 and UE receive beams 410). In some examples, the UE 120 may transmit an indication of which NN transmit beam 405 is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam 405-A and the UE receive beam 410-A), which may be further refined and maintained in accordance with one or more established beam refinement procedures.

A downlink beam, such as an NN transmit beam 405 or a UE receive beam 410, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each NN transmit beam 405 may be associated with a synchronization signal block (SSB), and the UE 120 may indicate a preferred NN transmit beam 405 by transmitting uplink transmissions in resources of the SSB that are associated with the preferred NN transmit beam 405. A particular SSB may have an associated TCI state (for example, for an antenna port or for beamforming). The network node 110 may, in some examples, indicate a downlink NN transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the network node 110 indicating an NN transmit beam 405 via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a physical downlink shared channel (PDSCH). The set of activated TCI states for downlink control channel communications may correspond to beams that the network node 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams 415.

The network node 110 may receive uplink transmissions via one or more NN receive beams 420 (e.g., BS receive beams). The network node 110 may identify a particular UE transmit beam 415, shown as UE transmit beam 415-A, and a particular NN receive beam 420, shown as NN receive beam 420-A, that provide relatively favorable performance (for example, that have a best channel quality of the different measured combinations of UE transmit beams 415 and NN receive beams 420). In some examples, the network node 110 may transmit an indication of which UE transmit beam 415 is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam 415-A and the NN receive beam 420-A), which may be further refined and maintained in accordance with one or more established beam refinement procedures. An uplink beam, such as a UE transmit beam 415 or an NN receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

Figure 5:
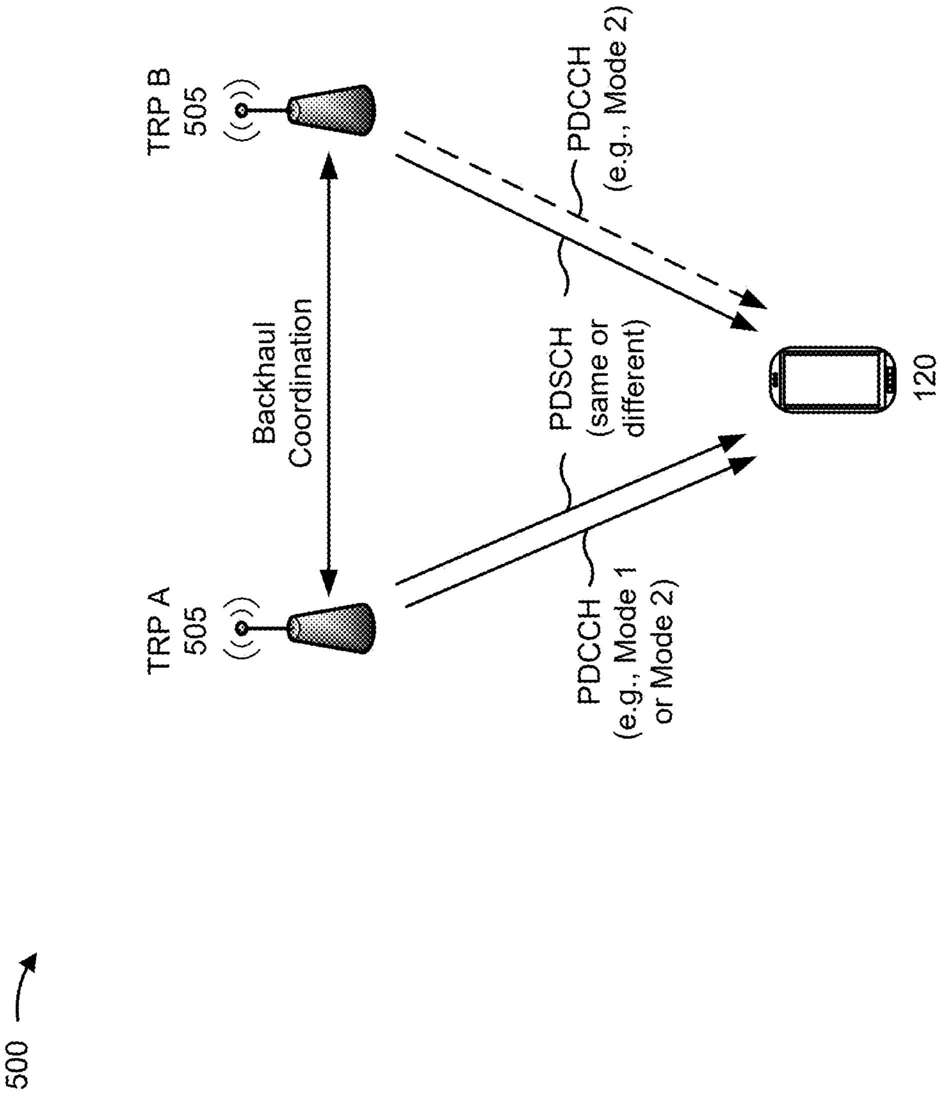
FIG. 5 is a diagram illustrating an example of multiple transmission reception point (mTRP) communications, in accordance with the present disclosure.

FIG. 5 is a diagram illustrating an example 500 of mTRP communications, in accordance with the present disclosure. As shown in FIG. 5, multiple TRPs 505 may communicate with the same UE 120. In some cases, a TRP may correspond to the network node 110 described above in connection with FIG. 1. For example, different TRPs may be included in different network nodes 110. Additionally, or alternatively, multiple TRPs may be included in a single network node 110. In some aspects, the network node 110 may include a CU (e.g., an access node controller) and/or one or more DUs (e.g., one or more TRPs). In some cases, a TRP may be referred to as a cell, a panel, an antenna array, or an array.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller). The interface may have a smaller delay and/or higher capacity when the TRPs 505 are co-located at the same network node 110 (e.g., when the TRPs 505 are different antenna arrays or panels of the same network node 110), and may have a larger delay and/or lower capacity (as compared to co-location) when the TRPs 505 are located at different network nodes 110. The different TRPs 505 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
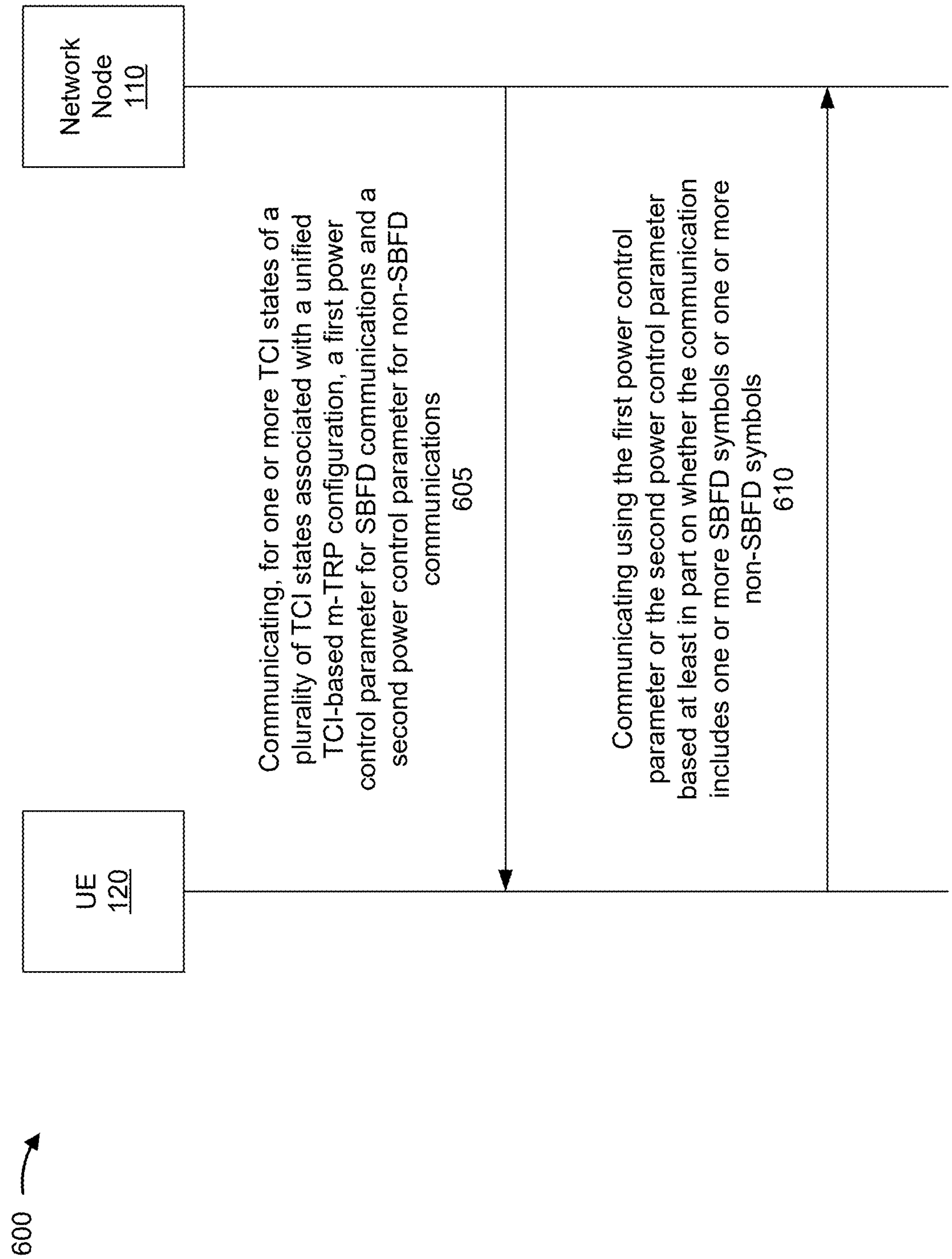
FIG. 6 is a diagram illustrating an example method of power control for a unified transmission configuration indication (TCI) based mTRP configuration, in accordance with the present disclosure.

FIG. 6 is a diagram illustrating an example method 600 of power control for a unified transmission configuration indication based multiple transmission reception point configuration, in accordance with the present disclosure.

As shown by reference number 605, the network node 110 may transmit, and the UE 120 may receive, for one or more TCI states of a plurality of TCI states associated with a unified TCI-based mTRP configuration, a first power control parameter and a second power control parameter. The first power control parameter may be for SBFD communications and the second power control parameter may be for non-SBFD communications. The plurality of TCI states may include a downlink (DL) TCI state, an uplink (UL) TCI state, and/or a joint TCI state (for example, a joint UL/DL TCI state).

As shown by reference number 610, the UE 120 and the network node 110 may communicate using the first power control parameter or the second power control parameter based at least in part on whether the communication includes one or more SBFD symbols or one or more non-SBFD symbols (such as half-duplex symbols). For example, the UE 120 may transmit the communication to the network node 110 using the first power control parameter in accordance with the communication including one or more SBFD symbols. Alternatively, the UE 120 may transmit the communication to the network node 110 using the second power control parameter in accordance with the communication including one or more non-SBFD symbols.

In some aspects, each TCI state may be configured with up to two sets of power control (PC) parameters, where each PC set is associated with a specific duplex type (SBFD or non-SBFD). For example, each TCI state may be configured with a single set of PC parameters or may be configured with two sets of PC parameters. The TCI states may be joint DL/UL TCI or UL-only TCI. The PC parameters may include, for example, a P0 value, an alpha value, and/or closed-loop power index value, among other examples. Additionally, or alternatively, a TCI state can be configured with different pathloss (PL) reference signals (RSs) (collectively, PL-RSs) for SBFD and non-SBFD, which can be used for UL transmissions in SBFD symbols. In some aspects, the UE may utilize (for example, by default) the first set of PC parameters for UL transmission in both SBFD and non-SBFD symbols. In a first example, the network node 110 may configure the UE 120 to perform SBFD transmissions and non-SBFD transmissions using the same UL beam. In this example, the UE 120 may use the same uplink beam (the same TCI state identifier (ID)) for SBFD and non-SBFD transmissions. In a second example, the network node 110 may configure the UE 120 to perform SBFD transmissions and non-SBFD transmissions using different UL beams. In this example, the UE 120 may use different uplink beams (beams having different TCI state IDs) for SBFD and non-SBFD transmissions. Additional details regarding these features are described in connection with FIGS. 7A-7B.

In some aspects, the unified TCI-based mTRP configuration may be a single DCI (sDCI) unified TCI-based mTRP configuration. Additional details regarding these features are described in connection with FIGS. 8A-8B.

In some aspects, a radio resource control (RRC) message may configure multiple UL TCI states or DL/joint TCI states for the unified TCI framework. In some aspects, the UE 120 may receive two TCI state activation or deactivation medium access control (MAC) control elements (CEs) (collectively, MAC-CEs) that support mTRP. For example, the UE 120 may receive a first TCI state activation or deactivation MAC-CE for SBFD and a second TCI state activation or deactivation MAC-CE for non-SBFD. In a first example, the duplex type (SBFD or non-SBFD) may be indicated (explicitly) by a duplex type field indicator included in the MAC-CE to indicate whether the activated TCI state is for SBFD symbols or non-SBFD symbols. In a second example, the duplex type may be implicitly determined based at least in part on one or more rules and/or based at least in part on a slot type of a slot in which the MAC-CE is received. In this example, the DCI may indicate whether a TCI codepoint is from an SBFD MAC-CE or a non-SBFD MAC-CE. In some cases, one MAC-CE may be used for TCI state activation or deactivation for joint TCI and another MAC-CE may be used for TCI state activation or deactivation for separate TCI. The two MAC-CEs for SBFD and non-SBFD can be both for joint TCI, both for separate TCI, or one for joint TCI and one for separate TCI. Additional details regarding these features are described in connection with FIGS. 8C-8D.

In some aspects, DCI may enable separate unified TCIs for UL channels or reference signals in SBFD and non-SBFD symbols in different slots, and/or may enable separate unified TCIs for DL and/or UL channels or reference signals in SBFD and non-SBFD symbols in different slots. In a first example, the DCI may include an explicit duplex indicator. For example, the DCI may include one TCI codepoint and may include one bit field duplex type indicator to indicate whether the indicated TCI state is for SBFD symbols from an SBFD MAC-CE or non-SBFD symbols from a non-SBFD MAC-CE. In a second example, the DCI may include an implicit indicator. For example, the DCI may include one TCI codepoint identifying the TCI state. The associated duplex type(s) of the TCI codepoint may be identified based at least in part on the slot/symbols of scheduled data (PDSCH or PUSCH) and/or based at least in part on the slot type in which the DCI is received. In a third example, the DCI may include an alternate implicit indicator. For example, the DCI may indicate one TCI codepoint using two bits, where the left bit may be used as the duplex type indicator to indicate whether the indicated TCI state is for SBFD symbols from an SBFD MAC-CE or non-SBFD symbols from a non-SBFD MAC-CE.

In some aspects, in accordance with an RRC message configuring multiple UL TCI states, DL TCI states, or joint TCI states under a unified TCI framework, the UE 120 may receive two TCI state activation or deactivation MAC-CEs that support mTRP. For example, the UE 120 may receive a first TCI state activation or deactivation MAC-CE for SBFD and a second TCI state activation or deactivation MAC-CE for non-SBFD. Each MAC-CE may activate one or more codepoints (with up to two TCI states per codepoint) that are applicable for SBFD or non-SBFD. A reserved bit ("R") may be used as the indication. For example, a first value of R (R=0) indicates that the UE 120 is to receive two MAC-CEs, one per each duplex type. Alternatively, a second value of R (R=1) indicates that the MAC-CE that is for SBFD symbols has additional payloads or octets that append more TCI states or codepoints for non-SBFD symbols. For example, if the network node 110 does not schedule traffic for DL in SBFD symbols but only schedules UL traffic in an UL subband, then there is no interference in this case and the optimum beam/UL TCI state for non-SBFD symbol can be used with a network node indication via DCI. Additional details regarding these features are described in connection with FIG. 8E.

In some aspects, in accordance with an RRC message configuring multiple UL TCI states, DL TCI states, or joint TCI states under a unified TCI framework, the UE 120 may receive a single TCI state activation or deactivation MAC-CE that supports mTRP, that activates multiple TCI codepoints for SBFD and non-SBFD symbols, and that indicates whether one or more TCI codepoints of the multiple TCI codepoints are applicable for SBFD or non-SBFD symbols. The UE may implicitly apply corresponding duplex TCI state(s) based at least in part on the SBFD time configuration indication. The single TCI codepoint may map to up to two TCI states. In some aspects, the UE 120 may implicitly apply a corresponding duplex TCI state based at least in part on an SBFD time configuration indication. A single TCI codepoint may map to one TCI state or may map to two TCI states. In some aspects, the RRC message may configure MAC-CE activation or deactivation with up to 16 codepoints (for example, 8 codepoints for SBFD and 8 codepoints for non-SBFD). Additionally, or alternatively, a MAC-CE with a sub-header including a logical channel identifier (LCID) may be used. Additional details regarding these features are described in connection with FIGS. 8F-8G.

In some aspects, in accordance with an RRC message configuring multiple UL TCI states, DL TCI states, or joint TCI states under a unified TCI framework, the UE 120 may receive a single MAC-CE that activates a TCI codepoint that maps to 8 TCI states for mTRP and for SBFD and/or non-SBFD. In this example, the TCI codepoint is mapped to one or two sets of DL/UL or joint TCIs for SBFD and non-SBFD, respectively. Two duplex indicators may be used per TCI codepoint. The up to 8 TCI states may be, for example, {DL-SBFD, UL-SBFD} and {DL non-SBFD, UL-non-SBFD} for each TRP for separate UL/DL, or a subset of the TCI states (e.g., {DL-SBFD, UL-SBFD} and {UL-non-SBFD}). For example, 4 TCI states may be used for {DL-SBFD, UL-SBFD}TCI states for SBFD symbols for each TRP. Additional details regarding these features are described in connection with FIGS. 8H-8I.

In some aspects, the unified TCI-based mTRP configuration may be a multiple DCI (mDCI) unified TCI-based mTRP configuration.

In some aspects, DCI may enable separate unified TCIs for UL channels or reference signals in SBFD and non-SBFD symbols in different slots, and/or may enable separate unified TCIs for DL and/or UL channels or reference signals in SBFD and non-SBFD symbols in different slots. In some aspects, an RRC message may configure two TCI pools for SBFD and non-SBFD symbols (for example, a joint TCI pool for non-SBFD symbols), may configure separate TCI pools for SBFD symbols, and/or may include a duplex type field, such as a single-bit duplex-type field to indicate SBFD or non-SBFD. In an example with multiple component carriers, the two TCI pools can be configured under a single bandwidth-part (BWP) or component carrier and/or may be indicated by other BWPs or component carriers.

In some aspects, an RRC message may configure multiple UL TCI states or DL/joint TCI states under the unified TCI framework. In some aspects, the UE 120 may receive two TCI state activation or deactivation MAC-CEs that support mTRP. For example, the UE 120 may receive a first TCI state activation or deactivation MAC-CE for SBFD and a second TCI state activation or deactivation MAC-CE for non-SBFD. In a first example, the duplex type (SBFD or non-SBFD) may be indicated (explicitly) by a duplex type field indicator included in the MAC-CE to indicate whether the activated TCI state is for SBFD symbols or non-SBFD symbols. In a second example, the duplex type may be implicitly determined based at least in part on one or more rules and/or based at least in part on a slot type of a slot in which the MAC-CE is received. In this example, the DCI may indicate whether a TCI codepoint is from an SBFD MAC-CE or a non-SBFD MAC-CE. Additional details regarding these features are described in connection with FIG. 9A.

In some aspects, DCI may enable separate unified TCIs for UL channels or reference signals in SBFD and non-SBFD symbols in different slots, and/or may enable separate unified TCIs for DL and/or UL channels or reference signals in SBFD and non-SBFD symbols in different slots. In a first example, the DCI may include an explicit duplex indicator. For example, the DCI may include one TCI codepoint and may include one bit field duplex type indicator to indicate whether the indicated TCI state is for SBFD symbols from an SBFD MAC-CE or non-SBFD symbols from a non-SBFD MAC-CE. In a second example, the DCI may include an alternate explicit indicator. For example, the DCI may indicate one TCI codepoint using two bits (up to 4 TCI states), where the left bit may be used as the duplex type indicator to indicate whether the indicated TCI state is for SBFD symbols from an SBFD MAC-CE or non-SBFD symbols from a non-SBFD MAC-CE. In a third example, the DCI may include an implicit indicator. For example, the DCI may include one TCI codepoint identifying the TCI state. The associated duplex type(s) of the TCI codepoint may be identified based at least in part on the slot/symbols of scheduled data (PDSCH or PUSCH) and/or based at least in part on the slot type in which the DCI is received.

In some aspects, in accordance with an RRC message configuring multiple UL TCI states, DL TCI states, or joint TCI states under a unified TCI framework, the UE 120 may receive two TCI state activation or deactivation MAC-CEs that support mTRP. For example, the UE 120 may receive a first TCI state activation or deactivation MAC-CE for SBFD and a second TCI state activation or deactivation MAC-CE for non-SBFD. Each MAC-CE may activate one or more codepoints (with up to two TCI states per codepoint) that are applicable for SBFD or non-SBFD. A reserved bit ("R") may be used as the indication. For example, a first value of R (R=0) indicates that the UE 120 is to receive two MAC-CEs, one per each duplex type. Alternatively, a second value of R (R=1) indicates that the MAC-CE that is for SBFD symbols has additional payloads or octets that append more TCI states or codepoints for non-SBFD symbols. For example, if the network node 110 does not schedule traffic for DL in SBFD symbols but only schedules UL traffic in an UL subband, then there is no interference in this case and the optimum beam/UL TCI state for non-SBFD symbol can be used with a network node indication via DCI.

In some aspects, in accordance with an RRC message configuring multiple UL TCI states, DL TCI states, or joint TCI states under a unified TCI framework, the UE 120 may receive a single TCI state activation or deactivation MAC-CE that supports mTRP, that activates multiple TCI codepoints for SBFD and non-SBFD symbols, and that indicates whether one or more TCI codepoints of the multiple TCI codepoints are applicable for SBFD or non-SBFD symbols. The UE 120 may implicitly apply corresponding duplex TCI state(s) based at least in part on the SBFD time configuration indication. The single TCI codepoint may map to up to two TCI states. In some aspects, the UE 120 may implicitly apply a corresponding duplex TCI state based at least in part on an SBFD time configuration indication. A single TCI codepoint may map to one TCI state or may map to two TCI states. In some aspects, the RRC message may configure MAC-CE activation or deactivation with up to 16 codepoints (for example, 8 codepoints for SBFD and 8 codepoints for non-SBFD). Additionally, or alternatively, a MAC-CE with a sub-header including a logical channel identifier (LCID) may be used. Additional details regarding these features are described in connection with FIG. 9B.

In some aspects, in accordance with an RRC message configuring multiple UL TCI states, DL TCI states, or joint TCI states under a unified TCI framework, the UE 120 may receive a single MAC-CE that activates a TCI codepoint that maps to 4 TCI states for mTRP and for SBFD and/or non-SBFD. In this example, the TCI codepoint is mapped to one or two sets of DL/UL or joint TCIs for SBFD and non-SBFD, respectively. The up to 4 TCI states may be, for example, {DL-SBFD, UL-SBFD} and {DL non-SBFD, UL-non-SBFD} for each TRP for separate UL/DL, a or subset of the TCI states (e.g., {DL-SBFD, UL-SBFD} and {UL-non-SBFD}). For example, 2 TCI states may be used for {DL-SBFD, UL-SBFD} TCI states for SBFD symbols for each TRP.

In some aspects, as described herein, separate TCI states may be used for SBFD (separate) and non-SBFD (joint). An example of this configuration is shown in Table 1 below, where TCI codepoints 0 and 1 are for both duplex types, TCI codepoint 2 is for SBFD, and TCI codepoint 3 is for non-SBFD:

TABLE 1

| TCI Codepoint | TCI States | Duplex Indicator |
|---|---|---|
| 0 (000) | Joint TCI state 5 | Non-SBFD |
| | DL TCI state 5 | SBFD |
| | UL TCI sate 4 | |
| 1 (001) | Joint TCI state 4 | Non-SBFD |
| | DL TCI state 1 | SBFD |
| | UL TCI state 2 | |
| 2 (010) | DL TCI state 5 | SBFD |
| | UL TCI state 4 | |
| 3 (011) | Joint TCI state 3 | Non-SBFD |

In some aspects, as described herein, the same TCI type (separate) can be used for SBFD and non-SBFD. For example, TCI codepoint 0-2 can indicate the separate UL and/or DL TCI states for both duplex types. Additionally, or alternatively, TCI codepoint 3-4 can indicate separate UL and/or DL TCI states for only a single duplex type. An example of this configuration is shown in Table 2 below, where TCI codepoints 0, 1, and 2 are for both duplex types, and TCI codepoints 3 and 4 are for a single duplex type:

TABLE 2

| TCI Codepoint | TCI States | Duplex Indicator |
|---|---|---|
| 0 (000) | DL TCI state 5 | Non-SBFD |
| | UL TCI state 3 | |
| | DL TCI state 5 | SBFD |
| | UL TCI sate 4 | |
| 1 (001) | DL TCI state 4 | Non-SBFD |
| | DL TCI state 1 | SBFD |
| | UL TCI state 2 | |
| 2 (010) | UL TCI state 4 | Non-SBFD |
| | UL TCI state 3 | SBFD |
| 3 (011) | DL TCI state 5 | SBFD |
| | UL TCI state 4 | |
| 4 (100) | DL TCI state 3 | Non-SBFD |
| | UL TCI state 5 | |

In some aspects, as described herein, each TCI codepoint may include up to four TCI states. For example, a MAC-CE may include a bitmap field per codepoint that is mapped for indicating the presence of each TCI state of each duplex type within the MAC-CE TCI codepoint. The bitmap field may require, for example, 4×8 bits or 3×8 bits. Examples of these configurations are shown in Table 3, Table 4, Table 5, and Table 6 below, where TCI codepoint 0 of Table 3 maps to the first column of Table 4, TCI codepoint 1 of Table 3 maps to the second column of Table 4, TCI codepoint 0 of Table 5 maps to the first column of Table 6, TCI codepoint 1 of Table 5 maps to the second column of Table 6, TCI codepoint 2 of Table 5 maps to the third column of Table 6, and TCI codepoint 3 of Table 5 maps to the fourth column of Table 6.

TABLE 3

| TCI Codepoint | TCI States | Duplex Indicator |
|---|---|---|
| 0 (000) | DL TCI state 5 | Non-SBFD |
| | UL TCI state 3 | |
| | DL TCI state 5 | SBFD |
| | UL TCI sate 4 | |
| 1 (001) | DL TCI state 4 | Non-SBFD |
| | DL TCI state 1 | SBFD |
| | UL TCI state 2 | |

TABLE 4

| (DL-non-SBFD) | (UL-non-SBFD) | (DL-SBFD) | (UL-SBFD) |
|---|---|---|---|
| 1 | 1 | 1 | 1 |
| 1 | 0 | 1 | 1 |

TABLE 5

| TCI Codepoint | TCI States | Duplex Indicator |
|---|---|---|
| 0 (000) | Joint TCI state 5 | Non-SBFD |
| | DL TCI state 5 | SBFD |
| | UL TCI sate 4 | |
| 1 (001) | Joint TCI state 4 | Non-SBFD |
| | DL TCI state 1 | SBFD |
| | UL TCI state 2 | |
| 2 (010) | DL TCI state 5 | SBFD |
| | UL TCI state 4 | |
| 3 (011) | Joint TCI state 3 | SBFD |

TABLE 6

| (Joint DL/UL non-SBFD) | (DL-SBFD) | (UL-SBFD) |
|---|---|---|
| 1 | 1 | 1 |
| 1 | 1 | 1 |
| 0 | 1 | 1 |
| 1 | 0 | 0 |

As indicated above, FIG. 6 is provided as an example. Other examples may differ from what is described with respect to FIG. 6.

Figure 7A:
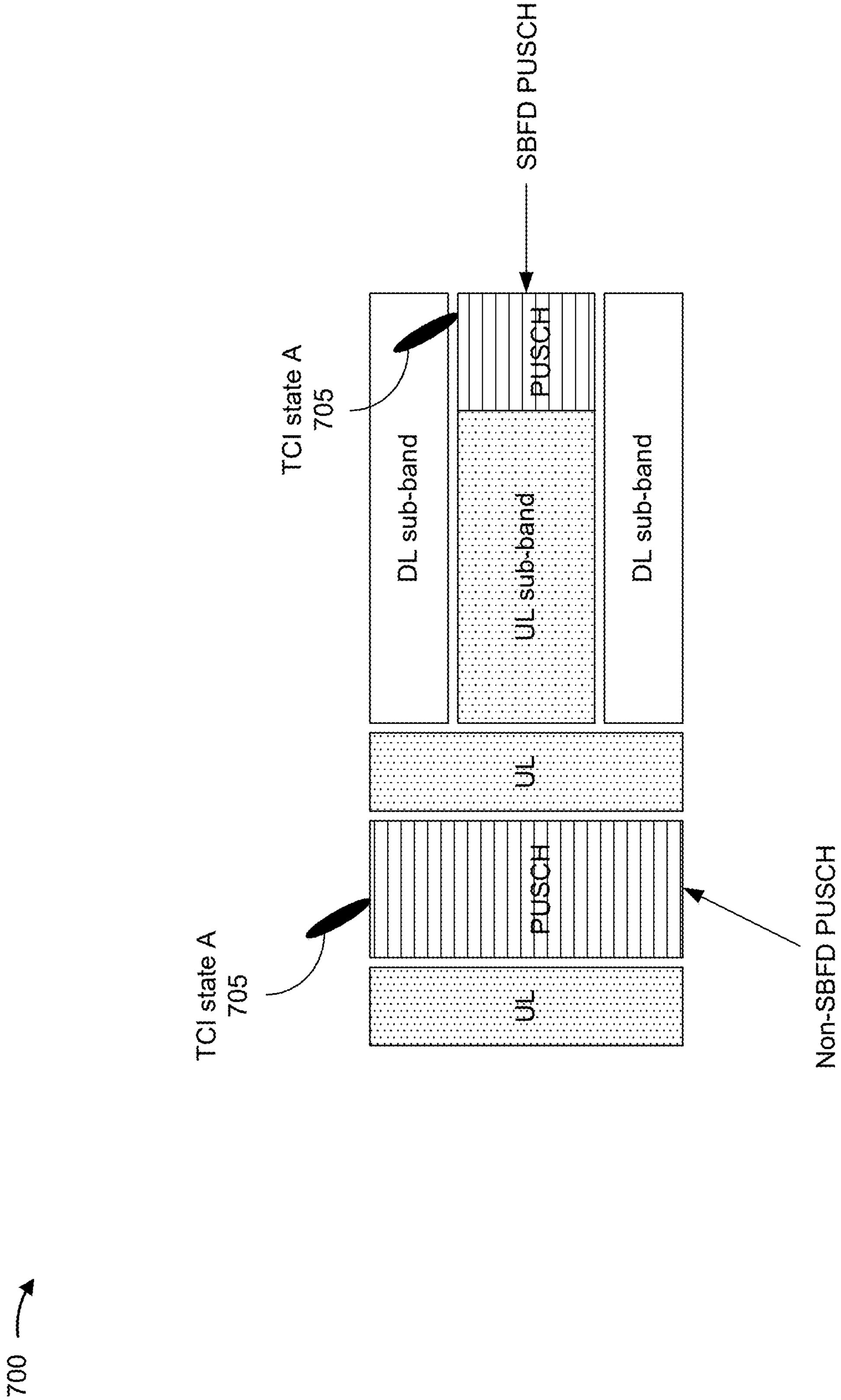
FIGS. 7A-7B are diagrams illustrating examples of uplink beams and TCI states for SBFD and non-SBFD, in accordance with the present disclosure.
Figure 7B:
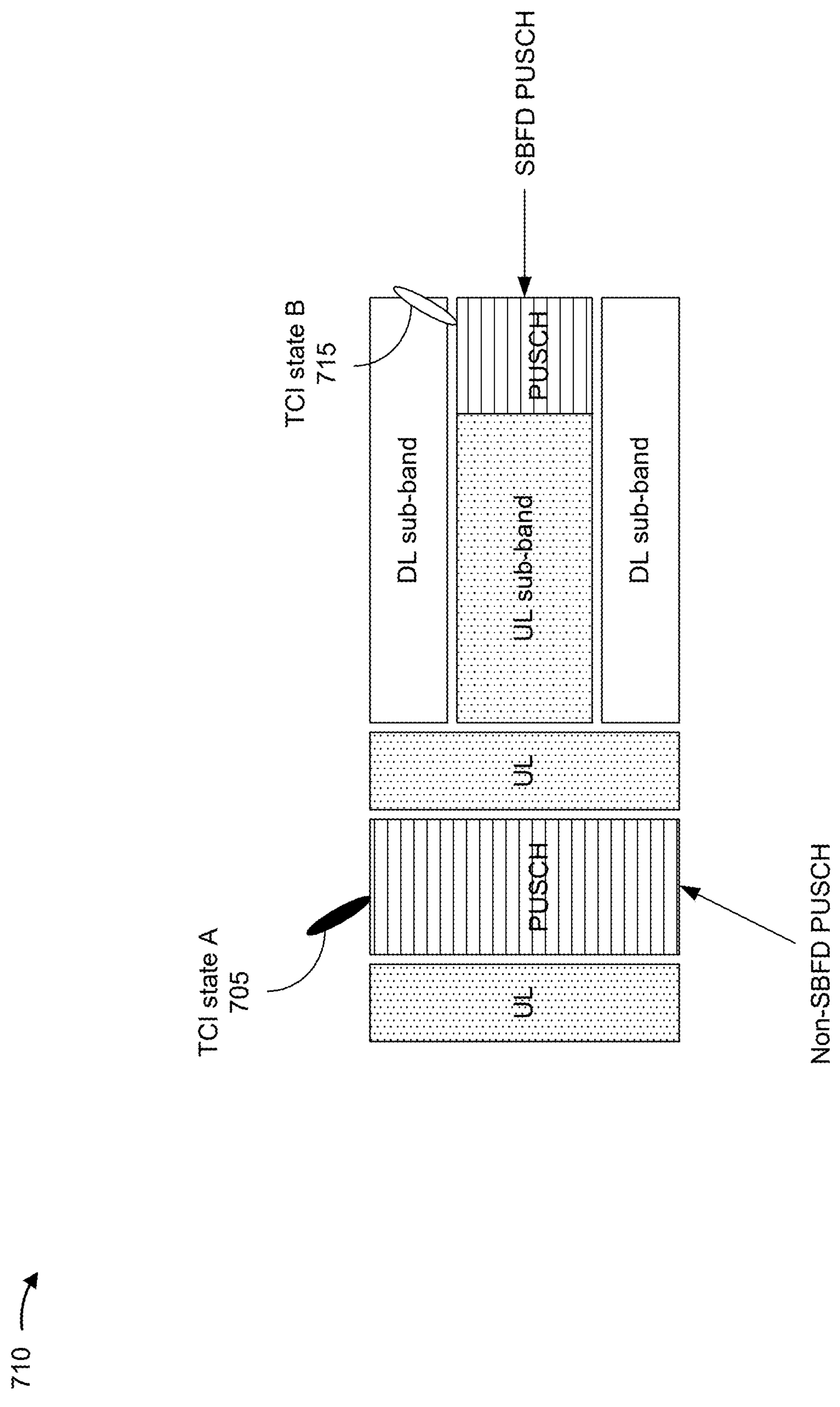

FIGS. 7A-7B are diagrams illustrating examples of uplink beams and TCI states for SBFD and non-SBFD, in accordance with the present disclosure.

As shown in FIG. 7A and example 700, a same uplink beam may be used for non-SBFD transmissions and for SBFD transmissions. For example, an uplink beam having the TCI state A 705, and associated with a first set of PC parameters, may be used for non-SBFD transmissions. Additionally, an uplink beam having the TCI state A 705, and associated with a second set of PC parameters, may be used for SBFD transmissions.

As shown in FIG. 7B and example 710, different uplink beams may be used for non-SBFD transmissions and for SBFD transmissions. For example, the uplink beam having the TCI state A 705, and associated with a first set of PC parameters, may be used for non-SBFD transmissions. Alternatively, an uplink beam having a TCI state B 715, and associated with a second set of PC parameters, may be used for SBFD transmissions.

As indicated above, FIGS. 7A-7B are provided as examples. Other examples may differ from what is described with respect to FIGS. 7A-7B.

FIGS. 8A-8I are diagrams illustrating examples of single DCI-based mTRP transmissions, in accordance with the present disclosure.

As shown in FIG. 8A and example 800, an sDCI based mTRP MAC-CE format may be used for joint TCI states. The MAC-CE may include one or more fields. An $F_{i,j}$ field may indicate, for the TCI state ID fields associated with the codepoint i of the DCI Transmission Configuration Indication field, whether the j-th joint TCI state is present or not, where j=1, 2. If the $F_{i,j}$ field is set to 1, it indicates that the j-th joint TCI state for codepoint i is present. If $F_{i,j}$ field is set to 0, it indicates that the j-th joint TCI state for codepoint i is absent. The codepoint to which a TCI state is mapped may be determined by the ordinal position among all the TCI state ID fields.

As shown in FIG. 8B and example 805, an sDCI based mTRP MAC-CE format may be used for separate TCI states. The MAC-CE may include one or more fields. An $F_{i,j}$ field may indicate, for the TCI state ID fields associated with the codepoint i of the DCI Transmission Configuration Indication field, whether the j-th DL TCI state is present or not, where j=1, 2. If the $F_{i,j}$ field is set to 1, it indicates that the j-th DL TCI state for codepoint i is present. If $F_{i,j}$ field is set to 0, it indicates that the j-th DL TCI state for codepoint i is absent. Additionally, or alternatively, an $S_{i,j}$ field indicates, for the TCI state ID fields associated with the codepoint i of the DCI Transmission Configuration Indication field, whether the j-th UL TCI state is present or not, where j=1, 2. If the $S_{i,j}$ field is set to 1, it indicates that the j-th UL TCI state for codepoint i is present. If $S_{i,j}$ field is set to 0, it indicates that the j-th UL TCI state for codepoint i is absent.

Figure 8C:
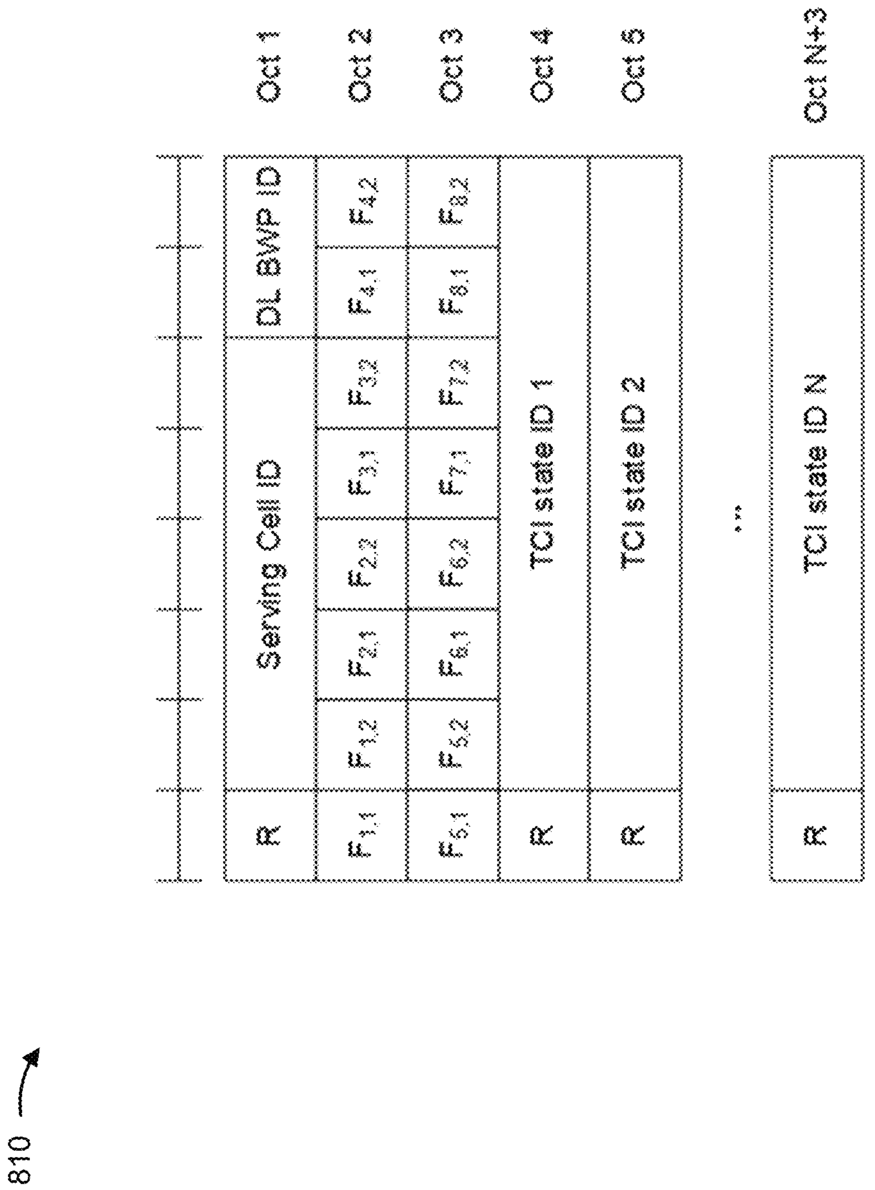

As shown in FIG. 8C and example 810, an sDCI based mTRP MAC-CE format may be used for joint TCI states.

The MAC-CE may utilize one of the reserved bit fields (R) to indicate whether the MAC-CE indicates SBFD-specific TCI states or non-SBFD specific TCI states. The UE may receive separate MAC-CEs. Each MAC-CE can activate up to 8 TCI codepoints for each duplex mode. Additional details regarding these features are shown in Table 7 and Table 8 below, where two joint TCI states indicate a first TRP and a second TRP, respectively.

TABLE 7

(R = 0 (SBFD) Example)

| TCI Codepoint | TCI States |
|---|---|
| 0 (000) | joint TCI state 5 |
| | joint TCI state 4 |
| 1 (001) | joint TCI state 2 |
| 2 (010) | joint TCI state 5 |
| | joint TCI state 3 |
| 3 (011) | joint TCI state 4 |

TABLE 8

(R = 1 (non-SBFD) Example)

| TCI Codepoint | TCI States |
|---|---|
| 0 (000) | joint TCI state 1 |
| | joint TCI state 5 |
| 1 (001) | joint TCI state 4 |
| | joint TCI state 5 |
| 2 (010) | joint TCI state 4 |
| 3 (011) | joint TCI state 2 |

As shown in FIG. 8D and example 815, an sDCI based mTRP MAC-CE format may be used for separate TCI states. The MAC-CE may utilize one of the reserved bit fields (R) to indicate whether the MAC-CE indicates SBFD-specific TCI states or non-SBFD specific TCI states. The UE may receive separate MAC-CEs. Each MAC-CE may activate up to 8 TCI codepoints for each duplex mode. Additional details regarding these features are shown in Table 9 and Table 10 below, where two DL TCI states indicate a first TRP and two UL TCI states indicate a second TRP, respectively.

TABLE 9

(R = 0 (SBFD) Example)

| TCI Codepoint | TCI States |
|---|---|
| 0 (000) | DL TCI state 5 |
| | DL TCI state 3 |
| | UL TCI state 5 |
| | UL TCI sate 4 |
| 1 (001) | DL TCI state 5 |
| | DL TCI sate 4 |
| | UL TCI state 1 |
| | UL TCI sate 3 |
| 2 (010) | DL TCI state 5 |
| | UL TCI sate 4 |
| 3 (011) | DL TCI state 3 |
| | UL TCI sate 2 |

TABLE 10

(R = 1 (non-SBFD) Example)

| TCI Codepoint | TCI States |
|---|---|
| 0 (000) | DL TCI state 5 |
| | DL TCI sate 4 |
| | UL TCI state 7 |
| | UL TCI sate 6 |
| 1 (001) | DL TCI state 5 |
| | UL TCI sate 4 |
| 2 (010) | DL TCI state 5 |
| | UL TCI sate 3 |
| 3 (011) | DL TCI state 4 |
| | DL TCI sate 3 |
| | UL TCI state 2 |
| | UL TCI sate 8 |

Figure 8E:
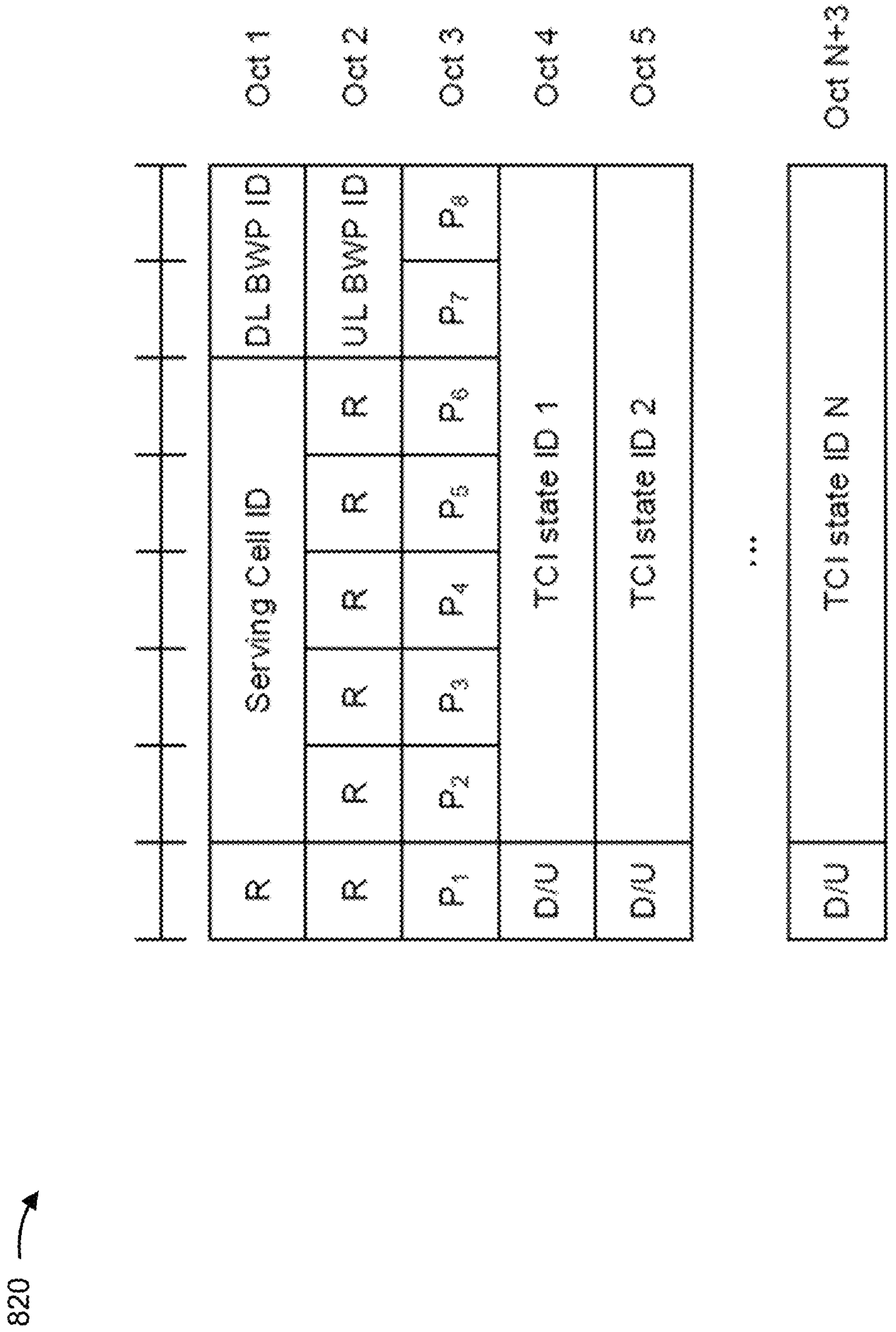

As shown in FIG. 8E and example 820, a duplex specific MAC-CE may be used. If R=0, only SBFD is used as shown in Table 11. Alternatively, if R=1, additional octets may be appended for non-SBFD codepoints, as shown in Table 12.

TABLE 11

| TCI Codepoint | TCI States |
|---|---|
| 0 (000) | DL TCI state 5 |
| 1 (001) | DL TCI state 1 |
| | UL TCI state 2 |
| 2 (010) | DL TCI state 5 |
| | UL TCI state 4 |
| 3 (011) | UL TCI state 4 |

TABLE 12

| TCI Codepoint | TCI States |
|---|---|
| 0 (000) | UL TCI state 1 |
| 1 (001) | DL TCI state 3 |
| | UL TCI state 4 |
| 2 (010) | DL TCI state 4 |
| 3 (011) | DL TCI state 2 |
| | UL TCI state 5 |

Figure 8F:
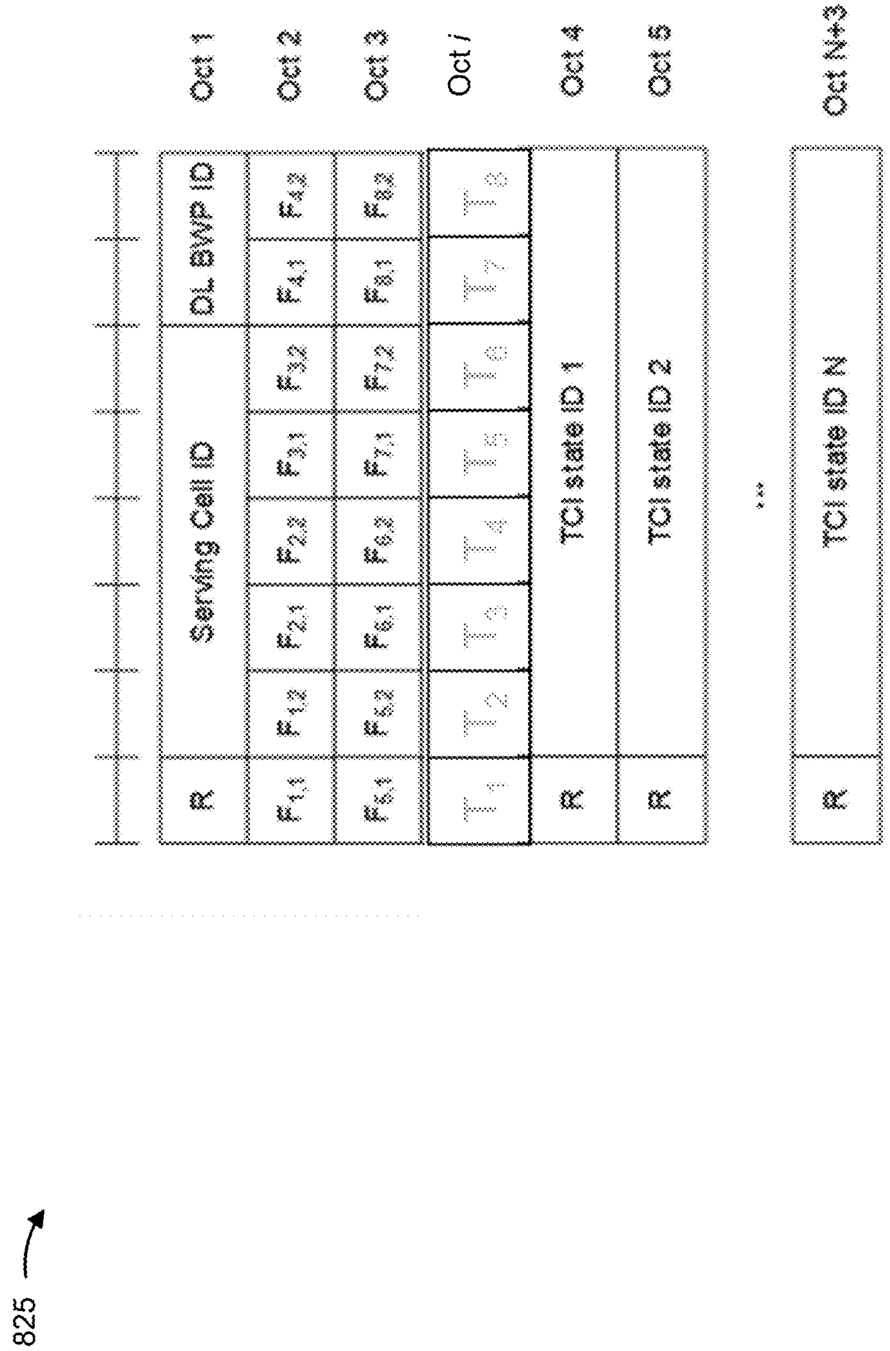

As shown in FIG. 8F and example 825, a bitfield Ti (i=1:8) may be used per codepoint in the MAC-CE field to indicate whether the TCI states of TCI codepoint (i) are applicable for SBFD or non-SBFD. If Ti=0, the TC states of codepoint (i) are SBFD-only. If Ti=1, the TC states of codepoint (i) are non-SBFD only. Additional details are shown in Table 13:

TABLE 13

| TCI Codepoint | TCI States | Duplex Indicator |
|---|---|---|
| 0 (000) | joint TCI state 5 (1st TRP) | Non-SBFD |
| | joint TCI state 4 (2nd TRP) | |
| 1 (001) | joint TCI state 3 (1st TRP) | SBFD |
| 2 (010) | joint TCI state 6 (1st TRP) | SBFD |
| | joint TCI state 2 (2nd TRP) | |
| 3 (011) | joint TCI state 1 (1st TRP) | Non-SBFD |
| | joint TCI state 7 (2nd TRP) | |
| 4 (100) | joint TCI state 8 (1st TRP) | Non-SBFD |
| 5 (101) | joint TCI state 5 (1st TRP) | Non-SBFD |
| | joint TCI state 6 (2nd TRP) | |
| 6 (110) | joint TCI state 7 (1st TRP) | SBFD |
| 7 (111) | joint TCI state 5 (1st TRP) | Non-SBFD |
| | joint TCI state 1 (2nd TRP) | |

Figure 8G:
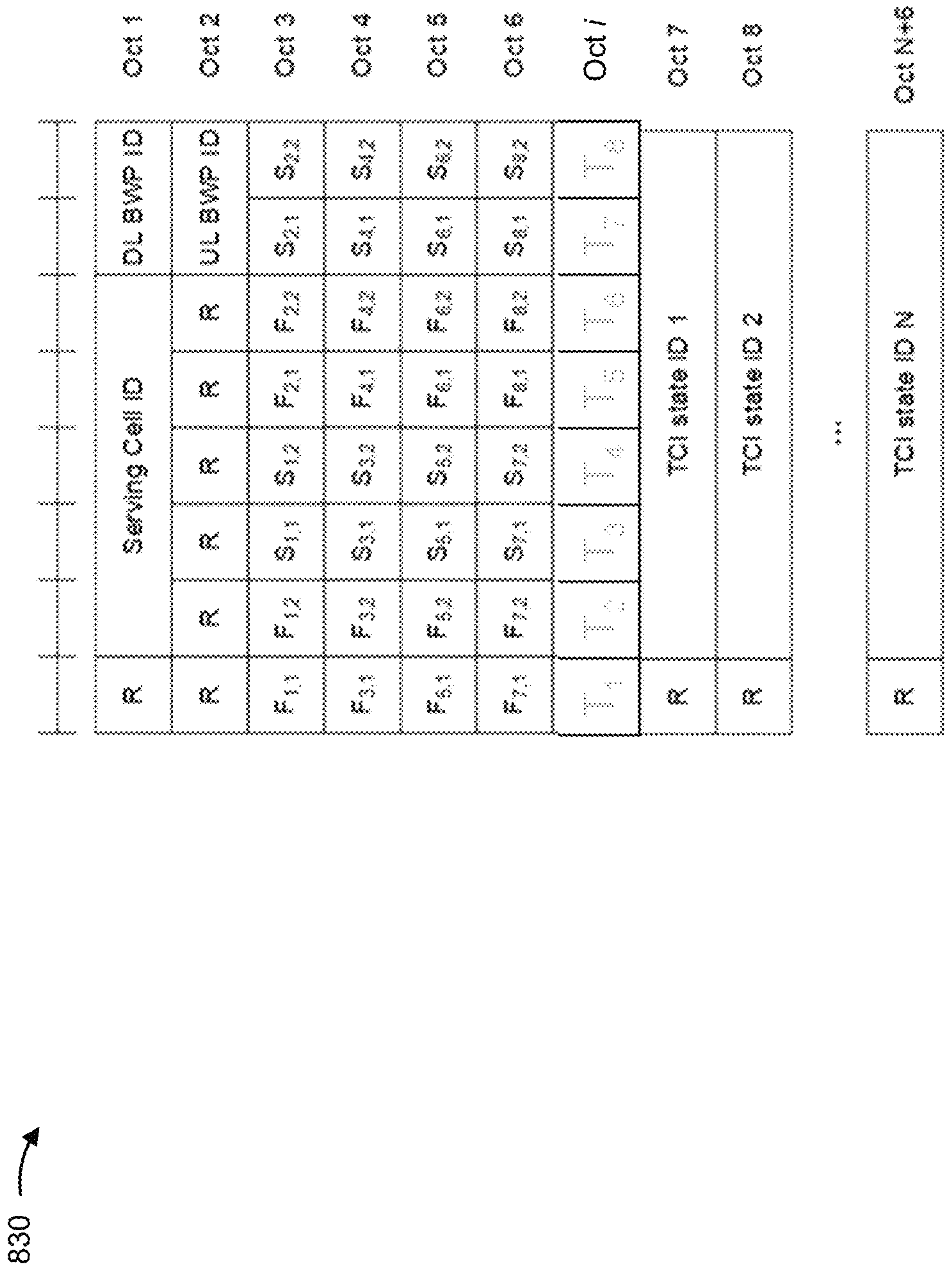

As shown in FIG. 8G and example 830, a bitfield Ti (i=1:8) may be used per codepoint in the MAC-CE field to indicate whether the TCI states of TC codepoint (i) are applicable for SBFD or non-SBFD. If Ti=0, the TCI states of codepoint (i) are SBFD-only. If Ti=1, the TCI states of codepoint (i) are non-SBFD only. Additional details are shown in Table 14.

TABLE 14

| TCI Codepoint | TCI States | Duplex Indicator |
|---|---|---|
| 0 (000) | DL TCI state 5 (1st TRP)<br>DL TCI state 4 (2nd TRP)<br>UL TCI state 1 (1st TRP)<br>UL TCI state 3 (2nd TRP) | Non-SBFD |
| 1 (001) | DL TCI state 7 (1st TRP)<br>DL TCI state 8 (2nd TRP)<br>UL TCI state 1 (1st TRP)<br>UL TCI state 2 (2nd TRP) | SBFD |
| 2 (010) | DL TCI state 5 (1st TRP)<br>UL TCI state 4 (1st TRP) | SBFD |
| 3 (011) | DL TCI state 2 (1st TRP)<br>UL TCI state 3 (1st TRP) | Non-SBFD |
| 4 (100) | DL TCI state 5 (1st TRP)<br>UL TCI state 3 (1st TRP) | Non-SBFD |
| 5 (101) | DL TCI state 6 (1st TRP)<br>UL TCI state 7 (1st TRP) | Non-SBFD |
| 6 (110) | DL TCI state 8 (1st TRP)<br>UL TCI state 2 (1st TRP) | SBFD |
| 7 (111) | DL TCI state 5 (1st TRP)<br>UL TCI state 3 (1st TRP) | Non-SBFD |

Figure 8H:
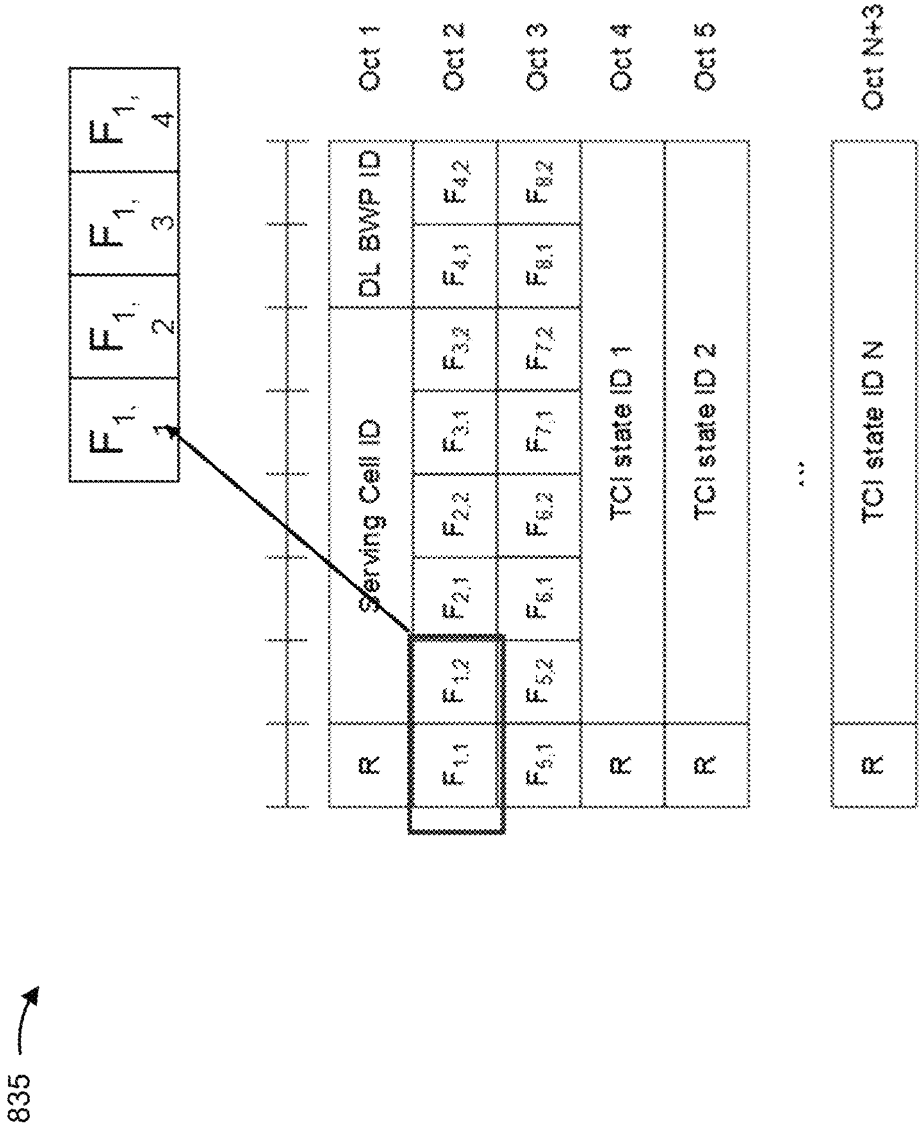

As shown in FIG. 8H and example 835, the $F_{i,j}$ field in the MAC-CE field may be extended from two to four fields to indicate whether the TCI states of TCI codepoint i are applicable for a first TRP and a second TRP for non-SBFD and a first TRP and a second TRP for SBFD of joint TCI states. Additional details are shown in Table 15:

TABLE 15

| TCI Codepoint | TCI States | Duplex Indicator |
|---|---|---|
| 0 (000) | joint TCI state 5 (1st TRP)<br>joint TCI state 4 (2nd TRP) | Non-SBFD |
| | joint TCI state 3 (1st TRP)<br>joint TCI state 2 (2nd TRP) | SBFD |
| 1 (001) | joint TCI state 6 (1st TRP)<br>joint TCI state 3 (2nd TRP) | Non-SBFD |
| | joint TCI state 1 (1st TRP)<br>joint TCI state 5 (2nd TRP) | SBFD |
| 2 (010) | joint TCI state 7 (1st TRP)<br>joint TCI state 8 (2nd TRP) | Non-SBFD |
| | joint TCI state 5 (1st TRP)<br>joint TCI state 3 (2nd TRP) | SBFD |
| 3 (011) | joint TCI state 5 (1st TRP)<br>joint TCI state 4 (2nd TRP) | Non-SBFD |
| | . . . | . . . |
| . . . | . . . | . . . |

Figure 8I:
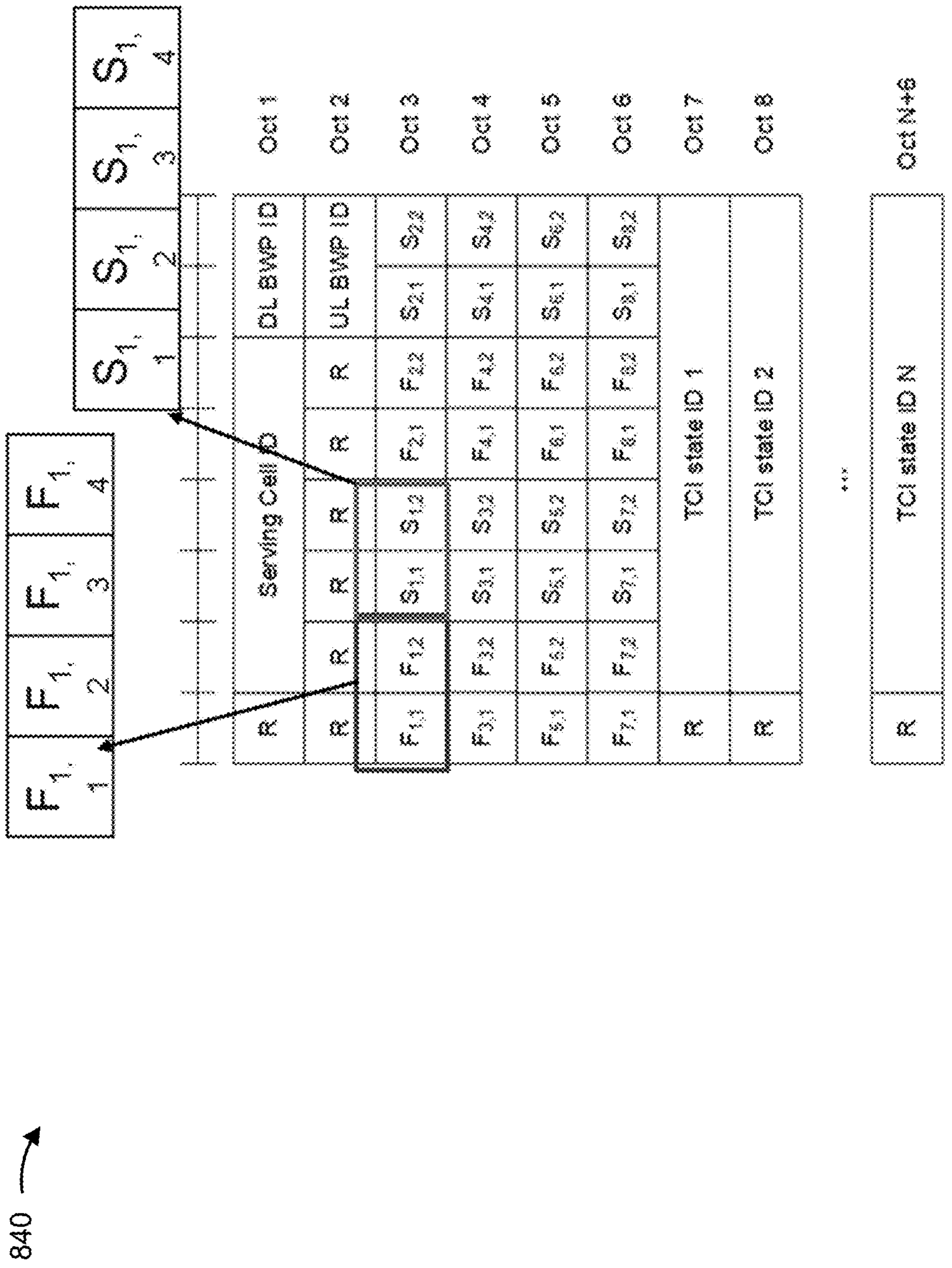

As shown in FIG. 8I and example 840, the $F_{i,j}$ field in the MAC-CE field may be extended from two to four fields to indicate whether the TCI states of TCI codepoint i are applicable for a first TRP and a second TRP of non-SBFD and a first TRP and a second TRP of SBFD of DL TCI state of separate TCI. Additionally, the $S_{i,j}$ field in the MAC-CE field may be extended from two to four fields to indicate whether the TCI states of TCI codepoint i are applicable for a first TRP and a second TRP of non-SBFD and a first TRP and a second TRP of SBFD of UL TCI state of separate TCI. Additional details are shown in Table 16:

TABLE 16

| TCI Codepoint | TCI States | Duplex Indicator |
|---|---|---|
| 0 (000) | DL TCI state 5 (1st TRP)<br>DL TCI state 4 (2nd TRP) | Non-SBFD |
| | DL TCI state 3 (1st TRP)<br>DL TCI state 2 (2nd TRP) | SBFD |
| | UL TCI state 5 (1st TRP)<br>UL TCI state 4 (2nd TRP) | Non-SBFD |
| | UL TCI state 3 (1st TRP)<br>UL TCI state 2 (2nd TRP) | SBFD |
| 1 (001) | DL TCI state 5 (1st TRP)<br>DL TCI state 4 (2nd TRP) | Non-SBFD |
| | DL TCI state 3 (1st TRP)<br>DL TCI state 2 (2nd TRP) | SBFD |
| | . . . | . . . |
| . . . | . . . | . . . |

As indicated above, FIGS. 8A-8I are provided as examples. Other examples may differ from what is described with respect to FIGS. 8A-8I.

Figure 9A:
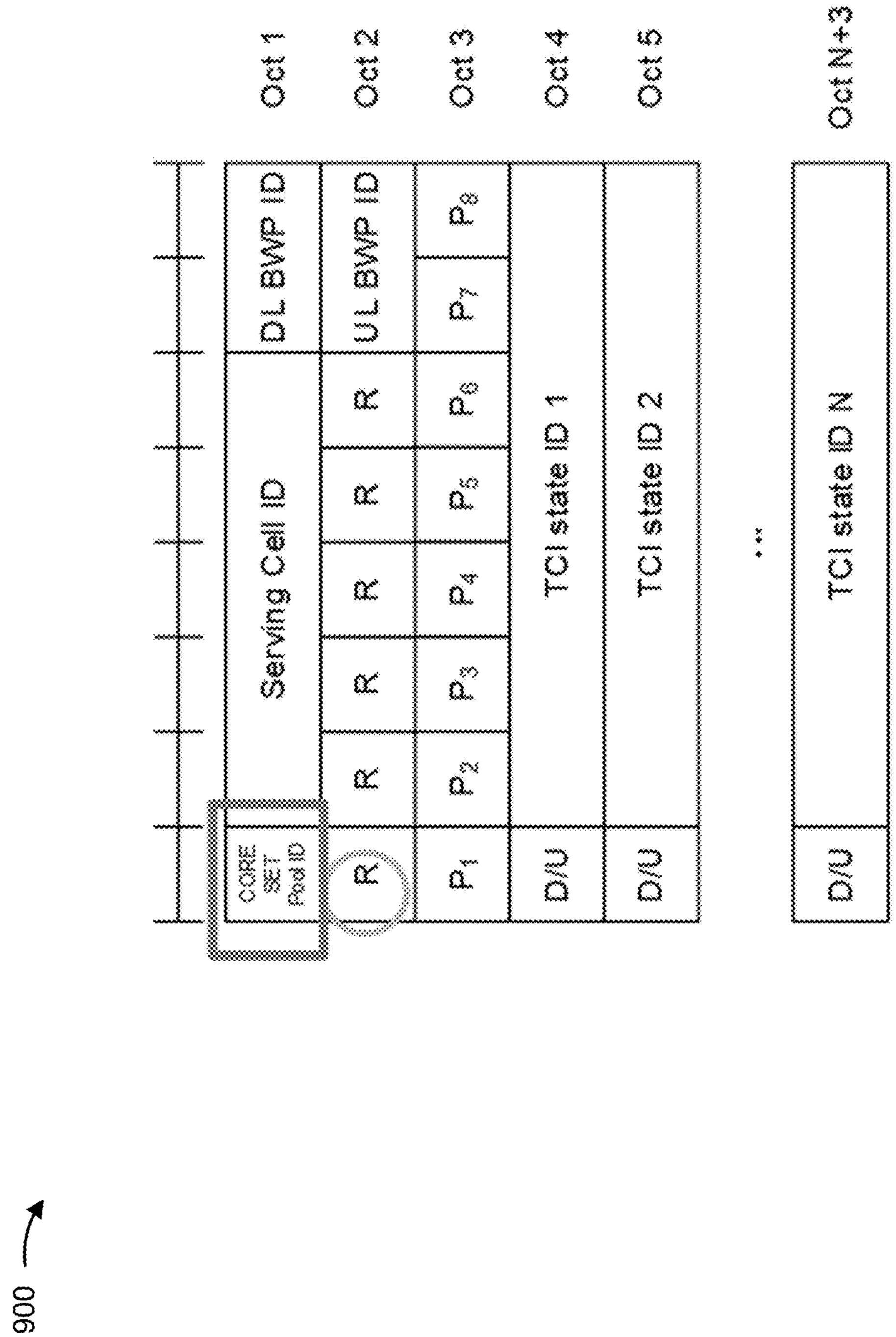
FIGS. 9A-9B are diagrams illustrating examples of multiple DCI-based mTRP transmissions, in accordance with the present disclosure.
Figure 9B:
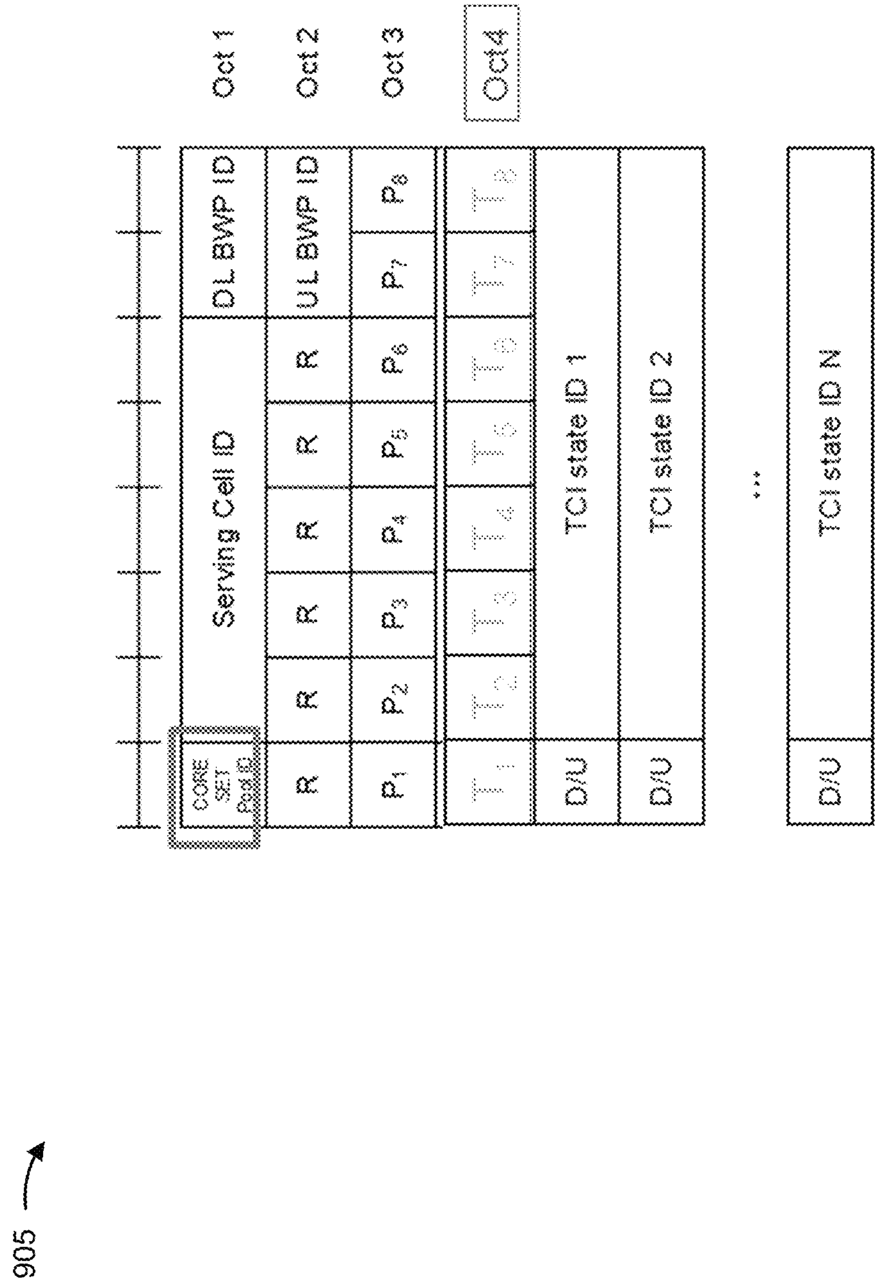

FIGS. 9A-9B are diagrams illustrating examples of multiple DCI-based mTRP transmissions, in accordance with the present disclosure.

As shown in FIG. 9A and example 900, a duplex-specific MAC-CE may be used to indicate SBFD TCI states and/or non-SBFD TCI states. A control resource set (CORESET) pool identifier (ID) field may indicate that the mapping between the activated TCI states and the codepoint of the DCI Transmission Configuration Indication set by field TCI state ID is specific to the ControlResourceSetId configured with the CORESET pool ID (for example, as described in 3GPP Technical Specification (TS) 38.331). This field set to 1 indicates that the TCI states are specified to CORESET pool ID equal to 1. Otherwise, the TCI states are specified to CORESET pool ID equal to 0. If no more than one value for the coresetPoolIndex is configured for any CORESET in the BWP, the R bit is indicated instead.

In this example, each CORESET pool ID corresponds to a specific TRP. When CORESET pool ID=0, separate TCI states activate/indicate for TRP 1 for SBFD and non-SBFD. Alternatively, when CORESET Pool ID=1, separate TCI states activate/indicate for TRP 2 for SBFD and non-SBFD. One or more of the reserved bit fields (R) may be used to indicate whether the MAC-CE indicates SBFD-specific TCI states or non-SBFD specific TCI states. The UE may receive separate MAC-CEs, where each MAC-CE activates up to 8 TCI codepoints for each duplex mode. In some cases, Pi=1 indicates that 2 TCI states is for DL+UL TCI states, whereas Pi=0 indicates that 1 TCI state DL or UL or joint TCI state. The D/U field may be used as follows: D for joint or DL TCI state, and U for UL TCI state. Additional details are shown in Table 17 and Table 18.

TABLE 17

(R = 0 (SBFD) Example))

| TCI Codepoint | TCI States |
|---|---|
| 0 (000) | DL TCI state 5 |
| 1 (001) | DL TCI state 1<br>UL TCI state 2 |
| 2 (010) | DL TCI state 5<br>UL TCI state 4 |
| 3 (011) | UL TCI state 4 |

TABLE 18

| (R = 1 (Non-SBFD) Example)) | |
|---|---|
| TCI Codepoint | TCI States |
| 0 (000) | UL TCI state 1 |
| 1 (001) | DL TCI state 3<br>UL TCI state 4 |
| 2 (010) | DL TCI state 4 |
| 3 (011) | DL TCI state 2<br>UL TCI state 5 |

As shown in FIG. 9B and example 905, each TCI codepoint may be configured with up to two TCI states. Each CORESET Pool ID may be associated with a specific TRP. When CORESET pool ID=0, separate TCI states activate/indicate TRP 1 for SBFD and non-SBFD. Alternatively, when CORESET Pool ID=1, separate TCI states activate/indicate TRP 2 for SBFD and non-SBFD. A bitfield Ti (i=1:8) per codepoint in the MAC-CE field may indicate whether the TCI states of TCI codepoint i are applicable for SBFD or non-SBFD. When Ti=0, the TCI states of codepoint i are non-SBFD-only. Alternatively, when Ti=1, the TCI states of codepoint i are SBFD only. Additional details are described in Table 19.

TABLE 19

| TCI Codepoint | TCI States | Duplex Indicator |
|---|---|---|
| 0 (000) | UL TCI state 5 | Non-SBFD |
| 1 (001) | DL TCI state 1<br>UL TCI state 2 | SBFD |
| 2 (010) | DL TCI state 5<br>UL TCI state 4 | SBFD |
| 3 (011) | UL TCI state 4 | Non-SBFD |
| 4 (100) | DL TCI state 2 | Non-SBFD |
| 5 (101) | DL TCI state 1 | Non-SBFD |
| 6 (110) | DL TCI state 2<br>UL TCI state 3 | SBFD |
| 7 (111) | UL TCI state | Non-SBFD |

As indicated above, FIGS. 9A-9B are provided as examples. Other examples may differ from what is described with respect to FIGS. 9A-9B.

Figure 10:
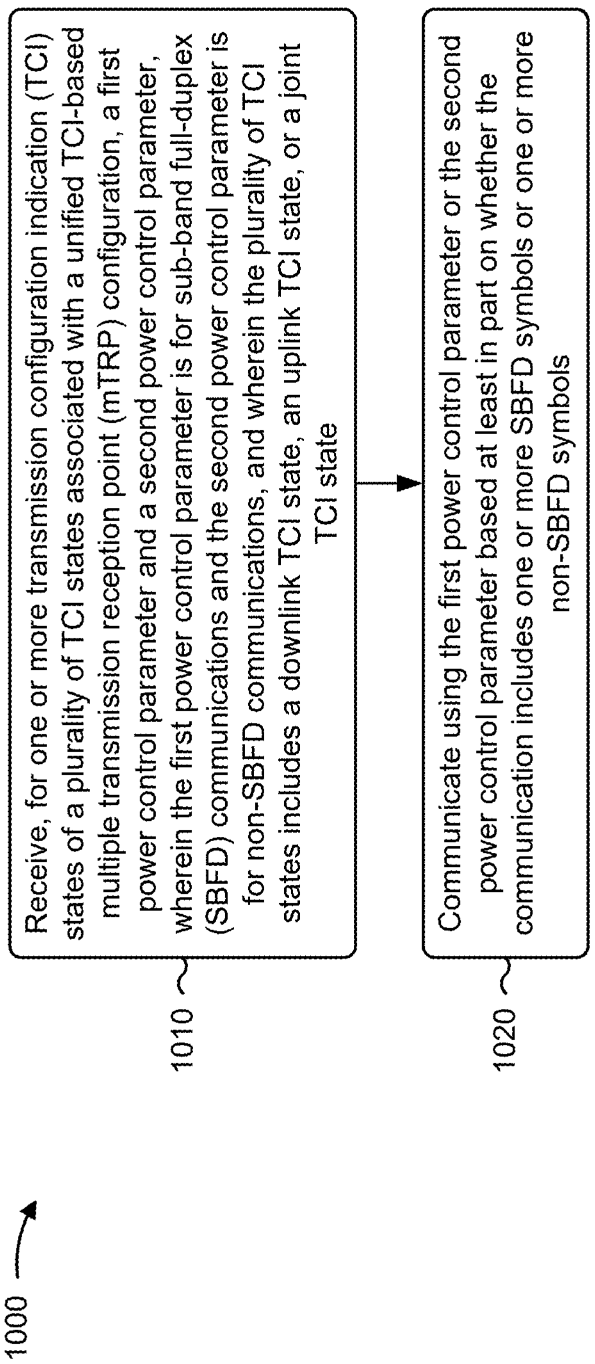
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with power control for a unified transmission configuration indication based multiple transmission reception point configuration.

As shown in FIG. 10, in some aspects, process 1000 may include receiving, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state (block 1010). For example, the UE (e.g., using reception component 1202 and/or communication manager 1206, depicted in FIG. 12) may receive, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state, as described above.

As further shown in FIG. 10, in some aspects, process 1000 may include communicating using the first power control parameter or the second power control parameter based at least in part on whether the communication includes one or more SBFD symbols or one or more non-SBFD symbols (block 1020). For example, the UE (e.g., using reception component 1202, transmission component 1204, and/or communication manager 1206, depicted in FIG. 12) may communicate using the first power control parameter or the second power control parameter based at least in part on whether the communication includes one or more SBFD symbols or one or more non-SBFD symbols, as described above.

Process 1000 may include additional aspects, such as any single aspect or any combination of aspects described below and/or in connection with one or more other processes described elsewhere herein.

In a first aspect, receiving the first power control parameter comprises receiving a first signal that includes the first power control parameter, and receiving the second power control parameter comprises receiving a second signal that includes the second power control parameter.

In a second aspect, alone or in combination with the first aspect, the unified TCI-based mTRP configuration is configured using a single DCI signal.

In a third aspect, alone or in combination with one or more of the first and second aspects, the first signal activates or deactivates one or more TCI codepoints for the SBFD communications and the second signal activates or deactivates one or more TCI codepoints for the non-SBFD communications.

In a fourth aspect, alone or in combination with one or more of the first through third aspects, the first signal is a first MAC-CE and the second signal is a second MAC-CE.

In a fifth aspect, alone or in combination with one or more of the first through fourth aspects, a duplex field type indicator is included in the first MAC-CE and another duplex field type indicator is included in the second MAC-CE, wherein the duplex field type indicator included in the first MAC-CE activates or deactivates one or more TCI codepoints for the one or more SBFD symbols, each TCI codepoint mapping to one or more TCI states for a first TRP, a second TRP, or both the first TRP and the second TRP, and wherein the other duplex field type indicator included in the second MAC-CE activates or deactivates one or more TCI codepoints for the one or more non-SBFD symbols, each TCI codepoint mapping to one or more TCI states for the first TRP, the second TRP, or both the first TRP and the second TRP.

In a sixth aspect, alone or in combination with one or more of the first through fifth aspects, process 1000 includes determining whether to transmit using the SBFD communications or the non-SBFD communications based at least in part on a slot type in which the first MAC-CE or the second MAC-CE is received and based at least in part on one or more rules configured at the UE.

In a seventh aspect, alone or in combination with one or more of the first through sixth aspects, each codepoint in the first MAC-CE and each codepoint in the second MAC-CE is associated with the joint TCI state.

In an eighth aspect, alone or in combination with one or more of the first through seventh aspects, each codepoint in the first MAC-CE is associated with the uplink TCI state or the downlink TCI state and each codepoint in the second MAC-CE is associated with the other of the uplink TCI state or the downlink TCI state.

In a ninth aspect, alone or in combination with one or more of the first through eighth aspects, each codepoint in the first MAC-CE or each codepoint in the second MAC-CE is associated with the joint TCI state and the other of each codepoint in the first MAC-CE or each codepoint in the second MAC-CE is associated with the uplink TCI state or the downlink TCI state.

In a tenth aspect, alone or in combination with one or more of the first through ninth aspects, the single DCI signal includes an indicated TCI codepoint and a bit that indicates whether the TCI codepoint that maps up to two TCI states is for the one or more SBFD symbols or for the one or more non-SBFD symbols.

In an eleventh aspect, alone or in combination with one or more of the first through tenth aspects, the single DCI signal includes an indicated TCI codepoint, wherein the indicated TCI codepoint indicates up to two TCI states for the TCI codepoint, and wherein a duplex type of the TCI codepoint is based at least in part on whether the communication includes the one or more SBFD symbols or the one or more non-SBFD symbols or is based at least in part on a slot type associated with a slot in which the single DCI signal is received.

In a twelfth aspect, alone or in combination with one or more of the first through eleventh aspects, the single DCI signal indicates a indicated TCI codepoint using two bits, wherein a first bit of the two bits indicates that a duplex type of a codepoint that maps to up to two TCI states for the TCI codepoint is for the one or more SBFD symbols or the one or more non-SBFD symbols.

In a thirteenth aspect, alone or in combination with one or more of the first through twelfth aspects, process 1000 includes receiving an RRC signal that configures the plurality of TCI states for the unified TCI-based mTRP configuration.

In a fourteenth aspect, alone or in combination with one or more of the first through thirteenth aspects, a first MAC-CE activates or deactivates one or more TCI codepoints for the one or more SBFD symbols and a second MAC-CE activates or deactivates one or more TCI codepoints for the one or more non-SBFD symbols, each TCI codepoint of the one or more TCI codepoints mapping to one or more TCI states for a first TRP, a second TRP, or both the first TRP and the second TRP.

In a fifteenth aspect, alone or in combination with one or more of the first through fourteenth aspects, a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

In a sixteenth aspect, alone or in combination with one or more of the first through fifteenth aspects, a single MAC-CE activates or deactivates a plurality of TCI codepoints for the one or more SBFD symbols and the one or more non-SBFD symbols and indicates, using a bitfield in the MAC-CE that includes one bit per each TCI codepoint of the plurality of TCI codepoints, whether each TCI codepoint of the plurality of TCI codepoints is for the one or more SBFD symbols or the one or more non-SBFD symbols, each TCI codepoint mapping to one or more TCI states for a first TRP, a second TRP, or both the first TRP and the second TRP.

In a seventeenth aspect, alone or in combination with one or more of the first through sixteenth aspects, each codepoint of the plurality of TCI codepoints in the MAC-CE is associated with the joint TCI state, or separate TCI states with DL TCI state and/or UL TCI state.

In an eighteenth aspect, alone or in combination with one or more of the first through seventeenth aspects, the RRC signal configures the single MAC-CE with a plurality of TCI codepoints, and the plurality of TCI codepoints is more than eight TCI codepoints but not more than sixteen TCI codepoints.

In a nineteenth aspect, alone or in combination with one or more of the first through eighteenth aspects, a single MAC-CE activates or deactivates a plurality of TCI codepoints for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols, and wherein each TCI codepoint of the plurality of TCI codepoints maps to one or more TCI states for a first TRP, a second TRP, or both the first TRP and the second TRP.

In a twentieth aspect, alone or in combination with one or more of the first through nineteenth aspects, each codepoint of the plurality of codepoints in the MAC-CE is associated with the joint TCI state, or separate TCI states with DL TCI state and/or UL TCI state.

In a twenty-first aspect, alone or in combination with one or more of the first through twentieth aspects, the unified TCI-based mTRP configuration is configured using a plurality of DCI signals.

In a twenty-second aspect, alone or in combination with one or more of the first through twenty-first aspects, process 1000 includes receiving an RRC signal that includes a bit indicating whether a duplex type is for the one or more SBFD symbols or the one or more non-SBFD symbols.

In a twenty-third aspect, alone or in combination with one or more of the first through twenty-second aspects, the RRC signal configures a TCI pool for the one or more SBFD symbols and configures another TCI pool for the one or more non-SBFD symbols.

In a twenty-fourth aspect, alone or in combination with one or more of the first through twenty-third aspects, a first MAC-CE activates one or more TCI codepoints for the one or more SBFD symbols and a second MAC-CE activates one or more TCI codepoints for the one or more non-SBFD symbols, wherein at least one of the first MAC-CE or the second MAC-CE includes a CORESET pool ID field that indicates whether the MAC-CE is for TCI states activated for a first TRP or a second TRP.

In a twenty-fifth aspect, alone or in combination with one or more of the first through twenty-fourth aspects, a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

In a twenty-sixth aspect, alone or in combination with one or more of the first through twenty-fifth aspects, process 1000 includes determining whether the first MAC-CE or the second MAC-CE is for the one or more SBFD symbols or the one or more non-SBFD symbols in accordance with one or more rules configured at the UE.

In a twenty-seventh aspect, alone or in combination with one or more of the first through twenty-sixth aspects, each DCI signal of the plurality of DCI signals includes an indicated TCI codepoint and a bit that indicates whether a TCI state for the TCI codepoint is for the one or more SBFD symbols or for the one or more non-SBFD symbols.

In a twenty-eighth aspect, alone or in combination with one or more of the first through twenty-seventh aspects, each DCI signal of the plurality of DCI signal indicates an indicated TCI codepoint using two bits, wherein a first bit of the two bits indicates that a duplex type of the TCI state is for the one or more SBFD symbols or the one or more non-SBFD symbols.

In a twenty-ninth aspect, alone or in combination with one or more of the first through twenty-eighth aspects, each DCI signal of the plurality of DCI signals includes an indicated TCI codepoint, wherein the indicated TCI codepoint indicates a TCI state for the TCI codepoint, and wherein a duplex type of the TCI codepoint is based at least in part on whether the communication includes the one or more SBFD symbols or the one or more non-SBFD symbols or is based at least in part on a slot type associated with a slot in which a corresponding DCI signal is received.

In a thirtieth aspect, alone or in combination with one or more of the first through twenty-ninth aspects, a first MAC-CE activates or deactivates one or more TCI codepoints for the one or more SBFD symbols and a second MAC-CE activates or deactivates one or more TCI codepoints for the one or more non-SBFD symbols.

In a thirty-first aspect, alone or in combination with one or more of the first through thirtieth aspects, each DCI signal of the plurality of DCI signals includes an indicated TCI codepoint and a bit that indicates whether a TCI state for the TCI codepoint is for the one or more SBFD symbols or for the one or more non-SBFD symbols.

In a thirty-second aspect, alone or in combination with one or more of the first through thirty-first aspects, a single MAC-CE activates or deactivates a plurality of TCI codepoints for the one or more SBFD symbols and the one or more non-SBFD symbols and indicates whether each TCI codepoint of the plurality of TCI codepoints is for the one or more SBFD symbols or the one or more non-SBFD symbols, wherein the MAC-CE includes a CORESET pool ID field that indicates whether the MAC-CE is for TCI states activated for a first TRP or a second TRP.

In a thirty-third aspect, alone or in combination with one or more of the first through thirty-second aspects, an RRC signal configures the single MAC-CE with a plurality of TCI codepoints, wherein the plurality of TCI codepoints is more than eight TCI codepoints but not more than sixteen TCI codepoints.

In a thirty-fourth aspect, alone or in combination with one or more of the first through thirty-third aspects, a single MAC-CE activates or deactivates a TCI codepoint that maps to a plurality of TCI states for the unified TCI-based mTRP configuration, wherein a plurality of TCI codepoints are configured for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols using a new bitmap field for each codepoint to indicate whether the joint TCI state, DL TCI state, or UL TCI state for SBFD symbols or non-SBFD symbols is present, and wherein the MAC-CE includes a CORESET pool ID field that indicates that the MAC-CE is for TCI states activated either for a first TRP or a second TRP.

In a thirty-fifth aspect, alone or in combination with one or more of the first through thirty-fourth aspects, each codepoint in the MAC-CE is associated with the joint TCI state, or separate TCI states with at least one of a DL TCI state or an UL TCI state.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
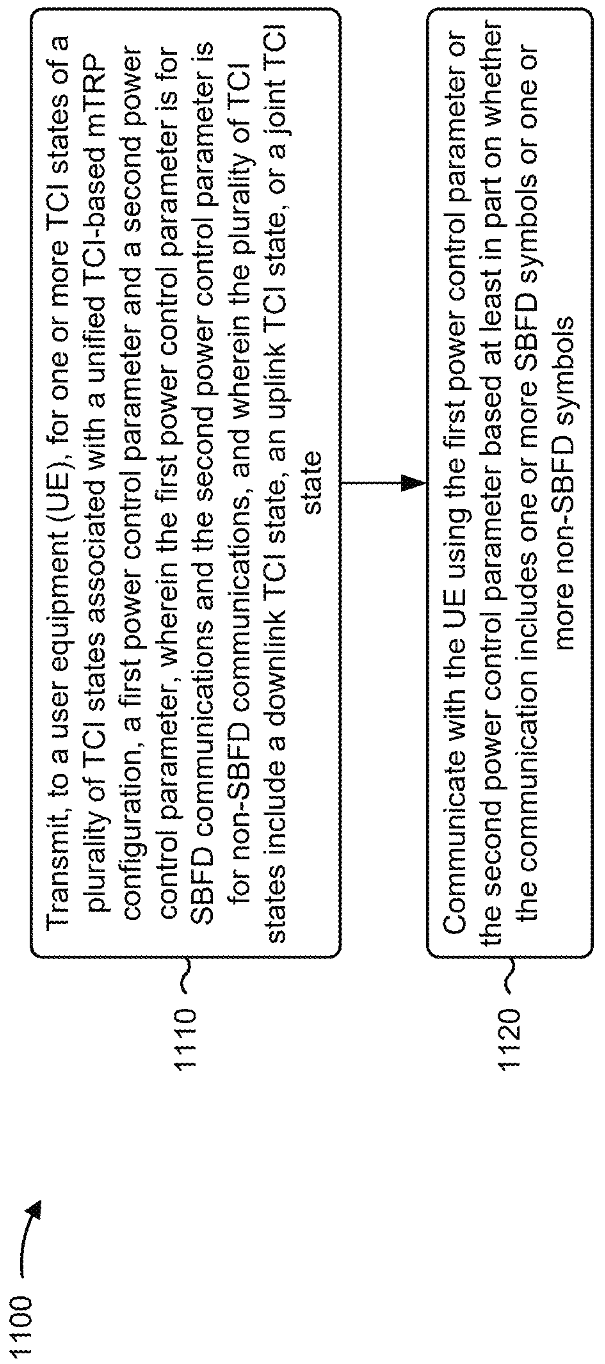
FIG. 11 is a diagram illustrating an example process performed, for example, at a network node or an apparatus of a network node, in accordance with the present disclosure.

FIG. 11 is a diagram illustrating an example process 1100 performed, for example, at a network node or an apparatus of a network node, in accordance with the present disclosure. Example process 1100 is an example where the apparatus or the network node (e.g., network node 110) performs operations associated with power control for a unified transmission configuration indication based multiple transmission reception point configuration.

As shown in FIG. 11, in some aspects, process 1100 may include transmitting, to a UE, for one or more TCI states of a plurality of TC states associated with a unified TCI-based mTRP configuration, a first power control parameter and a second power control parameter, wherein the first power control parameter is for SBFD communications and the second power control parameter is for non-SBFD communications, and wherein the plurality of TC states include a downlink TCI state, an uplink TCI state, or a joint TCI state (block 1110). For example, the network node (e.g., using transmission component 1304 and/or communication manager 1306, depicted in FIG. 13) may transmit, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TC states include a downlink TCI state, an uplink TCI state, or a joint TCI state, as described above.

As further shown in FIG. 11, in some aspects, process 1100 may include communicating with the UE using the first power control parameter or the second power control parameter based at least in part on whether the communication includes one or more SBFD symbols or one or more non-SBFD symbols (block 1120). For example, the network node (e.g., using reception component 1302, transmission component 1304, and/or communication manager 1306, depicted in FIG. 13) may communicate with the UE using the first power control parameter or the second power control parameter based at least in part on whether the communication includes one or more SBFD symbols or one or more non-SBFD symbols, as described above.

Process 1100 may include additional aspects, such as any single aspect or any combination of aspects described below and/or in connection with one or more other processes described elsewhere herein.

In a first aspect, transmitting the first power control parameter comprises transmitting a first signal that includes the first power control parameter, and transmitting the second power control parameter comprises transmitting a second signal that includes the second power control parameter.

In a second aspect, alone or in combination with the first aspect, the unified TCI-based mTRP configuration is configured using a single DCI signal.

In a third aspect, alone or in combination with one or more of the first and second aspects, the first signal activates or deactivates one or more TCI codepoints for the SBFD communications and the second signal activates or deactivates one or more TCI codepoints for the non-SBFD communications.

In a fourth aspect, alone or in combination with one or more of the first through third aspects, the first signal is a first MAC-CE and the second signal is a second MAC-CE.

In a fifth aspect, alone or in combination with one or more of the first through fourth aspects, a duplex field type indicator is included in the first MAC-CE and another duplex field type indicator is included in the second MAC-CE, wherein the duplex field type indicator included in the first MAC-CE activates or deactivates one or more TCI codepoints for the one or more SBFD symbols, each TCI codepoint mapping to one or more TCI states for a first TRP, a second TRP, or both the first TRP and the second TRP, and wherein the other duplex field type indicator included in the second MAC-CE activates or deactivates one or more TCI codepoints for the one or more non-SBFD symbols, each TCI codepoint mapping to one or more TCI states for the first TRP, the second TRP, or both the first TRP and the second TRP.

In a sixth aspect, alone or in combination with one or more of the first through fifth aspects, each codepoint in the first MAC-CE and each codepoint in the second MAC-CE are associated with the joint TCI state.

In a seventh aspect, alone or in combination with one or more of the first through sixth aspects, each codepoint in the first MAC-CE is associated with the uplink TCI state or the downlink TCI state and each codepoint in the second MAC-CE is associated with the other of the uplink TCI state or the downlink TCI state.

In an eighth aspect, alone or in combination with one or more of the first through seventh aspects, each codepoint in the first MAC-CE or each codepoint in the second MAC-CE is associated with the joint TCI state and the other of each codepoint in the first MAC-CE or each codepoint in the second MAC-CE is associated with the uplink TCI state or the downlink TCI state.

In a ninth aspect, alone or in combination with one or more of the first through eighth aspects, the single DCI signal includes an indicated TCI codepoint and a bit that indicates whether the TCI codepoint that maps up to two TCI states is for the one or more SBFD symbols or for the one or more non-SBFD symbols.

In a tenth aspect, alone or in combination with one or more of the first through ninth aspects, the single DCI signal includes an indicated TCI codepoint, wherein the indicated TCI codepoint indicates up to two TCI states for the TCI codepoint, and wherein a duplex type of the TCI codepoint is based at least in part on whether the communication includes the one or more SBFD symbols or the one or more non-SBFD symbols or is based at least in part on a slot type associated with a slot in which the single DCI signal is received.

In an eleventh aspect, alone or in combination with one or more of the first through tenth aspects, the single DCI signal indicates an indicated TCI codepoint using two bits, wherein a first bit of the two bits indicates that a duplex type of a codepoint that maps to up to two TCI states for the TCI codepoint is for the one or more SBFD symbols or the one or more non-SBFD symbols.

In a twelfth aspect, alone or in combination with one or more of the first through eleventh aspects, process 1100 includes transmitting an RRC signal that configures the plurality of TCI states for the unified TCI-based mTRP configuration.

In a thirteenth aspect, alone or in combination with one or more of the first through twelfth aspects, a first MAC-CE activates or deactivates one or more TCI codepoints for the one or more SBFD symbols and a second MAC-CE activates or deactivates one or more TCI codepoints for the one or more non-SBFD symbols, each TCI codepoint of the one or more TCI codepoints mapping to one or more TCI states for a first TRP, a second TRP, or both the first TRP and the second TRP.

In a fourteenth aspect, alone or in combination with one or more of the first through thirteenth aspects, a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

In a fifteenth aspect, alone or in combination with one or more of the first through fourteenth aspects, a single MAC-CE activates or deactivates a plurality of TCI codepoints for the one or more SBFD symbols and the one or more non-SBFD symbols and indicates, using a bitfield in the MAC-CE that includes one bit per each TCI codepoint of the plurality of TCI codepoints, whether each TCI codepoint of the plurality of TCI codepoints is for the one or more SBFD symbols or the one or more non-SBFD symbols, each TCI codepoint mapping to one or more TCI states for a first TRP, a second TRP, or both the first TRP and the second TRP.

In a sixteenth aspect, alone or in combination with one or more of the first through fifteenth aspects, each codepoint of the plurality of TCI codepoints in the MAC-CE is associated with the joint TCI state, or separate TCI states with DL TCI state and/or UL TCI state.

In a seventeenth aspect, alone or in combination with one or more of the first through sixteenth aspects, the RRC signal configures the single MAC-CE with a plurality of TCI codepoints, and the plurality of TCI codepoints is more than eight TCI codepoints but not more than sixteen TCI codepoints.

In an eighteenth aspect, alone or in combination with one or more of the first through seventeenth aspects, a single MAC-CE activates or deactivates a plurality of TCI codepoints for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols, and wherein each TCI codepoint of the plurality of TCI codepoints maps to one or more TCI states for a first TRP, a second TRP, or both the first TRP and the second TRP.

In a nineteenth aspect, alone or in combination with one or more of the first through eighteenth aspects, each codepoint of the plurality of codepoints in the MAC-CE is associated with the joint TCI state, or separate TCI states with DL TCI state and/or UL TCI state.

In a twentieth aspect, alone or in combination with one or more of the first through nineteenth aspects, the unified TCI-based mTRP configuration is configured using a plurality of DCI signals.

In a twenty-first aspect, alone or in combination with one or more of the first through twentieth aspects, process 1100 includes transmitting an RRC signal that includes a bit indicating whether a duplex type is for the one or more SBFD symbols or the one or more non-SBFD symbols.

In a twenty-second aspect, alone or in combination with one or more of the first through twenty-first aspects, the RRC signal configures a TCI pool for the one or more SBFD symbols and configures another TCI pool for the one or more non-SBFD symbols.

In a twenty-third aspect, alone or in combination with one or more of the first through twenty-second aspects, a first MAC-CE activates one or more TCI codepoints for the one or more SBFD symbols and a second MAC-CE activates one or more TCI codepoints for the one or more non-SBFD symbols, wherein at least one of the first MAC-CE or the second MAC-CE includes a CORESET pool ID field that indicates whether the MAC-CE is for TCI states activated for a first TRP or a second TRP.

In a twenty-fourth aspect, alone or in combination with one or more of the first through twenty-third aspects, a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

In a twenty-fifth aspect, alone or in combination with one or more of the first through twenty-fourth aspects, each DCI signal of the plurality of DCI signals includes an indicated TCI codepoint and a bit that indicates whether a TCI state for the TCI codepoint is for the one or more SBFD symbols or for the one or more non-SBFD symbols.

In a twenty-sixth aspect, alone or in combination with one or more of the first through twenty-fifth aspects, each DCI signal of the plurality of DCI signal indicates an indicated TCI codepoint using two bits, wherein a first bit of the two bits indicates that a duplex type of the TCI state is for the one or more SBFD symbols or the one or more non-SBFD symbols.

In a twenty-seventh aspect, alone or in combination with one or more of the first through twenty-sixth aspects, each DCI signal of the plurality of DCI signals includes an indicated TCI codepoint, wherein the indicated TCI codepoint indicates a TCI state for the TCI codepoint, and wherein a duplex type of the TCI codepoint is based at least in part on whether the communication includes the one or more SBFD symbols or the one or more non-SBFD symbols or is based at least in part on a slot type associated with a slot in which a corresponding DCI signal is received.

In a twenty-eighth aspect, alone or in combination with one or more of the first through twenty-seventh aspects, a first MAC-CE activates or deactivates one or more TCI codepoints for the one or more SBFD symbols and a second MAC-CE activates or deactivates one or more TCI codepoints for the one or more non-SBFD symbols.

In a twenty-ninth aspect, alone or in combination with one or more of the first through twenty-eighth aspects, each DCI signal of the plurality of DCI signals includes an indicated TCI codepoint and a bit that indicates whether a TCI state for the TCI codepoint is for the one or more SBFD symbols or for the one or more non-SBFD symbols.

In a thirtieth aspect, alone or in combination with one or more of the first through twenty-ninth aspects, a single MAC-CE activates or deactivates a plurality of TCI codepoints for the one or more SBFD symbols and the one or more non-SBFD symbols and indicates whether each TCI codepoint of the plurality of TCI codepoints is for the one or more SBFD symbols or the one or more non-SBFD symbols, wherein the MAC-CE includes a CORESET pool ID field that indicates whether the MAC-CE is for TCI states activated for a first TRP or a second TRP.

In a thirty-first aspect, alone or in combination with one or more of the first through thirtieth aspects, an RRC signal configures the single MAC-CE with a plurality of TCI codepoints, wherein the plurality of TCI codepoints is more than eight TCI codepoints but not more than sixteen TCI codepoints.

In a thirty-second aspect, alone or in combination with one or more of the first through thirty-first aspects, a single MAC-CE activates or deactivates a TCI codepoint that maps to a plurality of TCI states for the unified TCI-based mTRP configuration, wherein a plurality of TCI codepoints are configured for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols using a new bitmap field for each codepoint to indicate whether the joint TCI state, DL TCI state, or UL TCI state for SBFD symbols or non-SBFD symbols is present, and wherein the MAC-CE includes a CORESET pool ID field that indicates that the MAC-CE is for TCI states activated either for a first TRP or a second TRP.

In a thirty-third aspect, alone or in combination with one or more of the first through thirty-second aspects, each codepoint in the MAC-CE is associated with the joint TCI state, or separate TCI states with at least one of a DL TCI state or an UL TCI state.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
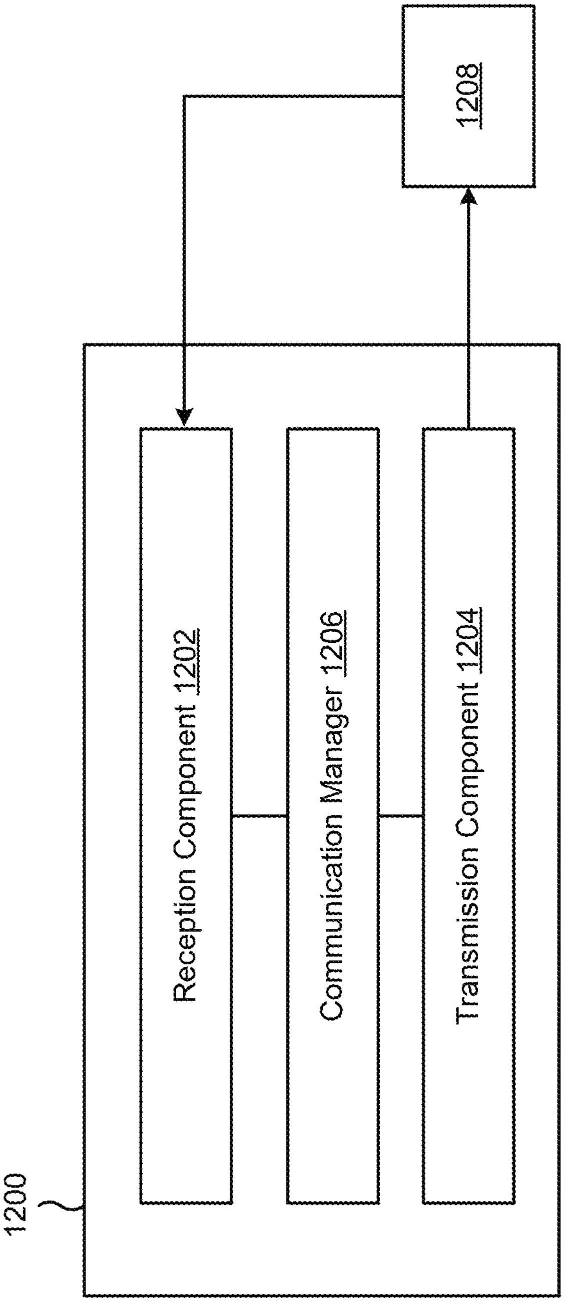
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204. The communication manager 1206 may be included in, or implemented via, a processing system (for example, the processing system 140 described in connection with FIG. 1) of the UE.

In some aspects, the apparatus 1200 may be configured to perform one or more operations described herein in connection with FIGS. 7A-7B, 8A-8I, and 9A-9B. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 1. Additionally, or alternatively, one or more components shown in FIG. 12 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications, and may provide the processed signals to the one or more other components of the apparatus 1200. In some aspects, the reception component 1202 may may include one or more components of the UE 120 described above in connection with FIG. 1, such as a radio, one or more RF chains, one or more transceivers, or one or more modems, each of which may in turn be coupled with one or more antennas of the UE.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications, and may transmit the processed signals to the apparatus 1208. In some aspects, the transmission component 1204 may include one or more components of the UE 120 described above in connection with FIG. 1, such as a radio, one or more RF chains, one or more transceivers, or one or more modems, each of which may in turn be coupled with one or more antennas of the UE 120 of the UE described in connection with FIG. 1. In some aspects, the transmission component 1204 may be co-located with the reception component 1202.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states includes a downlink TCI state, an uplink TCI state, or a joint TCI state. The reception component 1202 and/or the transmission component 1204 may communicate using the first power control parameter or the second power control parameter based at least in part on whether the communication includes one or more SBFD symbols or one or more non-SBFD symbols.

The communication manager 1206 may determine whether to transmit using the SBFD communications or the non-SBFD communications based at least in part on a slot type in which the first MAC-CE or the second MAC-CE is received and based at least in part on one or more rules configured at the UE. The reception component 1202 may receive an RRC signal that configures the plurality of TCI states for the unified TCI-based mTRP configuration. The reception component 1202 may receive an RRC signal that includes a bit indicating whether a duplex type is for the one or more SBFD symbols or the one or more non-SBFD symbols. The communication manager 1206 may determine whether the first MAC-CE or the second MAC-CE is for the one or more SBFD symbols or the one or more non-SBFD symbols in accordance with one or more rules configured at the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
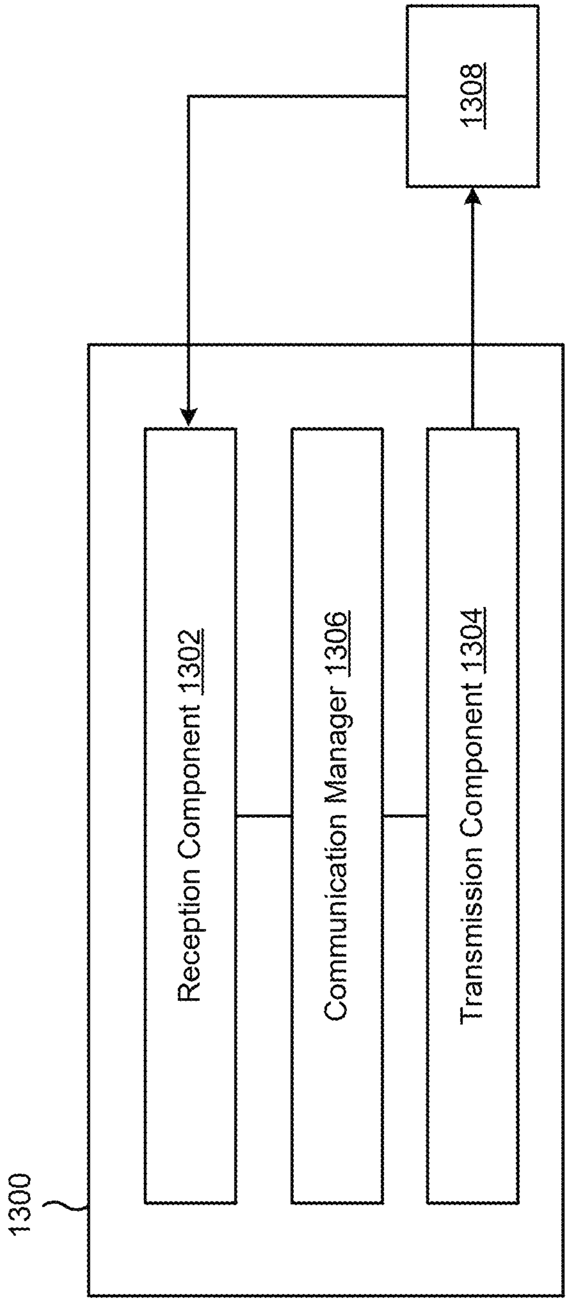
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 155 described in connection with FIG. 1. As shown, the apparatus 1300 may communicate with another apparatus 1308, such as a UE or a network node (such as a CU, a DU, an RU, or a base station), using the reception component 1302 and the transmission component 1304. The communication manager 1306 may be included in, or implemented via, a processing system (for example, the processing system 145 described in connection with FIG. 1) of the network node.

In some aspects, the apparatus 1300 may be configured to perform one or more operations described herein in connection with FIGS. 7A-7B, 8A-8I, and 9A-9B. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 1. Additionally, or alternatively, one or more components shown in FIG. 13 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications, and may provide the processed signals to the one or more other components of the apparatus 1300. In some aspects, the reception component 1302 may may include one or more components of the UE 120 described above in connection with FIG. 1, such as a radio, one or more RF chains, one or more transceivers, or one or more modems, each of which may in turn be coupled with one or more antennas of the network node. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications, and may transmit the processed signals to the apparatus 1308. In some aspects, the transmission component 1304 may include one or more components of the UE 120 described above in connection with FIG. 1, such as a radio, one or more RF chains, one or more transceivers, or one or more modems, each of which may in turn be coupled with one or more antennas of the UE 120 of the network node described in connection with FIG. 1. In some aspects, the transmission component 1304 may be co-located with the reception component 1302.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit, to a UE, for one or more TCI states of a plurality of TCI states associated with a unified TCI-based mTRP configuration, a first power control parameter and a second power control parameter, wherein the first power control parameter is for SBFD communications and the second power control parameter is for non-SBFD communications, and wherein the plurality of TCI states include a downlink TCI state, an uplink TCI state, or a joint TCI state. The reception component 1302 and/or the transmission component 1304 may communicate with the UE using the first power control parameter or the second power control parameter based at least in part on whether the communication includes one or more SBFD symbols or one or more non-SBFD symbols.

The transmission component 1304 may transmit an RRC signal that configures the plurality of TCI states for the unified TCI-based mTRP configuration. The transmission component 1304 may transmit an RRC signal that includes a bit indicating whether a duplex type is for the one or more SBFD symbols or the one or more non-SBFD symbols.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states includes a downlink TCI state, an uplink TCI state, or a joint TCI state; and communicating using the first power control parameter or the second power control parameter based at least in part on whether the communication includes one or more SBFD symbols or one or more non-SBFD symbols.

Aspect 2: The method of Aspect 1, wherein receiving the first power control parameter comprises receiving a first signal that includes the first power control parameter, and wherein receiving the second power control parameter comprises receiving a second signal that includes the second power control parameter.

Aspect 3: The method of any of Aspects 1-2, wherein the unified TCI-based mTRP configuration is configured using a single downlink control information (DCI) signal.

Aspect 4: The method of Aspect 3, wherein the first signal activates or deactivates one or more TCI codepoints for the SBFD communications and the second signal activates or deactivates one or more TCI codepoints for the non-SBFD communications.

Aspect 5: The method of Aspect 3, wherein the first signal is a first medium access control (MAC) control element (MAC-CE) and the second signal is a second MAC-CE.

Aspect 6: The method of Aspect 5, wherein a duplex field type indicator is included in the first MAC-CE and another duplex field type indicator is included in the second MAC-CE, wherein the duplex field type indicator included in the first MAC-CE activates or deactivates one or more TCI codepoints for the one or more SBFD symbols, each TCI codepoint mapping to one or more TCI states for a first TRP, a second TRP, or both the first TRP and the second TRP, and wherein the other duplex field type indicator included in the second MAC-CE activates or deactivates one or more TCI codepoints for the one or more non-SBFD symbols, each TCI codepoint mapping to one or more TCI states for the first TRP, the second TRP, or both the first TRP and the second TRP.

Aspect 7: The method of Aspect 5, further comprising determining whether to transmit using the SBFD communications or the non-SBFD communications based at least in part on a slot type in which the first MAC-CE or the second MAC-CE is received and based at least in part on one or more rules configured at the UE.

Aspect 8: The method of Aspect 5, wherein each codepoint in the first MAC-CE and each codepoint in the second MAC-CE are associated with the joint TCI state.

Aspect 9: The method of Aspect 5, wherein each codepoint in the first MAC-CE is associated with the uplink TCI state or the downlink TCI state and each codepoint in the second MAC-CE is associated with the other of the uplink TCI state or the downlink TCI state.

Aspect 10: The method of Aspect 5, wherein each codepoint in the first MAC-CE or each codepoint in the second MAC-CE is associated with the joint TCI state and the other of each codepoint in the first MAC-CE or each codepoint in the second MAC-CE is associated with the uplink TCI state or the downlink TCI state.

Aspect 11: The method of Aspect 3, wherein the single DCI signal includes an indicated TCI codepoint and a bit that indicates whether the TCI codepoint that maps up to two TCI states is for the one or more SBFD symbols or for the one or more non-SBFD symbols.

Aspect 12: The method of Aspect 3, wherein the single DCI signal includes an indicated TCI codepoint, wherein the indicated TCI codepoint indicates up to two TCI states for the TCI codepoint, and wherein a duplex type of the TCI codepoint is based at least in part on whether the communication includes the one or more SBFD symbols or the one or more non-SBFD symbols or is based at least in part on a slot type associated with a slot in which the single DCI signal is received.

Aspect 13: The method of Aspect 3, wherein the single DCI signal indicates a indicated TCI codepoint using two bits, wherein a first bit of the two bits indicates that a duplex type of a codepoint that maps to up to two TCI states for the TCI codepoint is for the one or more SBFD symbols or the one or more non-SBFD symbols.

Aspect 14: The method of Aspect 3, further comprising receiving a radio resource control (RRC) signal that configures the plurality of TCI states for the unified TCI-based mTRP configuration.

Aspect 15: The method of Aspect 14, wherein a first medium access control (MAC) control element (MAC-CE) activates or deactivates one or more TCI codepoints for the one or more SBFD symbols and a second MAC-CE activates or deactivates one or more TCI codepoints for the one or more non-SBFD symbols, each TCI codepoint of the one or more TCI codepoints mapping to one or more TCI states for a first TRP, a second TRP, or both the first TRP and the second TRP.

Aspect 16: The method of Aspect 15, wherein a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

Aspect 17: The method of Aspect 14, wherein a single medium access control (MAC) control element (MAC-CE) activates or deactivates a plurality of TCI codepoints for the one or more SBFD symbols and the one or more non-SBFD symbols and indicates, using a bitfield in the MAC-CE that includes one bit per each TCI codepoint of the plurality of TCI codepoints, whether each TCI codepoint of the plurality of TCI codepoints is for the one or more SBFD symbols or the one or more non-SBFD symbols, each TCI codepoint mapping to one or more TCI states for a first TRP, a second TRP, or both the first TRP and the second TRP.

Aspect 18: The method of Aspect 17, wherein each codepoint of the plurality of TCI codepoints in the MAC-CE is associated with the joint TCI state, or separate TCI states with at least one of the downlink TCI state or the uplink TCI state.

Aspect 19: The method of Aspect 17, wherein the RRC signal configures the single MAC-CE with a plurality of TCI codepoints, and wherein the plurality of TCI codepoints is more than eight TCI codepoints but not more than sixteen TCI codepoints.

Aspect 20: The method of Aspect 14, wherein a single medium access control (MAC) control element (MAC-CE) activates or deactivates a plurality of TCI codepoints for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols, and wherein each TCI codepoint of the plurality of TCI codepoints maps to one or more TCI states for a first TRP, a second TRP, or both the first TRP and the second TRP.

Aspect 21: The method of Aspect 20, wherein each codepoint of the plurality of codepoints in the MAC-CE is associated with the joint TCI state, or separate TCI states with at least one of the downlink TCI state or the uplink TCI state.

Aspect 22: The method of any of Aspects 1-21, wherein the unified TCI-based mTRP configuration is configured using a plurality of downlink control information (DCI) signals.

Aspect 23: The method of Aspect 22, further comprising receiving a radio resource control (RRC) signal that includes a bit indicating whether a duplex type is for the one or more SBFD symbols or the one or more non-SBFD symbols.

Aspect 24: The method of Aspect 23, wherein the RRC signal configures a TCI pool for the one or more SBFD symbols and configures another TCI pool for the one or more non-SBFD symbols.

Aspect 25: The method of Aspect 22, wherein a first medium access control (MAC) control element (MAC-CE) activates one or more TCI codepoints for the one or more SBFD symbols and a second MAC-CE activates one or more TCI codepoints for the one or more non-SBFD symbols, wherein at least one of the first MAC-CE or the second MAC-CE includes a control resource set (CORESET) pool identifier (ID) field that indicates whether the MAC-CE is for TCI states activated for a first TRP or a second TRP.

Aspect 26: The method of Aspect 25, wherein a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

Aspect 27: The method of Aspect 25, further comprising determining whether the first MAC-CE or the second MAC-CE is for the one or more SBFD symbols or the one or more non-SBFD symbols in accordance with one or more rules configured at the UE.

Aspect 28: The method of Aspect 22, wherein each DCI signal of the plurality of DCI signals includes an indicated TCI codepoint and a bit that indicates whether a TCI state for the TCI codepoint is for the one or more SBFD symbols or for the one or more non-SBFD symbols.

Aspect 29: The method of Aspect 22, wherein each DCI signal of the plurality of DCI signal indicates an indicated TCI codepoint using two bits, wherein a first bit of the two bits indicates that a duplex type of the TCI state is for the one or more SBFD symbols or the one or more non-SBFD symbols.

Aspect 30: The method of Aspect 22, wherein each DCI signal of the plurality of DCI signals includes an indicated TCI codepoint, wherein the indicated TCI codepoint indicates a TCI state for the TCI codepoint, and wherein a duplex type of the TCI codepoint is based at least in part on whether the communication includes the one or more SBFD symbols or the one or more non-SBFD symbols or is based at least in part on a slot type associated with a slot in which a corresponding DCI signal is received.

Aspect 31: The method of Aspect 22, wherein a first medium access control (MAC) control element (MAC-CE) activates or deactivates one or more TCI codepoints for the one or more SBFD symbols and a second MAC-CE activates or deactivates one or more TCI codepoints for the one or more non-SBFD symbols.

Aspect 32: The method of Aspect 31, wherein each DCI signal of the plurality of DCI signals includes an indicated TCI codepoint and a bit that indicates whether a TCI state for the TCI codepoint is for the one or more SBFD symbols or for the one or more non-SBFD symbols.

Aspect 33: The method of Aspect 22, wherein a single medium access control (MAC) control element (MAC-CE) activates or deactivates a plurality of TCI codepoints for the one or more SBFD symbols and the one or more non-SBFD symbols and indicates whether each TCI codepoint of the plurality of TCI codepoints is for the one or more SBFD symbols or the one or more non-SBFD symbols, wherein the MAC-CE includes a control resource set (CORESET) pool identifier (ID) field that indicates whether the MAC-CE is for TCI states activated for a first TRP or a second TRP.

Aspect 34: The method of Aspect 33, wherein a radio resource control (RRC) signal configures the single MAC-CE with a plurality of TCI codepoints, wherein the plurality of TCI codepoints is more than eight TCI codepoints but not more than sixteen TCI codepoints.

Aspect 35: The method of Aspect 22, wherein a single medium access control (MAC) control element (MAC-CE) activates or deactivates a TCI codepoint that maps to a plurality of TCI states for the unified TCI-based mTRP configuration, wherein a plurality of TCI codepoints are configured for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols using a new bitmap field for each codepoint to indicate whether the joint TCI state, the downlink TCI state, or the uplink TCI state for SBFD symbols or non-SBFD symbols is present, and wherein the MAC-CE includes a control resource set (CORESET) pool identifier (ID) field that indicates that the MAC-CE is for TCI states activated either for a first TRP or a second TRP.

Aspect 36: The method of Aspect 35, wherein each codepoint in the MAC-CE is associated with the joint TCI state, or separate TCI states with at least one of the downlink TCI state or the uplink TCI state.

Aspect 37: A method of wireless communication performed by a network node, comprising: transmitting, to a user equipment (UE), for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states include the downlink TCI state, the uplink TCI state, or the joint TCI state; and communicating with the UE using the first power control parameter or the second power control parameter based at least in part on whether the communication includes one or more SBFD symbols or one or more non-SBFD symbols.

Aspect 38: The method of Aspect 37, wherein transmitting the first power control parameter comprises transmitting a first signal that includes the first power control parameter, and wherein transmitting the second power control parameter comprises transmitting a second signal that includes the second power control parameter.

Aspect 39: The method of any of Aspects 37-38, wherein the unified TCI-based mTRP configuration is configured using a single downlink control information (DCI) signal.

Aspect 40: The method of Aspect 39, wherein the first signal activates or deactivates one or more TCI codepoints for the SBFD communications and the second signal activates or deactivates one or more TCI codepoints for the non-SBFD communications.

Aspect 41: The method of Aspect 39, wherein the first signal is a first medium access control (MAC) control element (MAC-CE) and the second signal is a second MAC-CE.

Aspect 42: The method of Aspect 41, wherein a duplex field type indicator is included in the first MAC-CE and another duplex field type indicator is included in the second MAC-CE, wherein the duplex field type indicator included in the first MAC-CE activates or deactivates one or more TCI codepoints for the one or more SBFD symbols, each TCI codepoint mapping to one or more TCI states for a first TRP, a second TRP, or both the first TRP and the second TRP, and wherein the other duplex field type indicator included in the second MAC-CE activates or deactivates one or more TCI codepoints for the one or more non-SBFD symbols, each TCI codepoint mapping to one or more TCI states for the first TRP, the second TRP, or both the first TRP and the second TRP.

Aspect 43: The method of Aspect 41, wherein each codepoint in the first MAC-CE and each codepoint in the second MAC-CE are associated with the joint TCI state.

Aspect 44: The method of Aspect 41, wherein each codepoint in the first MAC-CE is associated with the uplink TCI state or the downlink TCI state and each codepoint in the second MAC-CE is associated with the other of the uplink TCI state or the downlink TCI state.

Aspect 45: The method of Aspect 41, wherein each codepoint in the first MAC-CE or each codepoint in the second MAC-CE is associated with the joint TCI state and the other of each codepoint in the first MAC-CE or each codepoint in the second MAC-CE is associated with the uplink TCI state or the downlink TCI state.

Aspect 46: The method of Aspect 39, wherein the single DCI signal includes an indicated TCI codepoint and a bit that indicates whether the TCI codepoint that maps up to two TCI states is for the one or more SBFD symbols or for the one or more non-SBFD symbols.

Aspect 47: The method of Aspect 39, wherein the single DCI signal includes an indicated TCI codepoint, wherein the indicated TCI codepoint indicates up to two TCI states for the TCI codepoint, and wherein a duplex type of the TCI codepoint is based at least in part on whether the communication includes the one or more SBFD symbols or the one or more non-SBFD symbols or is based at least in part on a slot type associated with a slot in which the single DCI signal is received.

Aspect 48: The method of Aspect 39, wherein the single DCI signal indicates an indicated TCI codepoint using two bits, wherein a first bit of the two bits indicates that a duplex type of a codepoint that maps to up to two TCI states for the TCI codepoint is for the one or more SBFD symbols or the one or more non-SBFD symbols.

Aspect 49: The method of Aspect 39, further comprising transmitting a radio resource control (RRC) signal that configures the plurality of TCI states for the unified TCI-based mTRP configuration.

Aspect 50: The method of Aspect 49, wherein a first medium access control (MAC) control element (MAC-CE) activates or deactivates one or more TCI codepoints for the one or more SBFD symbols and a second MAC-CE activates or deactivates one or more TCI codepoints for the one or more non-SBFD symbols, each TCI codepoint of the one or more TCI codepoints mapping to one or more TCI states for a first TRP, a second TRP, or both the first TRP and the second TRP.

Aspect 51: The method of Aspect 50, wherein a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

Aspect 52: The method of Aspect 49, wherein a single medium access control (MAC) control element (MAC-CE) activates or deactivates a plurality of TCI codepoints for the one or more SBFD symbols and the one or more non-SBFD symbols and indicates, using a bitfield in the MAC-CE that includes one bit per each TCI codepoint of the plurality of TCI codepoints, whether each TCI codepoint of the plurality of TCI codepoints is for the one or more SBFD symbols or the one or more non-SBFD symbols, each TCI codepoint mapping to one or more TCI states for a first TRP, a second TRP, or both the first TRP and the second TRP.

Aspect 53: The method of Aspect 52, wherein each codepoint of the plurality of TCI codepoints in the MAC-CE is associated with the joint TCI state, or separate TCI states with at least one of the downlink TCI state or the uplink TCI state.

Aspect 54: The method of Aspect 52, wherein the RRC signal configures the single MAC-CE with a plurality of TCI codepoints, and wherein the plurality of TCI codepoints is more than eight TCI codepoints but not more than sixteen TCI codepoints.

Aspect 55: The method of Aspect 49, wherein a single medium access control (MAC) control element (MAC-CE) activates or deactivates a plurality of TCI codepoints for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols, and wherein each TCI codepoint of the plurality of TCI codepoints maps to one or more TCI states for a first TRP, a second TRP, or both the first TRP and the second TRP.

Aspect 56: The method of Aspect 55, wherein each codepoint of the plurality of codepoints in the MAC-CE is associated with the joint TCI state, or separate TCI states with at least one of the downlink TCI state or the uplink TCI state.

Aspect 57: The method of any of Aspects 37-56, wherein the unified TCI-based mTRP configuration is configured using a plurality of downlink control information (DCI) signals.

Aspect 58: The method of Aspect 57, further comprising transmitting a radio resource control (RRC) signal that includes a bit indicating whether a duplex type is for the one or more SBFD symbols or the one or more non-SBFD symbols.

Aspect 59: The method of Aspect 58, wherein the RRC signal configures a TCI pool for the one or more SBFD symbols and configures another TCI pool for the one or more non-SBFD symbols.

Aspect 60: The method of Aspect 57, wherein a first medium access control (MAC) control element (MAC-CE) activates one or more TCI codepoints for the one or more SBFD symbols and a second MAC-CE activates one or more TCI codepoints for the one or more non-SBFD symbols, wherein at least one of the first MAC-CE or the second MAC-CE includes a control resource set (CORESET) pool identifier (ID) field that indicates whether the MAC-CE is for TCI states activated for a first TRP or a second TRP.

Aspect 61: The method of Aspect 60, wherein a first value of a reserved bit included in the first MAC-CE indicates that the one or more TCI codepoints in the first MAC-CE is for the one or more SBFD symbols and a second value of the reserved bit included in the first MAC-CE indicates that the first MAC-CE includes an additional payload or one or more additional octets of TCI codepoints for the one or more non-SBFD symbols.

Aspect 62: The method of Aspect 57, wherein each DCI signal of the plurality of DCI signals includes an indicated TCI codepoint and a bit that indicates whether a TCI state for the TCI codepoint is for the one or more SBFD symbols or for the one or more non-SBFD symbols.

Aspect 63: The method of Aspect 57, wherein each DCI signal of the plurality of DCI signal indicates an indicated TCI codepoint using two bits, wherein a first bit of the two bits indicates that a duplex type of the TCI state is for the one or more SBFD symbols or the one or more non-SBFD symbols.

Aspect 64: The method of Aspect 57, wherein each DCI signal of the plurality of DCI signals includes an indicated TCI codepoint, wherein the indicated TCI codepoint indicates a TCI state for the TCI codepoint, and wherein a duplex type of the TCI codepoint is based at least in part on whether the communication includes the one or more SBFD symbols or the one or more non-SBFD symbols or is based at least in part on a slot type associated with a slot in which a corresponding DCI signal is received.

Aspect 65: The method of Aspect 57, wherein a first medium access control (MAC) control element (MAC-CE) activates or deactivates one or more TCI codepoints for the one or more SBFD symbols and a second MAC-CE activates or deactivates one or more TCI codepoints for the one or more non-SBFD symbols.

Aspect 66: The method of Aspect 65, wherein each DCI signal of the plurality of DCI signals includes an indicated TCI codepoint and a bit that indicates whether a TCI state for the TCI codepoint is for the one or more SBFD symbols or for the one or more non-SBFD symbols.

Aspect 67: The method of Aspect 57, wherein a single medium access control (MAC) control element (MAC-CE) activates or deactivates a plurality of TCI codepoints for the one or more SBFD symbols and the one or more non-SBFD symbols and indicates whether each TCI codepoint of the plurality of TCI codepoints is for the one or more SBFD symbols or the one or more non-SBFD symbols, wherein the MAC-CE includes a control resource set (CORESET) pool identifier (ID) field that indicates whether the MAC-CE is for TCI states activated for a first TRP or a second TRP.

Aspect 68: The method of Aspect 67, wherein a radio resource control (RRC) signal configures the single MAC-CE with a plurality of TCI codepoints, wherein the plurality of TCI codepoints is more than eight TCI codepoints but not more than sixteen TCI codepoints.

Aspect 69: The method of Aspect 57, wherein a single medium access control (MAC) control element (MAC-CE) activates or deactivates a TCI codepoint that maps to a plurality of TCI states for the unified TCI-based mTRP configuration, wherein a plurality of TCI codepoints are configured for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols using a new bitmap field for each codepoint to indicate whether the joint TCI state, the downlink TCI state, or the uplink TCI state for SBFD symbols or non-SBFD symbols is present, and wherein the MAC-CE includes a control resource set (CORESET) pool identifier (ID) field that indicates that the MAC-CE is for TCI states activated either for a first TRP or a second TRP.

Aspect 70: The method of Aspect 69, wherein each codepoint in the MAC-CE is associated with the joint TCI state, or separate TCI states with at least one of the downlink TCI state or the uplink TCI state.

Aspect 71: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-70.

Aspect 72: An apparatus for wireless communication at a device, the apparatus comprising one or more memories and one or more processors coupled to the one or more memories, the one or more processors configured to cause the device to perform the method of one or more of Aspects 1-70.

Aspect 73: An apparatus for wireless communication, the apparatus comprising at least one means for performing the method of one or more of Aspects 1-70.

Aspect 74: A non-transitory computer-readable medium storing code for wireless communication, the code comprising instructions executable by one or more processors to perform the method of one or more of Aspects 1-70.

Aspect 75: A non-transitory computer-readable medium storing a set of instructions for wireless communication, the set of instructions comprising one or more instructions that, when executed by one or more processors of a device, cause the device to perform the method of one or more of Aspects 1-70.

Aspect 76: A device for wireless communication, the device comprising a processing system that includes one or more processors and one or more memories coupled with the one or more processors, the processing system configured to cause the device to perform the method of one or more of Aspects 1-70.

Aspect 77: An apparatus for wireless communication at a device, the apparatus comprising one or more memories and one or more processors coupled to the one or more memories, the one or more processors individually or collectively configured to cause the device to perform the method of one or more of Aspects 1-70.

The foregoing disclosure provides illustration and description but is not intended to be exhaustive or to limit the aspects to the precise forms disclosed. Modifications and variations may be made in light of the above disclosure or may be acquired from practice of the aspects. No element, act, or instruction described herein should be construed as critical or essential unless explicitly described as such.

It will be apparent that systems or methods described herein may be implemented in different forms of hardware or a combination of hardware and software. The actual specialized control hardware or software used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, the articles "a" and "an" are intended to refer to one or more items and may be used interchangeably with "one or more" or "at least one." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or "a single one" or similar language is used. Also, as used herein, the terms "has," "have," "having," "comprise," "comprising," "include" and "including," and derivatives thereof or similar terms are intended to be open-ended terms that do not limit an element that they modify (for example, an element "having" A may also have B). Also, as used herein, the term "or" is intended to be inclusive when used in a series and may be used interchangeably with "and/or," unless explicitly stated otherwise (for example, if used in combination with "either" or "only one of"). As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

As used herein, the term "determine" or "determining" encompasses a wide variety of actions and, therefore, "determining" can include calculating, computing, processing, deriving, estimating, investigating, looking up (such as via looking up in a table, a database, or another data structure), searching, inferring, ascertaining, and/or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing, and/or other such similar actions.

As used herein, the phrase "based on" is intended to mean "based at least in part on" or "based on or otherwise in association with" unless explicitly stated otherwise. As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors coupled to the one or more memories, the one or more processors individually or collectively configured to:

receive, for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states includes a downlink TCI state, an uplink TCI state, or a joint TCI state; and communicate using the first power control parameter or the second power control parameter based at least in part on whether the communication includes one or more SBFD symbols or one or more non-SBFD symbols.

2. The apparatus of claim 1, wherein the unified TCI-based mTRP configuration is configured using a single downlink control information (DCI) signal.

3. The apparatus of claim 2, wherein the first signal activates or deactivates one or more TCI codepoints for the SBFD communications and the second signal activates or deactivates one or more TCI codepoints for the non-SBFD communications.

4. The apparatus of claim 2, wherein the first signal is a first medium access control (MAC) control element (MAC-CE) and the second signal is a second MAC-CE.

5. The apparatus of claim 2, wherein the single DCI signal includes an indicated TCI codepoint and a bit that indicates whether the TCI codepoint that maps up to two TCI states is for the one or more SBFD symbols or for the one or more non-SBFD symbols.

6. The apparatus of claim 2, wherein the single DCI signal includes an indicated TCI codepoint, wherein the indicated TCI codepoint indicates up to two TCI states for the TCI codepoint, and wherein a duplex type of the TCI codepoint is based at least in part on whether the communication includes the one or more SBFD symbols or the one or more non-SBFD symbols or is based at least in part on a slot type associated with a slot in which the single DCI signal is received.

7. The apparatus of claim 2, wherein the single DCI signal indicates a indicated TCI codepoint using two bits, wherein a first bit of the two bits indicates that a duplex type of a codepoint that maps to up to two TCI states for the TCI codepoint is for the one or more SBFD symbols or the one or more non-SBFD symbols.

8. The apparatus of claim 2, wherein the one or more processors are further configured to cause the UE to receive a radio resource control (RRC) signal that configures the plurality of TCI states for the unified TCI-based mTRP configuration.

9. The apparatus of claim 8, wherein a single medium access control (MAC) control element (MAC-CE) activates or deactivates a plurality of TCI codepoints for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols, and wherein each TCI codepoint of the plurality of TCI codepoints maps to one or more TCI states for a first TRP, a second TRP, or both the first TRP and the second TRP.

10. The apparatus of claim 1, wherein the unified TCI-based mTRP configuration is configured using a plurality of downlink control information (DCI) signals.

11. The apparatus of claim 10, wherein the one or more processors are further configured to cause the UE to receive a radio resource control (RRC) signal that includes a bit indicating whether a duplex type is for the one or more SBFD symbols or the one or more non-SBFD symbols.

12. The apparatus of claim 10, wherein a first medium access control (MAC) control element (MAC-CE) activates one or more TCI codepoints for the one or more SBFD symbols and a second MAC-CE activates one or more TCI codepoints for the one or more non-SBFD symbols, wherein at least one of the first MAC-CE or the second MAC-CE includes a control resource set (CORESET) pool identifier (ID) field that indicates whether the MAC-CE is for TCI states activated for a first TRP or a second TRP.

13. The apparatus of claim 10, wherein each DCI signal of the plurality of DCI signals includes an indicated TCI codepoint and a bit that indicates whether a TCI state for the TCI codepoint is for the one or more SBFD symbols or for the one or more non-SBFD symbols.

14. The apparatus of claim 10, wherein each DCI signal of the plurality of DCI signal indicates an indicated TCI codepoint using two bits, wherein a first bit of the two bits indicates that a duplex type of the TCI state is for the one or more SBFD symbols or the one or more non-SBFD symbols.

15. The apparatus of claim 10, wherein each DCI signal of the plurality of DCI signals includes an indicated TCI codepoint, wherein the indicated TCI codepoint indicates a TCI state for the TCI codepoint, and wherein a duplex type of the TCI codepoint is based at least in part on whether the communication includes the one or more SBFD symbols or the one or more non-SBFD symbols or is based at least in part on a slot type associated with a slot in which a corresponding DCI signal is received.

16. The apparatus of claim 10, wherein a first medium access control (MAC) control element (MAC-CE) activates or deactivates one or more TCI codepoints for the one or more SBFD symbols and a second MAC-CE activates or deactivates one or more TCI codepoints for the one or more non-SBFD symbols.

17. The apparatus of claim 10, wherein a single medium access control (MAC) control element (MAC-CE) activates or deactivates a plurality of TCI codepoints for the one or more SBFD symbols and the one or more non-SBFD symbols and indicates whether each TCI codepoint of the plurality of TCI codepoints is for the one or more SBFD symbols or the one or more non-SBFD symbols, wherein the MAC-CE includes a control resource set (CORESET) pool identifier (ID) field that indicates whether the MAC-CE is for TCI states activated for a first TRP or a second TRP.

18. The apparatus of claim 10, wherein a single medium access control (MAC) control element (MAC-CE) activates or deactivates a TCI codepoint that maps to a plurality of TCI states for the unified TCI-based mTRP configuration, wherein a plurality of TCI codepoints are configured for the one or more SBFD symbols and the one or more non-SBFD symbols for the unified TCI-based mTRP configuration, wherein each TCI codepoint of the plurality of TCI codepoints is for both the one or more SBFD symbols and the one or more non-SBFD symbols using a new bitmap field for each codepoint to indicate whether the joint TCI state, the downlink TCI state, or the uplink TCI state for SBFD symbols or non-SBFD symbols is present, and wherein the MAC-CE includes a control resource set (CORESET) pool identifier (ID) field that indicates that the MAC-CE is for TCI states activated either for a first TRP or a second TRP.

19. An apparatus for wireless communication at a network node, comprising:

one or more memories; and one or more processors coupled to the one or more memories, the one or more processors individually or collectively configured to:

transmit, to a user equipment (UE), for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states include a downlink TCI state, an uplink TCI state, or a joint TCI state; and communicate with the UE using the first power control parameter or the second power control parameter based at least in part on whether the communication includes one or more SBFD symbols or one or more non-SBFD symbols.

20. A method of wireless communication performed by a user equipment (UE), comprising:

receiving, for one or more transmission configuration indication (TCI) states of a plurality of TCI states associated with a unified TCI-based multiple transmission reception point (mTRP) configuration, a first power control parameter and a second power control parameter, wherein the first power control parameter is for sub-band full-duplex (SBFD) communications and the second power control parameter is for non-SBFD communications, and wherein the plurality of TCI states includes a downlink TCI state, an uplink TCI state, or a joint TCI state; and communicating using the first power control parameter or the second power control parameter based at least in part on whether the communication includes one or more SBFD symbols or one or more non-SBFD symbols.

* * * * *